United States Patent
Birdwell et al.

(10) Patent No.: US 10,019,470 B2
(45) Date of Patent: Jul. 10, 2018

(54) METHOD AND APPARATUS FOR CONSTRUCTING, USING AND REUSING COMPONENTS AND STRUCTURES OF AN ARTIFICIAL NEURAL NETWORK

(71) Applicant: University of Tennessee Research Foundation, Knoxville, TN (US)

(72) Inventors: J. Douglas Birdwell, Oak Ridge, TN (US); Mark E. Dean, Jefferson City, TN (US); Catherine Schuman, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 194 days.

(21) Appl. No.: 14/513,388

(22) Filed: Oct. 14, 2014

(65) Prior Publication Data

US 2015/0106311 A1 Apr. 16, 2015

Related U.S. Application Data

(60) Provisional application No. 61/891,621, filed on Oct. 16, 2013, provisional application No. 61/934,052, (Continued)

(51) Int. Cl.
*G06N 3/063* (2006.01)
*G06F 17/30* (2006.01)
(Continued)

(52) U.S. Cl.
CPC ......... *G06F 17/30312* (2013.01); *G06N 3/02* (2013.01); *G06N 3/049* (2013.01);
(Continued)

(58) Field of Classification Search
None
See application file for complete search history.

(56) References Cited

U.S. PATENT DOCUMENTS 7,533,071 B2 5/2009 Snook
8,311,965 B2 11/2012 Breitwisch et al.
(Continued)

FOREIGN PATENT DOCUMENTS

WO WO2004027704 4/2004

OTHER PUBLICATIONS

Wang, Fang, Vijaya K. Devabhaktuni, and Qi-Jun Zhang. "A hierarchical neural network approach to the development of a library of neural models for microwave design." IEEE transactions on microwave theory and techniques 46.12 (1998): 2391-2403.*
(Continued)

*Primary Examiner* — Alexey Shmatov
*Assistant Examiner* — Kevin W Figueroa
(74) *Attorney, Agent, or Firm* — Cameron LLP

(57) ABSTRACT

A method and apparatus for constructing a neuroscience-inspired artificial neural network (NIDA) or a dynamic adaptive neural network array (DANNA) or combinations of substructures thereof comprises one of constructing a substructure of an artificial neural network for performing a subtask of the task of the artificial neural network or extracting a useful substructure based on one of activity, causality path, behavior and inputs and outputs. The method includes identifying useful substructures in artificial neural networks that may be either successful at performing a subtask or unsuccessful at performing a subtask. Successful substructures may be implanted in an artificial neural network and unsuccessful substructures may be extracted from the artificial neural network for performing the task. The method and apparatus supports constructing, using and reusing components and structures of a neuroscience-inspired artificial neural network dynamic architecture in software and a dynamic adaptive neural network array.

21 Claims, 35 Drawing Sheets

Related U.S. Application Data filed on Jan. 31, 2014, provisional application No. 61/946,179, filed on Feb. 28, 2014, provisional application No. 61/951,690, filed on Mar. 12, 2014, provisional application No. 62/001,951, filed on May 22, 2014, provisional application No. 62/024,081, filed on Jul. 14, 2014.

(51) Int. Cl.
  *G06N 3/02* (2006.01)
  *G06N 3/08* (2006.01)
  *G06N 3/10* (2006.01)
  *G06N 3/04* (2006.01)

(52) U.S. Cl.
  CPC ........... *G06N 3/063* (2013.01); *G06N 3/0635* (2013.01); *G06N 3/08* (2013.01); *G06N 3/086* (2013.01); *G06N 3/10* (2013.01)

(56) References Cited

U.S. PATENT DOCUMENTS

| | | | |
|---|---|---|---|
| 8,433,665 | B2 | 4/2013 | Tang et al. |
| 8,510,239 | B2 | 8/2013 | Modha |
| 8,515,885 | B2 | 8/2013 | Modha |
| 8,600,919 | B2 | 12/2013 | Poon et al. |
| 2009/0292661 | A1 | 11/2009 | Hass |
| 2009/0327195 | A1 | 12/2009 | Iscen |
| 2011/0028827 | A1* | 2/2011 | Sitaram ............... A61B 5/0059 600/410 |
| 2012/0005141 | A1* | 1/2012 | Sasagawa ............ G06N 3/02 706/25 |
| 2012/0036099 | A1 | 2/2012 | Venkatraman et al. |
| 2012/0109863 | A1 | 5/2012 | Esser et al. |
| 2013/0073497 | A1 | 3/2013 | Akopyan et al. |
| 2014/0195468 | A1 | 7/2014 | Mohammadi et al. |
| 2015/0006444 | A1* | 1/2015 | Tamatsu ............... G06N 3/082 706/12 |

OTHER PUBLICATIONS

Lawrence, Steve, et al. "Face recognition: A convolutional neural-network approach." IEEE transactions on neural networks 8.1 (1997): 98-113.*
Jin, Yaochu, Ruojing Wen, and Bernhard Sendhoff. "Evolutionary multi-objective optimization of spiking neural networks." International Conference on Artificial Neural Networks. Springer Berlin Heidelberg, 2007.*
Ijspeert, Auke Jan. "Central pattern generators for locomotion control in animals and robots: a review." Neural networks 21.4 (2008): 642-653.*
Martinetz, Thomas M., Helge J. Ritter, and Klaus J. Schulten. "Three-dimensional neural net for learning visuomotor coordination of a robot arm." IEEE Transactions on Neural Networks 1.1 (1990): 131-136.*
Yao, Xin, "Evolving artificial neural networks," Proceedings of the IEEE, 87(9):1423-1447, Sep. 1999.
Montana, David J. and Lawrence Davis, "Training feedforward neural networks using genetic algorithms," Proceedings of the 11th international joint conference on Artificial intelligence—vol. 1, pp. 762-767, San Francisco, CA, USA, 1989, Morgan Kaufmann Publishers Inc.
Fogel, D. B., L. Fogel, and V. Porto, "Evolving neural networks," Biological Cybernetics, 63(6): 487-493, 1990.
Beer, Randall D. and John C. Gallagher. Evolving dynamical neural networks for adaptive behavior, Adapt. Behav., 1(1):91-122, Jun. 1992.
Wieland, A. P., "Evolving neural network controllers for unstable systems," Neural Networks, 1991, IJCNN-91—Seattle International Joint Conference on, vol. ii, pp. 667-673, Jul. 1991.
Dominic, S., R. Das, D. Whitley, and C. Anderson, Genetic reinforcement learning for neural networks, Neural Networks, 1991, IJCNN-91—Seattle International Joint Conference on, vol. ii, pp. 71-76 vol. 2, Jul. 1991.
Gomez, Faustino, Jurgen Schmidhuber, and Risto Miikkulainen, "Efficient non-linear control through neuroevolution," Johannes Furnkranz, Tobias Scheffer, and Myra Spiliopoulou, editors, Machine Learning: ECML 2006, vol. 4212 of Lecture Notes in Computer Science, pp. 654-662, Springer Berlin/Heidelberg, 2006.
Gomez, Faustino, Jurgen Schmidhuber, and Risto Miikkulainen, "Accelerated neural evolution through cooperatively coevolved synapses," J. Mach. Learn. Res., 9: 937-965, Jun. 2008.
Floreano, Dario, Peter Durr, and Claudio Mattiussi, "Neuroevolution: from architectures to learning," Evolutionary Intelligence, 1(1): 47-62, 2008.
Branke, Jurgen, "Evolutionary algorithms in neural network design and training—A review," Jarmo T. Alander, editor, Proc. of the First Nordic Workshop on Genetic Algorithms and their Applications (1NWGA), vol. 95-1, pp. 145-163, Vaasa, Finland, 1995.
Whitley, D., T. Starkweather, and C. Bogart, "Genetic algorithms and neural networks: optimizing connections and connectivity," Parallel Computing, 14(3): 347-361, 1990.
Koza, J.R. and J.P. Rice, Genetic generation of both the weights and architecture for a neural network. In Neural Networks, 1991., IJCNN-91—Seattle Inter-national Joint Conference on, vol. ii, pp. 397-404 vol. 2, Jul. 1991.
Dasgupta, D. and D.R. McGregor, "Designing application-specific neural networks using the structured genetic algorithm," Combinations of Genetic Algorithms and Neural Networks, 1992, COGANN-92. International Workshop on, pp. 87-96, Jun. 1992.
White, David and Panos Ligomenides, "Gannet: A genetic algorithm for optimizing topology and weights in neural network design," Jos'e Mira, Joan Cabestany, and Alberto Prieto, editors, New Trends in Neural Computation, vol. 686 of Lecture Notes in Computer Science, pp. 322-327, Springer Berlin/Heidelberg, 1993.
Maniezzo, V. Genetic evolution of the topology and weight distribution of neural networks. Neural Networks, IEEE Transactions on, 5(1):39-53, Jan. 1994.
Angeline, P. J., G.M. Saunders, and J.B. Pollack, "An evolutionary algorithm that constructs recurrent neural networks," Neural Networks, IEEE Transactions on, 5(1):54-65, Jan. 1994.
Tang, K.S., C.Y. Chan, K.F. Man, and S. Kwong. "Genetic structure for nn topology and weights optimization," Genetic Algorithms in Engineering Systems: Innovations and Applications, 1995. GALESIA. First International Conference on (Conf. Publ. No. 414), pp. 250-255, Sep. 1995.
Liu, Yong and Xin Yao, "A population-based learning algorithm which learns both architectures and weights of neural networks," Chinese Journal of Advanced Software Research (Allerton), 10011:54-65, 1996.
Moriarty, David E. and Risto Mikkulainen, "Efficient reinforcement learning through symbiotic evolution," Machine Learning, 22(1):11-32, 1996.
Moriarty, David E. and Risto Miikkulainen, "Forming neural networks through efficient and adaptive coevolution," Evol. Comput., 5(4):373-399, Dec. 1997.
Gomez, Faustino and Risto Miikkulainen, "2-d pole balancing with recurrent evolutionary networks," Proceeding of the International Conference on Artificial Neural Networks (ICANN), pp. 425-430, 1998.
Yao, Xin and Yong Liu, "A new evolutionary system for evolving artificial neural networks," Neural Networks, IEEE Transactions on, 8(3): 694-713, May 1997.
Pujol, Joo Carlos Figueira and Riccardo Poli, "Evolving the topology and the weights of neural networks using a dual representation," Applied Intelligence, 8:73-84, 1998.
Abbass, Hussein A., "An evolutionary artificial neural networks approach for breast cancer diagnosis," Artificial Intelligence in Medicine, 25(3):265-281, 2002.
Stanley, Kenneth O. and Risto Miikkulainen, "Evolving neural networks through augmenting topologies," Evolutionary Computation, 10(2): 99-127, 2002.

(56) References Cited

OTHER PUBLICATIONS

Stanley, K.O., B.D. Bryant, and R. Miikkulainen, "Evolving adaptive neural networks with and without adaptive synapses," Evolutionary Computation, 2003. CEC '03, The 2003 Congress on, vol. 4, pp. 2557-2564, Dec. 2003.

Alba, Enrique and J. Chicano, "Training neural networks with ga hybrid algorithms," Kalyanmoy Deb, editor, Genetic and Evolutionary Computation, GECCO 2004, vol. 3102 of Lecture Notes in Computer Science, pp. 852-863. Springer Berlin/Heidelberg, 2004.

Fieldsend, J. E. and S. Singh, "Pareto evolutionary neural networks," Neural Networks, IEEE Transactions on, 16(2):338-354, Mar. 2005.

Palmes, P. P., T. Hayasaka, and S. Usui, "Mutation-based genetic neural network," Neural Networks, IEEE Transactions on, 16(3):587-600, May 2005.

Kassahun, Y. Towards a Unified Approach to Learning and Adaptation, PhD thesis, Christian-Albrechts-University, Kiel, Germany, Feb. 2006.

Siebel, Nils T. and Gerald Sommer, "Evolutionary reinforcement learning of artificial neural networks," Int. J. Hybrid Intell. Syst., 4(3):171-183, Aug. 2007.

Siebel, Nils T., J. Botel, and G. Sommer, "Efficient neural network pruning during neuro-evolution,"Neural Networks, 2009. IJCNN 2009. International Joint Conference on, pp. 2920-2927, Jun. 2009.

Stanley, Kenneth O., David B. D'Ambrosio, and Jason Gauci, "A hypercube-based encoding for evolving large-scale neural networks," Artificial Life, 15(2):185-212, 2009.

Gauci, Jason and Kenneth O. Stanley, "Autonomous evolution of topographic regularities in artificial neural networks," Neural Computation, 22(7):1860-1898, 2010.

Markram, Henry, Wulfram Gerstner, and Per Jesper Sjostrom, "A history of spike-timing-dependent plasticity," Frontiers in Synaptic Neuroscience, 3:4, pp. 1-24, 2011.

Beer, Randall D., "On the dynamics of small continuous-time recurrent neural networks," Adaptive Behavior, 3(4):469-509, 1995.

Beer, Randall D., "The dynamics of adaptive behavior: A research program," Robotics and Autonomous Systems, 20(2-4):257-289, 1997, ice:title;Practice and Future of Autonomous Agents.

Gallagher, John C. and Saranyan Vigraham, "A modified compact genetic algorithm for the intrinsic evolution of continuous time recurrent neural networks," Proceedings of the Genetic and Evolutionary Computation Conference, GECCO '02, pp. 163-170, San Francisco, CA, USA, 2002, Morgan Kaufmann Publishers Inc.

Merolla, P., J. Arthur, F. Akopyan, N. Imam, R. Manohar, and D.S. Modha, "A digital neurosynaptic core using embedded crossbar memory with 45pj per spike in 45nm," Custom Integrated Circuits Conference (CICC), 2011 IEEE, pp. 1-4, Sep. 2011.

Preissl, Robert, Theodore M. Wong, Pallab Datta, Myron Flickner, Raghavendra Singh, Steven K. Esser, William P. Risk, Horst D. Simon, and Dharmendra S. Modha. "Compass: a scalable simulator for an architecture for cognitive computing," Proceedings of the International Conference on High Performance Computing, Networking, Storage and Analysis, SC '12, pp. 54:1-54:11, Los Alamitos, CA, USA, 2012, IEEE Computer Society Press.

Kashtan, Nadav, Uri Alon, and Jr. Callan, Curtis G., "Spontaneous evolution of modularity and network motifs," Proceedings of the National Academy of Sciences of the United States of America, 102(39): pp. 13773-13778, 2005.

Caelli, T., Ling Guan, and W. Wen, "Modularity in neural computing," Proceedings of the IEEE, 87(9): 1497-1518, Sep. 1999.

Cho, Sung-Bae and K. Shimohara, "Modular neural networks evolved by genetic programming," Evolutionary Computation, 1996, Proceedings of IEEE International Conference on, pp. 681-684, May 1996.

Garcia-Pedrajas, N., C. Hervas-Martinez, and J. Munoz-Perez, "Covnet: a cooperative coevolutionary model for evolving artificial neural networks," Neural Networks, IEEE Transactions on, 14(3): 575-596, May 2003.

Garcia-Pedrajas, N., C. Hervas-Martinez, and D. Ortiz-Boyer.Cooperative coevolution of artificial neural network ensembles for pattern classification, Evolutionary Computation, IEEE Transactions on, 9(3):271-302, Jun. 2005.

Reisinger, Joseph, Kenneth O. Stanley, and Risto Miikkulainen, Evolving reusable neural modules. In Proceedings of the Genetic and Evolutionary Computation Conference, pp. 69-81, 2004.

Hornby, Gregory S., "Measuring, enabling and comparing modularity, regularity and hierarchy in evolutionary design," Proceedings of the 2005 conference on Genetic and evolutionary computation, GECCO '05, pp. 1729-1736, New York, NY, USA, 2005, ACM.

Kamioka, Takumi, Eiji Uchibe, and Kenji Doya, "Neuroevolution based on reusable and hierarchical modular representation," Proc. 15th Int. Conf. Advances in Neuro-Information Processing, Part I (ICONIP'08), pp. 22-31. Berlin, Heidelberg: Springer-Verlage, 2009.

Yao, Xin and M.M. Islam, "Evolving artificial neural network ensembles," Computational Intelligence Magazine, IEEE, 3(1): 31-42, Feb. 2008.

Singh, S., A. Barto, and N. Chentanez, "Intrinsically motivated reinforcement learning," 18th Annual Conference on Neural Information Processing Systems (NIPS), pp. 1-8, 2004.

Hawkins, Jeff et al., "Sequence memory for prediction, inference and behavior," Phil. Trans. Royal Soc. B, pp. 1203-1209, 2009.

Glackin et al., "A Novel Approach for the Implementation of Large Scale Spiking Neural Networks on FPGA Hardware," IWANN 2005, LNCS 3512, pp. 552-563, 2005.

Cassidy et al., "FPGA Based Silicon Spiking Neural Array," Biomedical Circuits and Systems Conference (BIOCAS 2007), pp. 75-78, IEEE, 2007.

Cassidy et al., "Cognitive Computing Building Block: A Versatile and Efficient Digital Neuron Model for Neurosynaptic Cores," IBM Research, pp. 1-10, 2013.

Sharp et al., "Power-efficient simulation of detailed cortical microcircuits on SpiNNaker," Journal of Neuroscience Methods, 201, pp. 110-118, 2012.

Lewis, M. Anthony et al., "Control of a robot leg with an adaptive a(nalog)VLSI CPG chip," Neurocomputing, 38-40, 2001, pp. 1409-1421.

Lewis, M. Anthony et al., "CPG Design Using Inhibitory Networks," Proc. of the 2005 IEEE International Conference on Robotics and Automation, (ICRA 2005), pp. 3682-3687, 2005.

Friedmann, Simon et al., "Reward-based learning under hardware constraints—using a RISC processor embedded in a neuromorphic substrate," Frontiers in Neuroscience, 7-160, pp. 1-17, 2013.

Benjamin, B. V. et al., "Neurogrid: A mixed-analog-digital multichip system for large-scale neural simulations." Proceedings of the IEEE, 102, pp. 699-716, 2014.

Indiveri, Giacomo et al., "Neuromorphic silicon neuron circuits." Frontiers in Neuroscience, 5-73, pp. 1-23, 2011.

Abbass, Hussein A., Michael Towsey, and G. Finn. "C-Net: A method for generating non-deterministic and dynamic multivariate decision trees." Knowledge and Information Systems 3.2 (2001): pp. 184-197.

Belatreche, Ammar, Liam P. Maguire, and Martin McGinnity. "Advances in design and application of spiking neural networks." Soft Computing 11.3 (2007): pp. 239-248.

Bohte, Sander M., Joost N. Kok, and Han La Poutre. "Errorbackpropagation in temporally encoded networks of spiking neurons." Neurocomputing 48.1 (2002): pp. 17-37.

Garcia-Pedrajas, Nicolás, Domingo Ortiz-Boyer, and César Hervás-Martínez. "An alternative approach for neural network evolution with a genetic algorithm: Crossover by combinatorial optimization." Neural Networks 19.4 (2006): pp. 514-528.

Jin, Yaochu, Ruojing Wen, and Bernhard Sendhoff. "Evolutionary multi-objective optimization of spiking neural networks." Artificial Neural Networks—ICANN 2007. Springer Berlin Heidelberg, 2007. pp. 370-379.

Mangasarian, Olvi L., R. Setiono, and W. H. Wolberg. "Pattern recognition via linear programming: Theory and application to medical diagnosis." Large-scale numerical optimization (1990): pp. 22-31.

(56) References Cited

OTHER PUBLICATIONS

Michie, Donald, David J. Spiegelhalter, and Charles C. Taylor. "Machine learning, neural and statistical classification." (1994).
Parekh, Rajesh, Jihoon Yang, and Vasant Honavar. "Constructive neural-network learning algorithms for pattern classification." Neural Networks, IEEE Transactions on 11.2 (2000): pp. 436-451.
Pavlidis, N. G., et al. "Spiking neural network training using evolutionary algorithms." Neural Networks, 2005, IJCNN'05, Proceedings, 2005 IEEE International Joint Conference on, vol. 4., IEEE, 2005. pp. 2190-2194.
Setiono, Rudy, and Lucas Chi Kwong Hui. "Use of a quasi-Newton method in a feedforward neural network construction algorithm." Neural Networks, IEEE Transactions on 6.1 (1995): pp. 273-277.
Moore, Kendra E., and Jack C. Chiang. "ALPHA/Sim: ALPHA/Sim simulation software tutorial," Proceedings of the 32nd conference on Winter simulation, pp. 259-267. Society for Computer Simulation International, 2000.
Poor, H. Vincent, and Olympia Hadjiliadis. Quickest detection, vol. 40, pp. 102-129, Cambridge: Cambridge University Press, 2009.
Van Trees, Harry L.. Detection, Estimation, and Modulation Theory—Part I—Detection, Estimation, and Linear Modulation Theory, pp. 23-45, John Wiley & Sons, 2001.
Rosenblatt, F., "The perceptron: A probabilistic model for information storage and organization in the brain." Psychological Review, 65(6): pp. 386-408, 1958.
Fogel, David B., Eugene C. Wasson III, and Edward M. Boughton. "Evolving neural networks for detecting breast cancer." Cancer letters, 96.1, pp. 49-53 (1995).
Boyd, Stephen P., Venkataramanan Balakrishnan, Craig H. Barratt, Nasser M. Khraishi, Xiaoming Li, David G. Meyer, and Stephen A. Norman. "A new CAD method and associated architectures for linear controllers." IEEE Transactions onAutomatic Control, 33, No. 3, pp. 268-283, 1988.
Garcia, Carlos E., and A. M. Morshedi. "Quadratic programming solution of dynamic matrix control (QDMC)." Chemical Engineering Communications 46, No. 1-3, pp. 73-87, 1986.
Athans, Michael, David Castanon, K-P. Dunn, C. Greene, Wing Lee, N. Sandell Jr, and Alan S. Willsky. "The stochastic control of the F-8C aircraft using a multiple model adaptive control (MMAC) method—Part I: Equilibrium flight." IEEE Transactions on Automatic Control, 22, No. 5, pp. 768-780, 1977.
Narendra, Kumpati S., and Jeyendran Balakrishnan. "Adaptive control using multiple models." IEEE Transactions on Automatic Control, 42, No. 2, pp. 171-187, 1997.
Anderson, Brian, Thomas Brinsmead, Daniel Liberzon, and A. Stephen Morse. "Multiple model adaptive control with safe switching." International journal of adaptive control and signal processing 15, No. 5, pp. 445-470, 2001.
Morshedi, A. M., C. R. Cutler, and T. A. Skrovanek. "Optimal Solution of Dynamic Matrix Control with Linear Programing Techniques (LDMC)." Proc. American Control Conference, pp. 199-208, 1985.
Gattu, Gangadhar, and Evanghelos Zafiriou. "Nonlinear quadratic dynamic matrix control with state estimation." Industrial & engineering chemistry research 31, No. 4, pp. 1096-1104, 1992.
Morari, Manfred, and Jay H Lee. "Model predictive control: past, present and future." Computers & Chemical Engineering 23, No. 4, pp. 667-682, 1999.
Stewart et al., "Python Scripting in the Nengo Simulator," Frontiers in NeuroInformatics, V. 3, Article 7, pp. 1-9, 2009.
Izhikevich et al, "Spike-timing Dynamics of Neuronal Groups," Cerebral Cortex, pp. 933-944, 2004.
Izhikevich, Eugene M, "Which Model to Use for Cortical Spiking Networks," IEEE Transactions on Neural Networks, pp. 1063-1070, 2004.
Matlab, Neural Network Toolbox 6 User's Guide, 2010.
J. Yoshimi, "Simbrain: A visual framework for neural network analysis and education", Brains, Minds, and Media, vol. 3, May 23, 2008.
L. Hansen and P. Salamon, "Neural Network Ensembles", IEEE Trans. on Pattern Analysis and Mach. Intel., vol. 12, No. 10, Oct. 1990, pp. 993-1001.
Y. Le Cun et al., "Handwritten Digit Recognition with a Back-Propagation Network", in Neural Information Proc. Sys., 1989, pp. 396-404.
Scott Frederick Hansen ("Exploration of Neural Structures for Dynamic System Control" Dec. 2012).
Velazcoan et al ("Optimization with Neural Networks Trained by Evolutionary Algorithms" 2002).
Dipl. Phys. Andreas Grubl ("VLSI Implementation of a Spiking Neural Network" 2007).
Stewart et al ("Python scripting in the Nengo simulator" 2009).
Izhikevich et al ("Spike-timing Dynamics of Neuronal Groups" 2004).

\* cited by examiner

| 3 | 4 | 5 | 5 | 4 | 3 | 3 | 4 | 5 |
|---|---|---|---|---|---|---|---|---|
| 2 |   | 6 | 6 |   | 2 | 2 |   | 6 |
| 1 | 0 | 7 | 7 | 0 | 1 | 1 | 0 | 7 |
| 1 | 0 | 7 | 7 | 0 | 1 | 1 | 0 | 7 |
| 2 |   | 6 | 6 | 1210 | 2 | 2 |   | 6 |
| 3 | 4 | 5 | 5 | 4 | 3 | 3 | 4 | 5 |
| 3 | 4 | 5 | 5 | 4 | 3 | 3 | 4 | 5 |
| 2 |   | 6 | 6 |   | 2 | 2 |   | 6 |
| 1 | 0 | 7 | 7 | 0 | 1 | 1 | 0 | 7 |

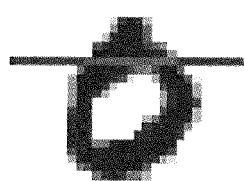 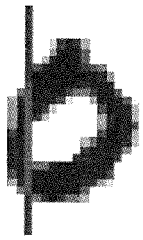 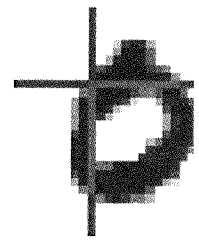
Example Digits     By Row     By Column     By Row and Column
FIG. 15A 0 Recognizer 1 Recognizer 2 Recognizer 3 Recognizer 4 Recognizer 5 Recognizer 6 Recognizer 7 Recognizer 8 Recognizer 9 Recognizer

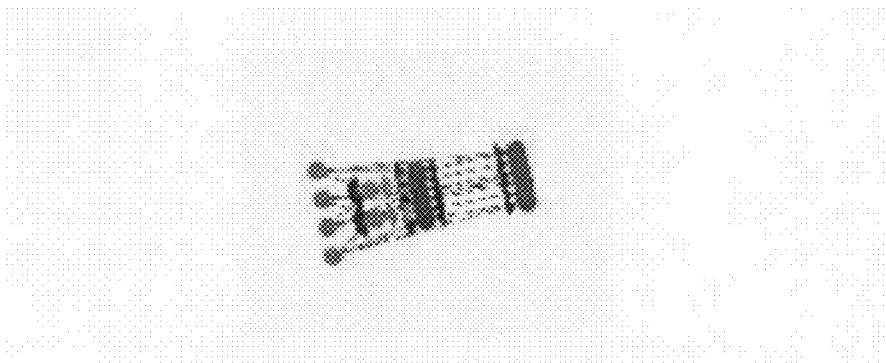
FIG. 23A Network hand-tooled to recognize vertical lines.
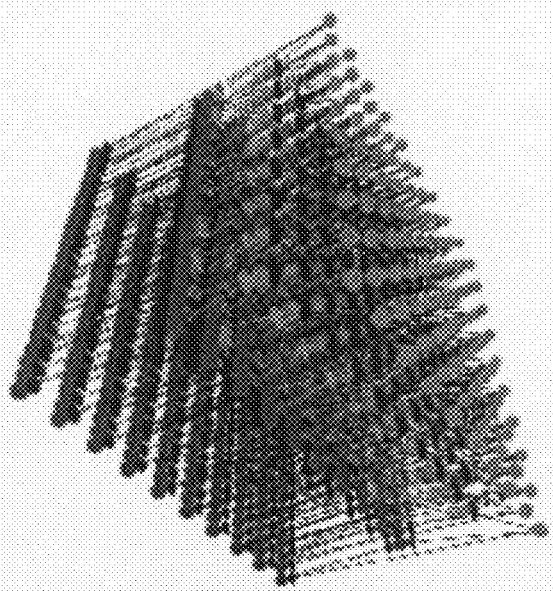
FIG. 23B Network repeated many times to recognize vertical lines in an image.

Full Network

Subnetwork extracted
based on activity

METHOD AND APPARATUS FOR CONSTRUCTING, USING AND REUSING COMPONENTS AND STRUCTURES OF AN ARTIFICAL NEURAL NETWORK

The present patent application claims the benefit of and right of priority to U.S. Provisional Patent Applications, Ser. No. 61/891,621, filed Oct. 16, 2013; Ser. No. 61/934,052, filed Jan. 31, 2014; Ser. No. 61/946,179 filed Feb. 28, 2014; Ser. No. 61/951,690 filed Mar. 12, 2014, Ser. No. 62/001, 951, filed May 22, 2014, and Ser. No. 62/024,081, filed Jul. 14, 2014, all six U. S. provisional patent applications incorporated by reference herein as to their entire contents and is related by subject matter to U.S. patent application Ser. No. 14/513,280 filed Oct. 14, 2014, entitled "Method and Apparatus for Constructing a Neuroscience-Inspired Artificial Neural Network" of J. Douglas Birdwell and Catherine Schuman, to U.S. patent application Ser. No. 14/513,297 filed Oct. 14, 2014, entitled "Method and Apparatus for Constructing a Dynamic Adaptive Neural Network Array (DANNA)" of J. Douglas Birdwell, Mark E. Dean and Catherine Schuman, to U.S. patent application Ser. No. 14/513,334 filed Oct. 14, 2014, entitled "Method and Apparatus for Providing Random Selection and Long-Term Potentiation and Depression in an Artificial Network" of J. Douglas Birdwell, Mark E. Dean and Catherine Schuman, to U.S. patent application Ser. No. 14/513,447 filed Oct. 14, 2014, entitled "Method and Apparatus for Providing Real-Time Monitoring of an Artificial Neural Network" of J. Douglas Birdwell, Mark E. Dean and Catherine Schuman, and to U.S. patent application Ser. No. 14/513,497 filed Oct. 14, 2014, entitled "Method and Apparatus for Constructing a Neuroscience-Inspired Artificial Neural Network with Visualization of Neural Pathways" of J. Douglas Birdwell, Mark E. Dean, Margaret Drouhard and Catherine Schuman, all five patent applications incorporated by reference as to their entire contents.

COMPUTER PROGRAM LISTING APPENDIX

A computer program listing appendix stored on compact disc in VHDL code, submitted herewith in duplicate, is provided. Each disc contains the file VHDLcode.pdf, size 6.578 megabytes and was created on or before Oct. 14, 2014. The VHDL code originally submitted in the specification has been reformatted for submission in accordance with Rules 52(e) and 96(c). The content of each disc is hereby incorporated by reference herein in its entirety. The Appendix contains material which is subject to copyright protection. An unrestricted right to use, copy, modify, merge, publish, distribute or otherwise use the VHDL code of the Appendix is hereby granted on the condition that the copyright notice and permission notice, as it appears in the Appendix, is included in all copies or substantial portions thereof so copied and used.

TECHNICAL FIELD

The technical field relates to a method and apparatus for constructing a neuroscience-inspired artificial neural network (NIDA) or a dynamic adaptive neural network array (DANNA) or combinations of substructures thereof and, in particular, to the method and apparatus for constructing, using and reusing components and structures to support a neuroscience-inspired artificial neural network dynamic architecture in software or a DANNA or combinations of structures and substructures thereof or from artificial neural networks (ANNs) known in the art from primary neuron and synapse elements of one of a programmable logic array, application specific integrated circuit, VLSI component or other component for one of control, anomaly detection and classification applications.

BACKGROUND AND RELATED ARTS

Biological neural networks are known to have many desirable characteristics. For example, they are able to perform complex, nonlinear tasks using large numbers of relatively simple building blocks. Biological neural networks are robust, able to extrapolate information from a specific setting to apply to a more general setting, and adaptable to change. For these reasons and many others, it has been a goal of the machine learning community to produce networks with similar capabilities to biological central nervous systems, brains and, in particular to the human brain.

In order to appreciate the neuroscience-inspired artificial neural network of the present invention, a brief introduction to the neural components, by example, of the human brain and the larger components of the human brain itself is provided. Biological neurons are the nerve cells present in the brain. The human brain consists of about $10^{11}$ neurons, each of which operates in parallel with the others. A typical biological neuron is shown in FIG. 1. A process in neuroscience usually refers to a physical feature. The various processes of the neuron are called neurites; henceforth, the term neurite will be used rather than process to avoid confusion with the computer science notion of process. The neuron receives information through neurites called dendrites 110, which also communicate the information to the neuron's cell body 120. The cell body 120 has a nucleus 130. The neurite that transmits information out of the neuron to other targets is called the axon 140 having axon terminals 190. A myelin sheath 160 comprises a Schwann cell 170. Signals between neurons are usually transferred across synapses, although direct connections that allow ion exchange have been observed. Typically, the communication is done chemically via neurotransmitters.

Dendrites 110 are usually shorter than axons 140 and arise from the cell body 120 of the neuron. They generally branch off into dendritic spines, which receive information from axons from other neurons. The dendritic spines are typically where the communication between neurons across synapses and from axons takes place, although sometimes communication is direct from cell body to cell body, or between dendrites.

Although information is transmitted from an axon 140 to a dendrite 110 in a typical synapse, there are also synapses between two axons, two dendrites, and synapses and from axons in which information travels from dendrite 110 to axon 140. Because of these differences, connections between neurons in the artificial neural networks defined herein will all be referred to only as synapses, with no distinction between dendrites and axons. The synapses as known in biological systems are uni-directional in that information travels from one neuron to another via a synapse connection, but not in the opposite direction along that synapse.

There are two ways for synaptic transmission to take place in the brain: electrical transmission and chemical transmission. Electrical transmission occurs when the current generated by one neuron spreads to another neuron on a pathway of low electrical resistance. Electrical synapses are relatively rare in the mammalian brain; evidence suggests that they occur in regions where the activities of neighboring neurons need to be highly synchronized. In chemical transmissions, neurotransmitters are transmitted from one neuron to another.

A neurotransmitter is a chemical substance that is typically synthesized in a neuron and is released at a synapse following depolarization of at least a portion of the neuron's cell membrane (typically near the synapse). The neurotransmitter then binds to receptors at a postsynaptic cell and/or postsynaptic terminal to elicit a response. This response may excite or inhibit the neuron, meaning neurotransmitters play a major role in the way the brain operates. Some of the known neurotransmitters are acetylcholine, glutamate, GABA, glycine, dopamine, norepinephrine, serotonin and histamine.

Neurotransmitters are released according to action potentials in the neuron. An action potential is a fluctuation in the membrane potential of the neuron, which is the voltage difference across the cell membrane caused by differences in ion concentrations between the outside and inside of the neuron. Neurons have a particular membrane potential in which they are at rest. Typically, a neuron is "at rest" when the potential inside the neuron's cell wall is approximately −70 mV compared to the outside of the neuron. When positively charged ions flow out of the cell, the membrane potential becomes more negative, while positive ionic current flowing into the cell changes the membrane potential to a less negative or positive value. Negative ions have an opposite effect. Each neuron has an associated threshold level. If the membrane potential rises above this threshold level, the neuron generates an action potential. The generation of the action potential is called a "firing" of the neuron.

The generation of an action potential relies not only on the threshold of the neuron but also on the recent firing history. Each neuron has an associated refractory period. For a short period of time after a neuron has fired, it is highly unlikely that that neuron will fire again. This period is called the absolute refractory period. For a slightly longer period of time after the absolute refractory period, it is difficult, but more likely, for the neuron to fire again. This period is called the relative refractory period.

In the central nervous system, multiple types of cells provide myelin sheaths 160 along axons 140. Myelin is a fat that provides an insulating layer for the axon 140. The thickness of the myelin sheath 160 controls the propagation delay of signals along the axon 140. Myelin sheaths 160 are separated along the axon by nodes of Ranvier 150. The action potential traveling along the axon is regenerated at each of the nodes of Ranvier. Having described a typical neuron, the parts of the human brain will now be discussed with reference to FIG. 2.

The basal ganglia (corpus striatum) 210 is one of the most important layers of the brain 200 for emotion processing and generation; it is also known as the reptilian brain. The basal ganglia 210 connects the cerebral cortex and the cerebellum. The basal ganglia 210 is the portion of the brain that contains innate behavioral knowledge, including motor functions and primal emotions such as fear, anger, and sexuality. It is also responsible for motor integration in the cerebral cortex, i.e. it helps regulate movement. The next layer of the brain known as the limbic system or the visceral brain, is where many of the various social emotions are processed. It processes most affective knowledge, generating more sophisticated emotional responses. The limbic system also appears to mediate or control memory processes. Both the amygdala 220 and the hippocampus 230 are part of the limbic system. The hippocampus 230 plays an important role in memory formation in the brain, particularly short-term memory (memory of new information and recent events). The amygdala 220 is important for learning associations between stimuli and emotional value (emotional responses and aggressive behavior). For example, the amygdala may associate fear with a stimulus that causes pain.

The neocortex 240 is a structure in the brain that is more evolved in human brains than in other mammal brains. The neocortex 240 is responsible for associating a diversity of sensations and innate ideas, such as a sense of causality and spatial referencing, into perception, concepts and attributions. The neocortex 240 is the portion of the brain that contains what we think of as the rational mind and the imagination and the part of the brain that generates ideas (higher mental functions, general movement, perception and behavioral responses). The neocortex 240 in humans is organized in six layers, which are parallel to the surface of the cortex. The neurons in the neocortex are organized in cylindrical columns (cortical columns), which are perpendicular to the cortical surface. Axons 140 that traverse vertically in the neocortex 240 typically form connections to neurons within a column, but among the neurons in different layers. Axons 140 that traverse horizontally in the neocortex 240 allow communication between neurons in different columns.

There are two types of memory in the brain: declarative memory and non-declarative memory. Declarative memory is explicit memory and typically depends on the hippocampus 230 and other areas of the brain. Declarative memory includes episodic memory (memory of events from one's life) and semantic memory (general knowledge of the world). The hippocampus 230 retains context-dependent memories until they are consolidated in neocortical structures, but there is evidence that these memories are stored differently in the two structures. Non-declarative memory, on the other hand, is implicit, procedural memory and depends mostly on the basal ganglia and parts of the cerebral cortex (including the neocortex 240). Non-declarative memory is needed to learn skills, such as swimming. For the most part, however, it is still unclear precisely how learning and memory work in the human brain. It is clear that in order for the brain to learn, the structure of the brain must be somewhat plastic; that is, the structure must be able to adapt. Synaptic plasticity dependent on the activity of the synapses is widely thought to be the mechanism through which learning and memory take place. The Hebb rule comprises the idea that if the action potential from one neuron causes another neuron to fire, then the synapse along which the action potential travels should be strengthened (or when a synapse is not used, a decrease in strength). These decreases take place when a particular synapse repeatedly fails to be involved in the firing of a neuron and are supported by experiment.

The effects of these increases and decreases of strength in the synapses can be both short-term and long-term. If the effects last a significant period of time, they are called long-term potentiation (LTP) and long-term depression (LTD). Synaptic plasticity is seen as a process that occurs gradually over time, and the rate of the change can be specified by one or more time constant(s).

Now, the development of artificial neural networks will be discussed, for example, in the context of efforts to simulate the wonders of the human brain. Artificial neural networks can be thought of as directed weighted graphs, where the neurons are the nodes and the synapses are the directed edges. Known neural network architectures are typically made up of input neurons, output neurons and so-called "hidden" neurons. The hidden neurons are those that are neither input neurons nor output neurons in such a network. The structural types include feed-forward neural networks, recurrent neural networks and modular neural networks.

Referring to prior art FIG. 3, there is shown a fully-connected feed-forward neural network comprising input neurons 310-1, 310-2, 310-3, . . . , 310-N to the left and output neurons 330-1, 330-2, 330-3, . . . , 330-P to the right with hidden neurons 320-1, 320-2, 320-3, . . . , 320-M between input and output neurons. It is not shown but one hidden neuron may connect to another hidden neuron. In feed forward neural networks, there is a layer of input neurons, zero or more layers of hidden neurons, and an output layer. Input layers only contain outgoing edges, and the edges of one layer are only connected to the next layer (whether it be a hidden layer or the output layer). Networks may either be fully connected as seen in FIG. 3, in the sense that every neuron in a layer has a directed edge to every neuron in the next layer, or they may only be partially connected, where some of these edges are missing.

Referring now to prior art FIG. 4, there is shown an example of a known recurrent neural network. Recurrent neural networks contain at least one loop, cycle, or feedback path. FIG. 4 shows the input neurons 410-1 to 410-N, output neurons 430 and hidden neurons 420-1, 420-2, . . . , 420-M with the same shading as in FIG. 3. Delay elements 440 are indicated with boxes labeled D. A loop in a directed graph is when there is an edge from a node to itself. Cycles in a directed graph occur when there is a path from a node to itself that contains other nodes. Feedback loops and paths typically involve delay elements D 440. Feedback allows for storage to take place in the neurons; it gives the network a sense of memory from one instance to the next. Recurrent neural networks can be divided further into discrete-time and continuous-time neural networks. Charge is applied periodically or after randomly spaced intervals at inputs at moments in time and propagates through the network, producing no output no earlier than when the charge is applied. Continuous-time neural networks model behaviors such as spikes in the network at infinitesimally small time steps. These spikes are typically modeled using a differential equation rather than as discrete events and may not have a stable solution, especially for networks that contain loops.

A neural network is modular if the computation performed by the network can be decomposed into two or more subsystems that operate on distinct inputs without communication. The outputs of these modules are then combined to form the outputs of the network. A known modular neural network may be one of a recurrent neural network or a feed-forward neural network or other artificial neural network.

Neurons in neural networks are the information processing units of the network. Neurons usually accumulate, combine, or sum signals they receive from their connections, and an activation function is applied to the result. A neuron in the network is said to fire if the output value is non-zero. Several different activation functions are commonly used. There may be a threshold function when the charge reaches a threshold value, a piecewise-linear function sometimes called saturation of a neuron and a sigmoid function related to the slope of increase of charge.

Training in a neural network has canonically meant changing the weights of the connections and/or the threshold values. Relatively recently, training has also referred to changes in the architecture of the network. Neural networks with training algorithms that cannot change the architecture of networks may be considered fixed-structure. Similarly, networks with training algorithms that can change the architecture may be considered variable-structure.

There are two main methods of training: gradient-based methods and evolutionary methods. Back-propagation is the most widely used algorithm for training neural networks in a supervised way. The algorithm is supervised because it requires a set of inputs and their corresponding outputs, called a training set. Back-propagation has two distinct phases: a forward pass and a backward pass. In the forward pass, input signals are propagated through the network, to produce an output. This output is compared with the expected output, producing an error. The error signals are then propagated backwards through the network, where the weights of the networks are adjusted in order to minimize the mean-squared error. Back propagation is a gradient-based optimization technique. It makes use of the gradient of an error function, evaluated using a training data set, with respect to the weights in the network. That is, back propagation uses the gradient of an error to determine how the weights in the network should be changed to reduce the error.

One of the known limitations of back propagation and other supervised learning algorithms is that they typically do not scale well. Gradient-based optimization algorithms have several known limitations as well. Because the weights are changed so that the error follows the steepest direction (in the space of weights) of descent, the results of the optimization algorithm depend largely on the initial starting point. If the initial starting point is located near local optima and far away from the global optimum, the back-propagation algorithm will likely converge to one of the local optima. This is a drawback for the back propagation algorithm because complex systems often have many local optima with significantly different (poorer) performance than a global optimum.

Another known type of training is Hebbian learning. Hebbian learning is analogous to long-term potentiation (LTP) and long-term depression (LTD) that occurs in the brain. In LTP, if the firing of one neuron occurs before the firing of a receiving neuron, then the synapse between these two is strengthened. That is, in LTP, the possibility of a causal relationship between the two neurons (i.e. that the firing of one directly leads to the firing of another), influences how synaptic changes are made. In LTD, the strength of the synapse is decreased when the firing of one neuron does not lead to the firing of its connected neurons, or when the firing of one neuron occurs while the receiving neuron is in a refractory state or has recently fired. In LTD, the possibility of a non-causal relationship between the two neurons influences how synaptic changes are made. For example, if a receiving neuron fired immediately prior to the firing of a transmitting neuron, it may be appropriate to decrease the strength of the synapse.

There are four characteristics of Hebbian synapses. Modifications to a Hebbian synapse depend heavily on time in that increases are made if neurons are activated at the same time, and decreases are made if two neurons are activated at different times. All information required to determine if a change to a Hebbian synapse should be made is local information. That is, the only information required to know if a synapse should change is the activities of the neurons that are connected by that synapse. Changes in the weight of a Hebbian synapse are determined by the firing patterns of the two neurons connected by the weight. Lastly, an increase in the strength of the synapse is caused by the conjunction of presynaptic and postsynaptic activity. Hebbian learning has been observed in biological neural networks. However, applying learning in biological systems to development of learning methods in artificial neural networks is significantly more complicated than these four characteristics imply.

So-called evolutionary algorithms are presently surpassing known, more conventional artificial network architectures. The evolution of the structure of the brain and evolution within the brain can be categorized in four forms. First, at the highest level, there is evolution via specification, and the brain structure in particular, which has occurred over millions of years. This long-term evolution has affected every aspect of the brain, but most notably, it is the level of evolution where the gross structure of the brain has developed. Following typical evolutionary theory, the complex structures from the human brain evolved from simpler structures that underwent three evolutionary mechanisms: mutation, the introduction of new structures or pieces of structures; recombination, the combination or re-use of existing structures in novel ways; and natural selection, the dying off of unsuccessful structures.

The general structure of the brain does not differ greatly from person to person; there are certain parts of the brain that are present in nearly every individual, though as the evolution of species has occurred these structures have become more complex. These are the types of structures that are of concern at the level of long-term evolution.

A shorter term evolution of the brain, what will be referred to in this work as moderate-term evolution, has been recently discovered. This evolution, referred to as epigenesis, also affects the structure of the brain, but at a finer level. Epigenesis is caused by modifications to the structure of proteins that regulate the transcription of genes; these modifications are often caused by the environment, but unlike other environmental effects, these modifications can be inherited by future generations through methylation of DNA. The modifications can lead to changes in the structure of the brain and thus far, have been seen to primarily affect the social and affective aspects of the brain.

The evolution (or perhaps more aptly, development and adaptation) that occurs within a single human's brain over the course of a lifetime, from conception through adulthood, will be referred to in this work as short-term evolution. The morphology of the brain is shaped partly through genetics, influenced by both long-term and moderate-term evolution, but also through experience (or by environmental effects). Neurons proliferate and die over the course of an individual's development. One of the factors that affects the formation and survival of neurons in this stage is the way connections are formed, that is, the types of neurons that a particular neuron's axon connects during development. The connections of a neuron affect the way that neuron behaves and operates in the future, and these connections are initially determined during this short-term evolutionary stage. An example of this type of evolution is found in London taxi drivers who have been found to develop significant brain areas for storing road maps of London.

There is a certain amount of plasticity during development that allows an individual to adapt the different parts of the brain (determined by long-term evolution) to his or her particular role. There are certain portions of the brain, such as the neocortex, in which the local structure (i.e. connection strengths) appears to mostly depend on the environment, rather than genetics.

Another major structural aspect of the brain that is evolved or developed over the course of single person's lifetime is myelination. Myelination affects the efficiency and rapidity of transmissions of signals in the brain. Myelination in humans continues well into the second decade of life.

Finally, very short-term evolution (development or learning, in this case) occurs on a day-to-day basis in the brain. This evolution affects synapses; this type of evolution is what is typically referred to as plasticity in the brain. There are four known major types of synaptic plasticity: long-term potentiation, long-term depression, sensitization, and axonal sprouting and formation of new synapses. Long-term potentiation and long-term depression were discussed above within the context of Hebb's rule. Long-term potentiation (LTP) is a permanent or semi-permanent change in the way a neuron fires and is caused by repeated activation with stimulation; it is associated with memory in the brain. Long-term depression (LTD) refers to any form of depression in synaptic transmission, such as the lowering of signal transmission efficacy. Long-term potentiation (LTP) occurs only when a synapse is active, but long-term depression can occur whether a synapse is active or inactive.

Sensitization refers to enhancement of a response as a result of applying a novel stimulus. Finally, axons can sprout, both during initial formation and after transection, in the brain. Axon sprouting occurs most commonly during neonatal development, but it also can occur in adulthood.

Evolutionary algorithms are optimization algorithms that are often used in large, complex state spaces. Biological evolution is a method for searching a huge number of possibilities for solutions, where solutions are the organisms themselves. The biological inspiration of evolutionary algorithms is described in Flake's "The Computational Beauty of Nature" as follows:

Adaptation=Variation+Selection+Heredity.

In evolutionary algorithms, a population of potential solutions is maintained. The members of the population are usually distinct and maintain variety. Evolutionary algorithms are inherently random, and the random influences contribute to the variety in the population. Selection is perhaps the most important component of the formula given above. Selection refers to the concept of "survival of the fittest." For evolutionary algorithms, some concept of fitness must exist, where fitness is typically a function or algorithm mapping members of the population to numerical values. It is worth noting that the fitness function can be based on simulated values, so it may generate different value each time it is applied to a member of the population. The fitness of a member of a population should represent the relative ability of that member of the population to perform a particular task. The fittest members of the population are those that are most likely selected to reproduce and express traits that are kept over multiple generations. Members of the population that are the least fit are those that are more likely to be allowed to die off. Heredity is emulated in evolutionary algorithms by producing "offspring" from existing members of a population. The offspring can be produced in a variety of algorithm-specific ways. The sequence of typical operations for producing offspring are reproduction, crossover and mutation.

For reproduction, one or more relatively fit members of the population may be selected to reproduce. Members of the population that have a higher fitness level may be more likely to have offspring in the next generation of the population. The selection of these members of the population can be done in a variety of ways. One of the ways this is done is using Roulette selection. In Roulette selection, a member of the population is randomly selected, where the probability that a given member of the population is selected is based on that population member's fitness. That is, if a member has a high fitness, it is more likely to be selected. Another selection algorithm is tournament selection. In tournament selection, a fixed percentage of the population is randomly selected. From that smaller group, the member with the highest fitness is selected. The percentage selected from the original population is a parameter of this method. For example, if you select 100 percent of the population to be this parameter, then the fittest member of the population would always be selected. However, if you had a population size of 100 and selected one percent of the population, then the selection would be entirely random (i.e. not based on fitness at all).

In crossover, attributes of two or more members of the population are combined to form a new member of the population. Finally, mutation can occur, in which some attribute of the new member is randomly changed in some way. Different types of mutations can be employed, depending upon the complexity of the representation of each member of the population. Both crossover and mutation have associated rates in an evolutionary algorithm. The crossover rate is the percentage of time in which selected members of the parent population are crossed over or combined to produce members of the child population, whereas the mutation rate is the rate at which members of the parent population are mutated to produce members of the child population. Assuming neither of these rates is 1, there may be some propagation of identical members of the parent population to the child population.

Neuroevolution algorithms use evolutionary algorithms to train neural networks. The first neuroevolution algorithms that were developed only evolved the strength of the connections between the neurons; they did not affect the structure by adding or deleting connections or neurons. They only dealt with one form of evolution described above: very short-term evolution.

The training of the connection weights in neural networks is typically formulated as an optimization problem. In particular, some error is minimized, or equivalently, a measure of performance or a goal is maximized. These approaches are equivalent because if f(x) is an error function, then 1/f(x) and −f(x) are suitable candidates for goal functions, and vice versa. The error used can be the mean squared error between the actual output and the expected output in supervised learning or the temporal difference error as used in reinforcement learning. Another example goal function is the length of time of successful operation. The weights of the networks are then trained using algorithms such as back propagation or conjugate gradient. These algorithms rely on gradient-based optimization algorithms using steepest or gradient related descent directions. There are many drawbacks to using these gradient-based optimization algorithms. In particular, gradient-based algorithms rely on the differentiability of error or goal functions, and they are likely to converge to local optima.

Evolutionary algorithms had been applied in the field of optimization to similarly complex problems, as they are less likely to become trapped in non-optimal solutions. It was a natural extension to apply evolutionary algorithms to weight training in neural networks, as this problem can be formulated as an optimization problem through which an error is minimized. Xin Yao reviews (to date) works using evolutionary algorithms (EA) to evolve/train artificial neural networks (ANNs), including using EAs to find weights, structure, learning rules, and input features in his "Evolving Artificial Neural Networks," *Proceedings of the IEEE*, Vol. 97, No. 9, pp. 1423-1447, September 1999. Yao cites results that indicate the combination of an EA and an ANN result in better systems than EAs or ANNs in isolation. Yao presents a thorough overview of algorithms that use evolutionary algorithms to train the weights of neural networks in "Evolving Artificial Neural Network Ensembles," *IEEE Computational Intelligence Magazine*, pp. 31-42, 2008. Yao notes four advantages of evolutionary algorithms to gradient-based algorithms. First, evolutionary algorithms do not depend on gradient information, which may be unavailable or difficult to calculate. Evolutionary algorithms can be applied to any neural network architecture, whereas gradient-based algorithms have to be adapted for different architectures. Evolutionary algorithms are much less sensitive to initial conditions. Evolutionary algorithms always search for global optima, rather than local optima. It is also important to note that evolutionary algorithms typically rely on a fitness function, rather than an error. This fitness function can often be easily translated to reinforcement learning problems, where the fitness function is the reward received. As noted previously, however, goal, or fitness, functions can be used to determine error functions, and vice versa. The most straightforward way to do this is to reverse the sign.

Many known evolutionary algorithms deal with only one form of evolution: very short-term evolution. For this type of evolution, the structure of the network is fixed. The structure of the network includes the general architecture (i.e. feed-forward, recurrent, etc.), the number and layout of neurons (i.e. how many neurons should be included in a particular layer), and the number and nature of the connections (i.e. how the neurons should be connected). For these types of algorithms, the structure of the neural network is mostly determined via experimentation. That is, a certain structure is tested, and if that structure does not work, more neurons or connections are added manually, increasing the complexity, until the network is able to handle the problem. This requires significant hand-tuning by the experimenter/researcher. Knowledge about the problem can be applied and intuition developed to decide what sort of structure is required by certain problems. For each problem, a new structure needs to be determined and the selection of this structure relies entirely upon the knowledge of the structure designer. Networks with and without bias parameters and networks with different numbers of hidden neurons perform very differently. Because the structure has such a large effect on the efficacy of the network, an algorithm that learns what structure is needed to solve a particular problem is much more attractive than an algorithm that relies on prior knowledge or hand-tuning to design a structure. Constructive and destructive algorithms are algorithms that attempt to deal with this drawback. Both constructive and destructive algorithms attempt to learn a network structure, rather than relying on the trial and error approach. Constructive algorithms start with very small networks and increase their size by adding neurons and connections as needed for a particular problem. Destructive algorithms such as pruning begin with overly complex networks. Connections and neurons are then deleted to yield a minimal structure. These constructive and destructive algorithms would seem to solve the problem of finding a neural network architecture to use. However, there is a fundamental issue with these algorithms. Constructive and destructive algorithms follow strict sets of rules; for example, a constructive algorithm may only be able to add a single neuron at a time to a hidden layer. These algorithms therefore only explore a strict subset of possible architectures.

There are several drawbacks to using conventional evolutionary algorithms. Although the final overall solution may be more optimal than the solution reached by a gradient-based algorithm, evolutionary algorithms typically take longer to find a solution. Applying evolutionary algorithms to neural networks in particular comes with a variety of issues. Important factors include how to represent the networks in the population, how to measure performance and how to create offspring in a population. Evolutionary algorithms usually work with strings of real or binary numbers. There has to be a performance metric to gauge how "fit" a member of the population is. Creating offspring is usually done through mutation, crossover (recombination) or both.

Representations of a network need to maintain a link to the functionality of the network; otherwise, operations such as crossover will have no meaning. Performance is a key metric and is a problem-specific issue. For example, supervised learning problems have an associated error, which would need to be converted into an appropriate fitness function and associated value, while reinforcement learning problems have associated rewards, which would also need to be converted to an appropriate fitness function and have an associated fitness value. The mechanisms of offspring creation are usually closely related to the representation of the networks in populations.

If a network is not performing well enough using just back-propagation (i.e. the error between the expected and produced value has not lowered significantly), simulated annealing can be used. Finally, if it is still not performing well, the architecture can be mutated. Yao referenced above (and Liu) used this approach to attempt to reduce the computational cost of the evolutionary algorithm. They successfully apply their algorithm to several parity tasks. This approach is similar to the proposed hierarchical evolutionary strategy discussed above, in that different types of evolution (very short term, short term, and moderate term) are tried. In particular, the combination of a genetic algorithm at a higher level and another algorithm, such as simulated annealing, numerical optimization methods such as non-linear programming, gradient, generalized gradient, and/or Newton's method, at a lower level can be used.

Montana and Davis in "Training Feedforward Neural Networks Using Genetic Algorithms," *Machine Learning*, pp. 762-767, 1989 use genetic algorithms to evolve the weights in a feed-forward neural network. They represent their networks as a list of real numbers and use mutation, crossover and gradient operators to create offspring. They successfully apply their algorithm to classification of sonar data, compare to back-propagation and incorporate domain-specific knowledge. However, their application to some real-world problems is hampered by the lack of a training algorithm for finding an optimal set of weights in a relatively short time.

D. B. Fogel et al. in "Evolving Neural Networks," *Biological Cybernetics* 63, pp. 487-493, 1990, use genetic algorithms (GA) to evolve the weights in a feed-forward neural network, but also note that GAs will also work for other models, such as recurrent neural networks. They represent their networks as a list of real numbers and use only mutation to create offspring. They apply their algorithm to exclusive-or and a blending problem and compare to back-propagation, with favorable results.

Xin Yao and Yong Liu introduce an evolutionary system called EpNet for evolving the architecture and weights of feed-forward artificial neural networks in "A New Evolutionary System for Evolving Artificial Neural Networks," *IEEE Transactions on Neural Networks*, 8, pp. 694-713, 1997. Yao and Liu attempt to maintain a behavioral link between parent and child by using node splitting rather than adding a fully connected node to a layer. EPNet also encourages simplicity in the network by always testing to see if a deletion will improve the network before testing an addition. They applied EPNet successfully to parity problems, medical diagnosis problems and time series prediction problems. They found that their networks generalized better than other networks developed or trained using other methods. This is one of the reasons a neuroevolution approach was selected for an embodiment of the present invention.

Yao and Liu introduce five mutation operations that, again, are chosen in succession to maintain simpler networks if possible. The five mutation operators they introduce (given in the order they are tried) are: hybrid training (train using a modified back propagation algorithm), neuron deletion, connection deletion, connection addition, and neuron addition.

Dario Floreano et al. in "Neuroevolution: from architectures to learning," *Evol. Intel.* 1, pp. 47-62, 2008, apply artificial neural networks to many real-world problems ranging from pattern classification to robot control. A generic architecture shown in their FIG. 1 is similar to that depicted in FIG. 3 wherein the external environment is connected to input neurons and output units impact the external environment. They describe a continuous-time recurrent neural network or CTRNN. These CTRNN's represent a first approximation of the time-dependent processes that occur at the membrane of biological neurons.

Randall D. Beer and J. C. Gallagher in "Evolving Dynamical Neural Networks for Adaptive Behavior," *Adaptive Behavior*, pp. 91-122, 1992, use evolutionary algorithms (EA) to train continuous-time recurrent neural networks (CTRNNs). They use dynamical parameter encoding to encode chromosome representing the network and use both crossover and mutation operators. They apply their CTRNNs to a food-finding task and a locomotion task (with six-legged agents).

A. P. Wieland in "Evolving Neural Network Controllers for Unstable Systems," *Neural Networks*, 2, pp. 667-673, July, 1991, uses a recurrent neural network model that learns weights and connections between neurons. A binary representation is used to represent the network, and mutation, crossover, and inversion operations are used to produce offspring. This method is applied to variations on the pole balancing problem (single pole, double pole, jointed pole, and two-legged walker).

S. Dominic et al. in "Genetic Reinforcement Learning for Neural Networks," *Neural Networks*, 2, pp. 71-76, 1991, compare genetic algorithms to reinforcement learning techniques. They use a feed-forward neural network, and real-valued strings are used to represent the networks. They apply their network and algorithm to the pole balancing problem and compare their results to a reinforcement learning method (Adaptive Critic Heuristic).

K. Stanley and R. Miikkulainen in "Evolving neural networks through augmenting topologies," *Evolutionary Computation*, 10(2):99-127, 2002, introduce Neuroevolution of Augmenting Topologies (NEAT), which has several innovations, including speciation to protect structural innovation, global innovation numbers to do historical tracking of network structure and help avoid the competing conventions problem, and makes use of incremental growth to avoid unneeded complexity in the networks. NEAT is applied to exclusive-or and to two pole balancing problems (with and without velocities). They demonstrate that NEAT performs better than other neuroevolution methods on these tasks and demonstrate that the improvement in performance is due to those innovations.

K. Stanley, et al. in "Evolving adaptive neural networks with and without adaptive synapses," *Evolutionary Computation*, 2003, CEC '03, The 2003 Congress on, 4: 2557-2564, 2003, augment NEAT by including adaption of learning rules (such as local Hebbian learning rules) for each connection as part of the evolution. This allows for adaptation of networks to changes in the environment and is related to the ability to the network to do real-time learning. They apply this version of NEAT to a dangerous foraging example.

Jeff Hawkins et al. in "Sequence memory for prediction, inference and behavior," *Phil. Trans. Royal Soc. B*, pp. 1203-1209, 2009, describe a mechanism for storing sequences of patterns necessary for making predictions, recognizing time-based patterns and generating behavior. They suggest that the ability to store and recall time-based sequences is probably a key attribute of many, if not all, cortical areas. They propose that the neocortex may be modeled as a hierarchy of memory regions, each of which learns and recalls sequences.

Artificial neural networks are known implemented in "hardware" as may be distinguished from more "software" embodiments. For example, Glackin et al. in "A Novel Approach for the Implementation of Large Scale Spiking Neural Networks on FPGA Hardware," *IWANN* 2005, LNCS 3512, pp. 552-563, 2005, implemented a large scale spiking neural network on field programmable gate array (FPGA) hardware. A neuron, synapse, and spike timing dependent plasticity (STDP) blocks are implemented in FPGA logic, and neural network data are held in SRAM that is external to the FPGA device. Synapse weights are determined by spike timing dependent plasticity (STDP).

In 2007, Cassidy et al. in "FPGA Based Silicon Spiking Neural Array," *Biomedical Circuits and Systems Conference (BIOCAS 2007)*, pp. 75-78, IEEE, 2007, present a FPGA based array of Leaky-Integrate and Fire (LIF) artificial neurons. Their neurons and synapses were fixed, and each synapse supported a "single" event and a delay function associated with the event. The synapses were able to implement STDP.

In U.S. Pat. No. 7,533,071, entitled "Neural Modeling and Brain-based Devices Using Special Purpose Processor" and issued to Snook on May 12, 2009, discloses a further FPGA hardware embodiment. Snook uses a special purpose processor and FPGAs to model a large number of neural elements. Each core of the FPGA could do presynaptic, postsynaptic, and plasticity calculations in parallel. It could also implement multiple neural elements of the neural model. The network was used to control a robot.

Sharp et al. in "Power-efficient simulation of detailed cortical microcircuits on SpiNNaker," *Journal of Neuroscience Methods*, 201, pp. 110-118, 2012 simulate an anatomically-inspired cortical microcircuit of ten thousand neurons and four million synapses using four SpiNNaker chips and less than two watts. The neuron model was very basic but consumed little power. Each chip consisted of 18 homogeneous processors.

It is known to utilize or implement central pattern generators with artificial neural networks. M. Anthony Lewis et al. in "Control of a robot leg with an adaptive a(nalog)VLSI CPG chip," *Neurocomputing*, 38-40, 2001, pp. 1409-1421 constructed an adaptive central pattern generator (CPG) in an analog VLSI chip, and uses the chip to control a running robot leg. A pacemaker neuron is used to control the firing of two motor neurons. Sensors are excited and inhibited the pacemaker, allowing the robot to adapt to changing conditions.

Thereafter, M. Anthony Lewis et al. in "CPG Design Using Inhibitory Networks," *Proc. of the 2005 IEEE International Conference on Robotics and Automation*, (ICRA 2005), pp. 3682-3687, 2005, implemented CPGs that are designed and optimized manually. A four-neuron, mutual inhibitory network forms the basic coordinating pattern for locomotion. This network then inhibited an eight-neuron network used to drive patterned movement.

It is also known to utilize analog circuitry for the construction of artificial neural networks. Simon Friedmann et al. in "Reward-based learning under hardware constraints— using a RISC processor embedded in a neuromorphic substrate," *Frontiers in Neuroscience*, 7, p. 160, 2013 proposed and analyzed in simulations a flexible method of implementing spike time dependent plasticity (STDP) in a single layer network on a wafer-scale, accelerated neuromorphic hardware system. Flexibility was achieved by embedding a general-purpose processor dedicated to plasticity into the wafer. It was possible to flexibly switch between synaptic learning rules or use different ones in parallel for different synapses.

U.S. Pat. No. 8,311,965 entitled "Area Efficient Neuromorphic Circuits Using Field Effect Transistors and Variable Resistance Material" issued to Breitwisch et al., Nov. 13, 2012, provides details for analog neuromorphic circuits using field effect transistors. Manually programmable resistances are implemented using phase change material.

U. S. Published Patent App. No. 2012/0109863 entitled "Canonical Spiking Neuron Network for Spatiotemporal Associative Memory," on May 3, 2012, to Esser et al. presents a layered neural net of electronic neurons configured to detect the presence of a spatiotemporal pattern in a real-time data stream, and extract the spatiotemporal pattern. The plurality of electronic neurons stored the spatiotemporal pattern using learning rules (STDP). Upon being presented with a version of the spatiotemporal pattern, they retrieved the stored spatiotemporal pattern.

U.S. Pat. No. 8,600,919 entitled "Circuits and Methods Representative of Spike Timing Dependent Plasticity of Neurons," to Poon et al., Dec. 3, 2012, describes a circuit and a method that could emulate STDP in a way that closely replicated biochemical processes, that could emulate all of the different types of STDP, and that could provide a relationship between the Bienenstock-Cooper-Munro rule and STDP.

U. S. Published Patent App. 2009/0292661 entitled "Compact Circuits and Adaptation Techniques for Implementing Adaptive Neurons and Synapses with Spike Timing Dependent Plasticity (STDP)" on Nov. 26, 2009, to Hass implements STDP using a simple analog circuit.

U.S. Pat. No. 8,510,239 entitled "Compact Cognitive Synaptic Computing Circuits with Crossbar Arrays Spatially in a Staggered Pattern" issued to Dharmendra S. Modha, Aug. 13, 2013, implements STDP using electronic neurons interconnected in a compact crossbar array network. Neurons could be implemented to include a "leak" function. The invention could be realized in an entirely hardware form, an entirely software form, or a hybrid software/hardware form.

U. S. Published Patent Application No. 2012/0036099 entitled "Methods and Systems for Reward-Modulated Spike-Timing-Dependent Plasticity" on Feb. 9, 2012, to Venkatraman et al. describes an area-efficient implementation of reward-modulated STDP. Three separate memories with entries for each synapse were used. The first two memories stored current and updated synapse weights, and the third was used to determine if the weight needed to be updated.

U.S. Pat. No. 8,433,665 entitled "Methods and Systems for Three-Memristor Synapse with STDP and Dopamine Signaling" issued to Tang et al., Apr. 30, 2013, proposes implementation of a three-memristor synapse where an adjustment of synaptic strength is based on Spike-Timing-Dependent Plasticity (STDP) with dopamine signaling. One memristor could be utilized for long-term potentiation (LTP), another for long-term depression (LTD), and the third as a synaptic connection between a pair of neurons with a variable strength.

U.S. Pat. No. 8,515,885 entitled "Neuromorphic and Synaptronic Spiking Neural Network with Synaptic Weights Learned Using Simulation" issued to Modha, Aug. 20, 2013, used computer simulation to determine synaptic weights which were loaded onto chips. Simulation was abstract and could be done using spike-timing dependent plasticity (STDP) or reinforcement learning. External learning allowed for small, efficient neuromorphic hardware systems.

U. S. Published Patent App. No. 2013/0073497 entitled "Neuromorphic Event-Driven Neural Computer Architecture in a Scalable Neural Network" on Mar. 21, 2013, to Filipp Akopyan et al. presents a spike event driven network where axons are connected to neurons by a synapse array. It uses a scheduler to deliver spike events to axons. Each neuron maintains a STDP variable that encodes the time of the most recent fire. It is used to implement LTP/LTD.

B. V. Benjamin et al. in "Neurogrid: A mixed-analog-digital multichip system for large-scale neural simulations." *Proceedings of the IEEE,* 102, pp. 699-716, 2014 created Neurogrid, an entirely clockless system with sixteen mixed-analog-digital chips that simulated a million neurons with billions of synaptic connections in real time using sixteen Neurocores integrated on a board that consumed three watts. STDP was possible, but at a high cost to area, time, and energy efficiency.

Giacomo Indiveri et al. in "Neuromorphic silicon neuron circuits." *Frontiers in Neuroscience,* 5, 2011 described "the most common building blocks and techniques used to implement" silicon neuron circuits and "compare[d] the different design methodologies used for each silicon neuron design described, and demonstrate[d] their features with experimental results, measured from a wide range of fabricated VLSI chips."

Cassidy et al. in "Cognitive Computing Building Block: A Versatile and Efficient Digital Neuron Model for Neurosynaptic Cores," *IBM Research,* 2013, presented TrueNorth, a scalable neurosynaptic computer architecture, which used leaky integrate-and-fire neurons. The input, the state, and the output were implemented with configurable and reproducible stochasticity. The invention has four leak modes that bias the internal state dynamics, deterministic and stochastic thresholds, and six reset modes for rich finite-state behavior.

Preiss et al. in "Compass: A scalable simulator for an architecture for cognitive computing," *Proceedings of the International Conference on High Performance Computing, Networking, Storage and Analysis,* p. 54. IEEE Computer Society Press, 2012 presented Compass, a multi-threaded, parallel functional simulator of the TrueNorth architecture. It successfully simulates $10^9$ neurons and $10^{12}$ synapses at 388 times slower than real time. It is event driven, not clock driven.

WO Patent App. 2004/027704 published Apr. 1, 2004, entitled "Spiking Neural Network Device," by Dario claims a device that stores a genotypic representation of a spiking neural network. Evolutionary algorithms are used to tailor networks to be used in control systems.

Gomez et. al. in "Efficient Non-linear Control Through Neuroevolution," *Machine Learning: ECML* 2006, LNCS 4212, pp. 654-662, 2006, introduce CoSyNE, a neuroevolution method that evolves recurrent neural networks at the weight-level. Networks are represented as a vector of real-valued weights, children networks are created using crossover and mutation, and networks are co-evolved by permuting subpopulations to allow for an increase in diversity. CoSyNE is compared with a large number of reinforcement learning and neuroevolution methods on the one and two pole balancing task. In their follow-up "Accelerated Neural Evolution through Cooperatively Coevolved Synapses," *J. Mach. Learn. Res.,* 9: pp. 937-965, 2008, Gomez et al. discuss CoSyNE in detail, as well as compare it with several reinforcement learning and neuroevolution methods. This work presents results for sixteen methods in total (including CoSyNE) on one pole and two pole balancing tasks, with and without velocities provided as input. The results demonstrated that neuroevolution methods perform better than reinforcement learning methods, and that CoSyNE performed the best of the neuroevolution methods tested.

Notwithstanding the advances in evolutionary artificial network architectures and algorithms, there remains a need for an improved neuroscience-inspired network architecture which overcomes the problems exhibited by known architectures.

SUMMARY OF THE PREFERRED EMBODIMENTS

In accordance with an embodiment of a method and apparatus for constructing, using and reusing components and structures of an artificial neural network, a neuroscience-inspired dynamic artificial neural network (NIDA or a dynamic adaptive neural network array (DANNA) of basic neuron and synapse elements or combinations of substructures thereof may be constructed and then utilized to identify useful components, structure and substructures. A useful substructure of an artificial neural network, by way of example, may be an affective system, a learning algorithm, a computational network, a central pattern generator, an image recognizer and the like. For example, in a classification task such as a character recognizer which generally recognizes all characters, an artificial neural network may have implanted therein a numeric digit recognizer. Also, as artificial neural networks are constructed for tasks such as one of control, detection and classification, some network substructures may prove to be unsuccessful for performing certain sub-tasks and so extracted from a network. Some neural pathways may never be used in a special purpose artificial neural network and so, when isolated or identified as such, they may be saved as a potential useful substructure and, if recognized in a given artificial neural network for the same task, be extracted as unsuccessful. It should be noted, however, that useful substructures may cause either excitation or inhibition of activity elsewhere in a network or in a second network with which the structure or first network can communicate. It is therefore preferable to identify both substructures that induce a response and structures that inhibit a response as possibly useful for use, reuse and construction of artificial networks.

An embodiment of a neuroscience-inspired dynamic architecture (NIDA) and an embodiment of a dynamic adaptive neural network array (DANNA) described in U. S. patent applications incorporated herein by reference exhibit five characteristics which differentiate over the prior art. Firstly, it is desirable that a neural network structure evolve over time. Evolution over time means that the learning algorithms of the prior art may not evolve in accordance with data (events) received at input neurons compared with the evolution achieved in accordance with the present invention and the present learning algorithms disclosed herein. Secondly, it is desirable that neural networks may be embedded into a geometric space. This characteristic suggests that the present invention seeks confinement, for example, to a geometric space in a similar manner that it is believed that the human brain and its sensory inputs and outputs are confined to a geometric space. Thirdly, it is desirable that neural networks compose dynamic elements and operate on a continuous time scale. In some embodiments, a discrete time scale may be preferred, for example, for digital or discrete time unit measurement. By dynamic elements is intended the opposite of static elements such as dynamic neurons and dynamic synapses. Also, the concept of continuous time scale means an intention to differentiate from a discrete time scale or one capable of one input at a time, such as one per clock period when the clock period may be increased or decreased in length. Clearly, it is desirable if an artificial neural network is able two receive two inputs at the same time, that is, all inputs are continuously occurring and the network is continuously learning and making decisions with the expectation that the artificial neural network will adapt to its environment. Fourthly, it is desirable if useful substructures in neural network structures can be recognized and reused. That is, for example, the present invention is capable of identifying in a visualization those structures that are acting in response to a given input or continuous series of inputs. Then, theoretically, these same structures that have been identified may be stored in a database and reused to respond to a similar set of inputs. Fifthly, it is desirable if special-purpose emotion-related substructures and neurotransmitters can be incorporated into artificial neural networks. As suggested above, emotions such as fear or anger have been artificially simulated in the prior art individually but not collectively as to the collection of many emotion-related sub structures.

An artificial neural network according to an embodiment of the present invention initially comprising a two-dimensional or three-dimensional structure in space comprises input neurons, hidden neurons and output neurons connected by synapses. Synapses in embodiments of the invention encompass the concepts of axons and dendrites. In other words, "synapse" is used to describe connections between neurons. Input neurons receive stimulus (data) from the environment. Output neurons cause a result in the environment. Hidden neurons are connected by synapses between input neurons and output neurons. An exemplary DANNA may comprise, for example, two thousand five hundred elements, specifically, neurons and synapses constructed from, for example, field programmable gate arrays in a two dimensional or three dimensional spatial structure operating in real time (or intentional slowed time for neural pathway analysis). Desirably, at least one affective system may be coupled to the artificial neural network for regulating at least one parameter associated with a neuron or a synapse and, preferably, may adjust that same parameter for each impacted like element in the network, neuron or synapse. In particular, a demonstrated affective system changes the thresholds of neurons in the network, which is analogous to a neurotransmitter in the brain making neurons more or less likely to fire. Consequently, a neuroscience-inspired artificial neural network architecture (NIDA) may comprise, for example, three such networks, coupled in simulated three dimensional space. For example, a NIDA may comprise a neuroscience-inspired dynamic architecture comprising of a computational network and first and second affective networks which may provide a simulation of LTP and LTD. This embodiment may be simulated on a well-known von Newman computer processing system so as to comprise a special purpose processing system for solving problems in control (a pole balancing problem by way of example), anomaly detection (data arrival rates at a node in a data network by way of example) and classification (recognition of hand-written numbers by way of example).

Moreover, simple neuron and synapse elements have been constructed in "hardware" to build two dimensional and three dimensional artificial networks for performing the same control, anomaly detection and classification problems. Preferably, one circuit element may comprise either a neuron or a synapse (selectively). That is, a circuit element as described may be a neuron or a synapse but not both at the same time. These simple elements utilize the same parameters as those of the simulated networks. The simple circuit elements may be constructed into dynamic adaptive neural network arrays (DANNA's) having multiple levels of interconnections among neurons and synapses. Both the simulated and hardware embodiments are continuously evolving over time under the influence, for example, of the affective networks and learning.

These and other embodiments and the control, anomaly detection and classification problem solutions will be discussed in some detail in the Detailed Description section and are introduced in the Brief Description of the Drawings section which follows.

BRIEF DESCRIPTION OF THE DRAWINGS

Embodiments of a method and apparatus for predicting object properties will be discussed in the context of the following drawings wherein:

FIG. 12A shows a subset of the exemplary array of elements of FIG. 10A comprising a 3×3 block of circuit elements.

FIG. 15A shows example hand-written digits from the MNIST handwritten database and scanning of numerals by row, by column and by row and column for a classification application.

FIG. 23A shows in gray scale an example substructure, hand-designed to recognize a vertical line; FIG. 23B shows a network in gray scale comprising the hand-tooled substructure repeated many times that recognizes vertical lines in a large grid image.

These figures will be further described in the detailed description of embodiments of a NIDA/DANNA for constructing, using and reusing components and structures in an artificial network which follows.

DETAILED DESCRIPTION

Embodiments of a method and apparatus for constructing, using and reusing components and structures in a neuroscience-inspired artificial neural network in software or in the form of a dynamic adaptive neural network array (DANNA) or combinations of substructures and components thereof will be described with reference to FIGS. 1-26. One embodiment comprises one or more computational networks and may include no affective system or one or more affective systems of different complexity. An affective system may be an example of a network substructure that may be added or extracted from an artificial neural network for performing a particular task, for example, one of control, detection and classification. One embodiment of an artificial neural network built by the present invention may comprise a neuroscience-inspired dynamic architecture or combination of substructures of each of a DANNA and a NIDA or other artificial neural network known in the art.

The design of the artificial neural networks described herein draws inspiration both from biological neural networks and from traditional artificial neural networks from machine learning. It is important to note that a goal is not to directly simulate a biological network, and the simulations described herein are not intended to represent what occurs in the brain. A model of a neuron may be extremely simplified. Even with the relatively simple neural implementation used herein, complex behavior may be generated by trading off complexity of the neuron for complexity in the network.

Figure 8A:
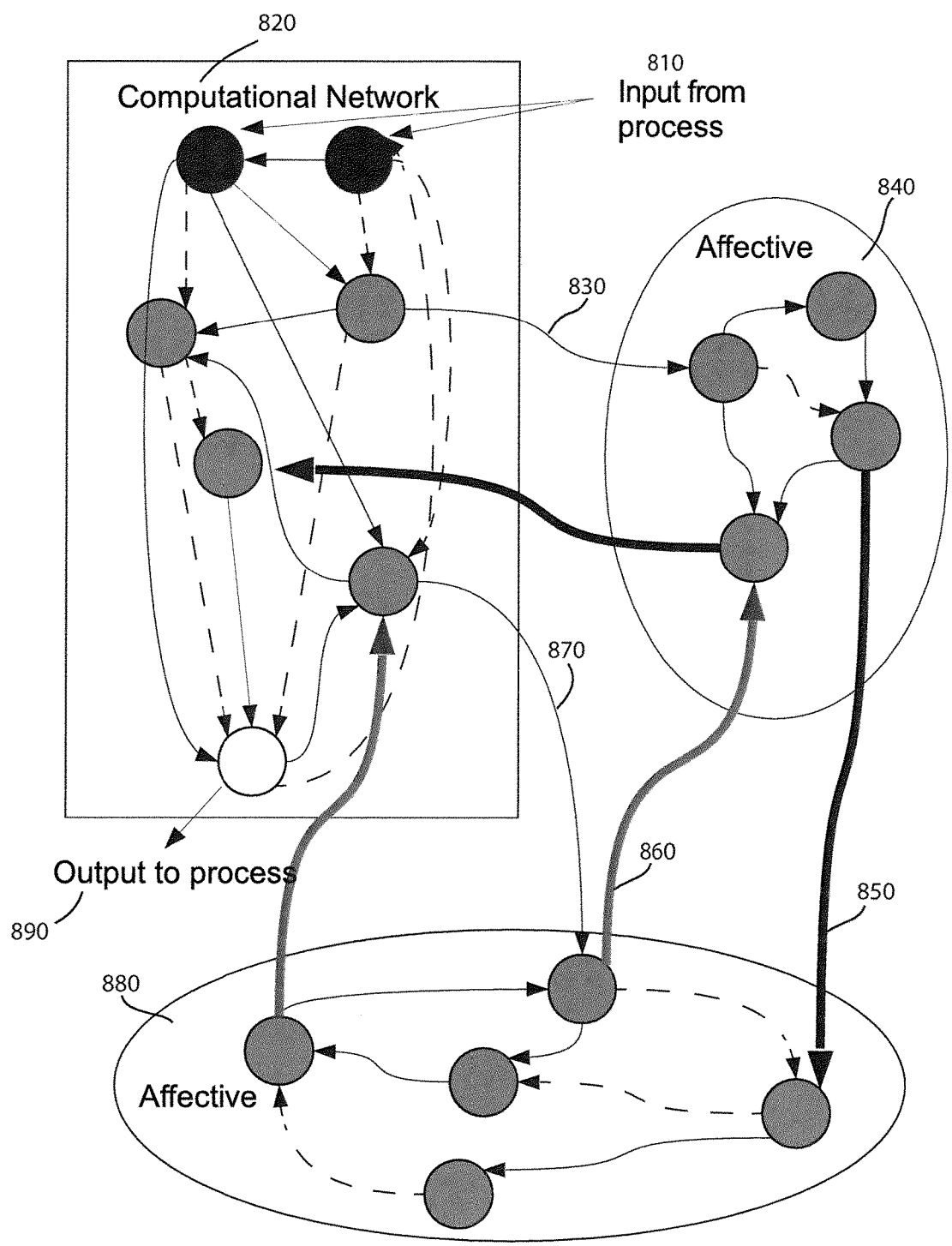
FIG. 8A shows coupled, simulated neuroscience-inspired neural networks comprising a computational network and at least one affective network (two affective networks shown).

In one implementation, each neuron is located at a point in a two-dimensional or a three-dimensional space (arrows represent synapses). Referring briefly to FIG. 8A, neurons can be input neurons 810, output neurons 890, both types, or neither type, depending on the requirements of the network. For example, an input from a process 810 is input to computational network 820 having two input neurons shown by way of example. Each neuron has an associated threshold and refractory period. In exemplary implementations, both of these values are fixed for the network (i.e., every neuron in the network has the same threshold and refractory period), but an alternate implementation would allow for selected and possibly all neurons to have different threshold and refractory period. Neurons are connected to other neurons via synapses. These synapses are directed, so each neuron has a set of synapses to other neurons and a set of synapses from other neurons. The primary actions of a neuron are changes in charge and in firing. Charge is received by a neuron from its synapses. As is the case in biological neurons, synapses may be inhibitory (negative), in which case the firing of a neuron at one end of a synapse results in a decrease in charge at the neuron at the other end of the synapse, or they may be excitatory (positive), in which case the firing of the neuron at the one end results in a increase of charge at the neuron at the other end. The charge on a neuron is accumulated until that neuron's threshold is reached.

When the threshold is reached, if the neuron is not in its refractory period, the neuron fires, and the neuron's charge is reset to zero (or neutral, as the charge may also be negative). If the neuron is within its refractory period, then, the neuron maintains its charge but does not fire. Thus, a neuron can accumulate charge during its refractory period, but it cannot fire during this period. As soon as a neuron fires, it enters its refractory period. One function of the refractory period is to place an upper limit on firing rate or frequency. This model of a neuron is inspired by the Hodgkin-Huxley model. In the present model discussed, the charge values and threshold values of the neurons may be bounded between −1 and +1.

Neuron thresholds and refractory periods, and synaptic propagation delays all may introduce dynamic behaviors in the present network (especially if these parameters are permitted to vary). Two synapses may be linked together (not shown), each having a parameter of distance or delay; their delays being additive. Unlike most proposed ANN architectures, but similar to natural neural processes, these dynamic effects are distributed throughout the present network and are directly influenced in the generated ANN's by the evolutionary optimization methods used to construct and adapt the ANN's for specific purposes.

Synapses in the implementation discussed herein are defined by the neurons they connect. Specifically, each synapse goes from one neuron to another neuron. Each synapse has a distance (delay parameter) between two neurons and a weight (or strength) of the synaptic connection. The distance (delay) between the two neurons affects how long it takes for charge to travel along the connecting synapse and the weight of the synaptic connection determines how much charge arrives at the destination neuron after the source neuron fires. Alternatively, in some embodiments, a time delay may be used instead of a distance. When delay is a parameter of a synapse, the positions of neurons are optional (not dependent on a distance). As is the case in biological neurons, synapses may be inhibitory (negative), in which case the firing of neuron at one end of the synapse results in the decrease of charge at the neuron on the other end, or they may be excitatory (positive), in which case the firing of the neuron at one end results in the increase of charge at the neuron on the other end. One network model discussed herein does not include the concept of myelination (fat growth which decreases delay); if two synapses are each of length d, then, it takes the same amount of time for charge to travel from one end of each synapse to the other. A second network model may simulate myelination using a propagation velocity parameter associated with each synapse, or selected synapses. The weight of the synaptic connection determines how much charge arrives at the second neuron after the first neuron fires.

Two actions associated with synapses are processes similar to long-term potentiation (LTP) and long-term depression (LTD). LTP and LTD occur in biological brains. It is speculated that they play a major role in learning. If charge traveling along a synapse from neuron A to neuron B causing neuron B to fire, then, the weight of that synapse increases. In one implementation discussed herein, LTD occurs at that synapse if charge is received by neuron B during its refractory period. LTP increases the weight of the synaptic connection by a fixed value (specified for the entire network or a class of synapses), and LTD decreases the weight of the synaptic connection by the same fixed value. Synapses have a refractory period associated with LTP and LTD, which prevents changes to the weights from occurring too rapidly.

It is important to note that, for many purposes, LTP and LTD could have been omitted altogether. However, a goal of the present work is to use an affective system to control or to modulate the behavior of a neural network that is learning to perform a certain task. Learning for such networks causes not only the synapse weightvalues to change, but also the structure of the network to change. To demonstrate that an affective system can, in fact, control a learning network's behavior, some form of learning is included in the network. In a simple pole balancing example discussed herein, learning is more complex because the structure of the network also changes over time. Anomaly detection and classification will be discussed herein after control applications such as solving the pole balancing problem.

The networks used for pole balancing are defined on a grid in three-dimensional space. Maximum x, y, and z (called $M_x$, $M_y$, $M_z$) magnitudes are defined below by way of example, as well as the granularity $\delta>0$ of the grid. Neurons may be located at coordinates in the grid, (x, y, z), where $-M_x \leq x \leq M_x$, $-M_y \leq x$ and $-M_z \leq z \leq +M_z$, and the values of x, y, and z may be integral multiples of the granularity $\delta$. We may alternatively define the maximum and minimum x, y and z in the network to form alternative grid shapes in two dimensional or three-dimensional space. The granularity parameter specifies how close two neurons in the grid can be. Other approaches may be used in two or three-dimension space (or over time, or another fourth dimension).

Simulations may take place at the network level and are discrete-event simulations. Networks may have associated event queues, in which different event types are specified to occur at some time in the simulation. A unit of simulation time is the amount of time it takes for charge to travel one unit in space. For example, if two neurons are connected and are located one unit apart (i.e. a neuron at (0,0,0) and a neuron at (0,0,1)) then one unit of simulation time is the amount of time required for charge to travel from one of the neurons to the other.

Five example event types are defined: addition of charge to a neuron, firing a neuron, adjustment of thresholds, an input pulse event, and a change in the desired firing rate. The addition of charge to a neuron and the firing of a neuron are internal events, which are caused by other events within the network. Input pulse events are events in which the network interacts with its environment. The adjustment of a threshold or threshold event is an interaction of the network with the simulated affective system (or systems). The change in the desired firing rate event is an interaction between the environment and the simulated affective system. Output events, in which the network gives information to the environment, can be defined for applications, such as the pole balancing application of a control category of applications discussed in the results section.

The adjustment of thresholds event type preferably applies a network-wide change to the threshold of every neuron in the network but may apply the change to only selected increased (or decreased) thresholds. The amount to change the threshold is determined by the affective system. An affective system may be constructed, used in one ANN as a substructure and reused in another. The current firing rate of the network and the desired firing rate of the network are inputs to the affective system. The output of the affective system is the amount to change the thresholds by in the network.

An affective system 840 (FIG. 8A) (or 880 of FIG. 8A) may be used and receive an input 830 (or 870) and provide an output to computational network 820 as well as provide an input 850 and receive an output 860 from a second affective system 880 which may also receive an input 870 from and provide an output to computational network 820 (which in turn provides an output to a process 890). An affective system may be determined by the following equations, which could be replaced by a second neural, or discrete event, network. Discrete events can occur at variable time periods. $f_t$ is the firing rate of the network, measured over a certain window, at time t. This is the input provided to the affective system from the network. $d_t$ is the desired firing rate at time t. This desired firing rate is provided by the environment and can be changed by a desired firing rate event. The error at time t, $e_t$, is calculated:

$$e_t = f_t - d_t. \quad (1)$$

There may be no affective system, one affective system or two or more affective systems: for example, a simple affective system 840 with two parameters and a slightly more complex affective system with three parameters. Other examples of substructures for fear may be used, for example with substructure for one of anger, hunger, seeking or bonding (or in any combination). The simple affective system may be used in some simulations and not a complex system or vice versa. Both a simple and a complex affective system may have the parameter w>0, which is the window size of the system and specifies how often the error is recalculated. In the simple affective system, the change in the threshold at time t is calculated:

$$\Delta\tau_t = \alpha e_t. \quad (2)$$

The parameter $\alpha$ is a weighting term, and the change in the threshold at each time step is proportional to the firing rate error. $\Delta\tau_t$ is the amount that every threshold (or each selected threshold) in the network is changed at time t. This result is passed back to the network, and the change is applied to all of the neurons in the network (or the selected subset); if all, since all of the neurons have the same initial threshold value of 0.5, all neurons in the network maintain the same threshold value throughout the simulation (except in the pole balancing task). The threshold is bounded to be in the interval [−1, +1], and equation (2) has no effect if it would cause either bound to be violated.

In the more complex affective system, a second parameter, $\lambda$, is added. A geometrically averaged error at time t, $E_t$ is calculated:

$$E_t = \lambda E_{t-w} + (1-\lambda)e_t. \quad (3)$$

The parameter $\lambda$ may be a decay rate. It defines how much errors at times 0 through t−1 will affect the change in the threshold at time t. With this second affective system, the change in the threshold at time t is calculated:

$$\Delta\tau_t = \alpha E_t \quad (4)$$

where, again, $\alpha$ is a weighting term. In both cases, the result $\Delta\tau$ is passed back to the network, and the change is applied to all of the neurons in the network. Note that the first and second systems are equivalent if $\lambda=0$. The same boundary logic applies as with equation (2).

A goal is to demonstrate that a simple affective system interacting with an artificial neural network can have a noticeable effect and can stabilize the average firing rate at desired levels. All networks discussed in this example (except for those trained to complete the pole balancing task) have 1000 neurons and 10,000 synapses, where $M_x = M_y = M_z = 100$. This is a relatively large artificial neural network, but compared to the human brain, this is a very small network. It is important to note, however, that we are not attempting to model a biological neural system with our artificial neural networks; our artificial neural networks are merely motivated by biology. The tasks these artificial networks are applied to are specific and well-defined. As such, they can be thought of as analogs to the small portions of the neocortex that implement specific functionalities. Networks with different numbers of neurons and synapses yield similar results, though they are not shown in this work.

The initial neuron placements in the network are random, and the distribution of the synapses is random, but with a higher likelihood of connectivity between spatially close neurons than neurons that are farther apart. In this network structure, there are 200 possible x-coordinate values, 200 possible y coordinate values and 200 possible z coordinate values, resulting in $8 \times 10^6$ possible locations for neurons in this exemplary network. A specific instance or realization of an exemplary network may have neurons at 1000 of these locations, randomly selected according to a uniform distribution, except no two neurons are allowed to occupy the same location.

A typical network may have a single input neuron that receives information from the environment. The control, for example, pole balancing network may have many input neurons. The "environment" in a setup consists of two things: pulses sent to the input neuron at, for example, exponentially-distributed random intervals, with a mean firing rate of 0.1 firings per unit time, and an input to the affective system that sets the current desired firing rate, in this example, for the aggregate of all neurons in the network. This input plays the role of a persistent external excitation used to initiate and promote firing events in the network. This is an extremely simple environment; more complex tasks have richer environments that provide meaningful information to the network and receive signals produced by the network. The affective system may monitor the behavior of the network and applies the threshold changes to the network every w (the window size) units of simulation time. For all of the tests in this example, by way of example, w=10.

All neurons in the network have a refractory period of one, which means that there is an upper limit on the firing rate of the network; since each neuron can fire at most once in a single simulated time step, the maximum firing rate of the network per time step is 1000. This assumes that the network is fully connected, which is not a requirement placed on the random initialization of the networks. There may be neurons that have no incoming synapses or neurons with no outgoing synapses, which would further limit the maximum firing rate of the network, and the network is not necessarily connected.

In preliminary experiments, the parameters of the affective system are set to be α=0.001 and w=10. The long term potentiation/long term depression refractory periods are set to be 10, and the weights are adjusted up (for LTP) and down (for LTD) by 0.001. The parameters used in a pole balancing control task are slightly different and are described in the Table 1 below.

TABLE 1

Network and Affective System Parameters

| Parameter | Value |
|---|---|
| $M_x$ | 100 |
| $M_y$ | 100 |
| $M_z$ | 100 |
| Network granularity δ | 1 |
| A | 0.001 |
| Λ | 0 |
| LTP/LTD refractory | 100 steps of simulated time |
| Amount LTP/LTD adjusted | 0.001 |
| Window size w | 20 |

Figure 8B:
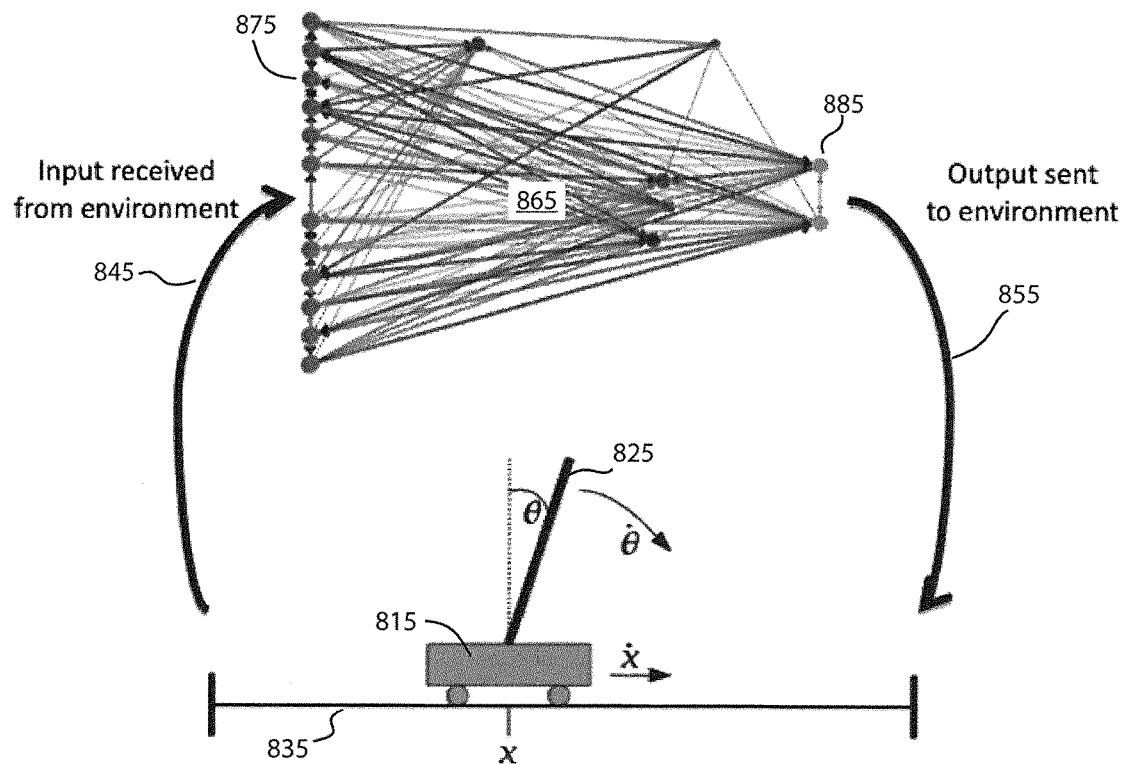
FIG. 8B shows an example of an artificial neural network constructed for solving a control application, namely, a pole balancing pattern having parameters such as location and velocity of a cart on a track and pole angle form the vertical at a given point in time.

Referring to FIG. 8B, there is shown an introduction to a pole balancing problem as an example of a control problem, and this figure will be discussed further herein having applied a neuro-science-inspired dynamic architecture (NIDA) to its solution utilizing an evolutionary algorithm. An evolutionary algorithm may be preferably used as a training algorithm for each of control, anomaly detection and classification networks. Pole balancing is an example of control. A fitness function is defined for each application, and parent networks may be selected using tournament selection as will be discussed herein. Networks for control are represented and manipulated directly in this implementation with inputs for cart 815.

The pole balancing application is a widely used benchmark problem in both the machine learning and control engineering fields and is introduced by way of FIG. 8B. In this version of the pole balancing problem, a cart 815 is assumed to be on a track 835 so that it can move in only one dimension; that is, the cart 815 can only be moved left or right. The track 835 is assumed to be finite in that the cart 815 must be kept between two points on the track 835. Attached to the cart 815 is a pole 825. The pole 825 is initially in some upright position. The goal of the pole balancing problem is to apply forces to the cart 815 in order to keep the pole 825 balanced and to keep the cart 815 between the two endpoints of the track 835. In one exemplary network implementation, the bang-bang version of the problem may be solved, where there are only three possible actions: apply a force of −10 N, apply a force of 10 N, and apply no force at all to the cart 815. The pole balancing problem is discussed in detail in the literature and the equations and parameters used are included in Table 2 below.

TABLE 2

Pole Balancing Parameters

| Parameter | Value |
|---|---|
| Cart's mass ($m_c$) | 1 kg |
| Pole's mass ($m_p$) | 0.1 kg |
| Cart length | 1 m |
| Length of pole (l) | 1 m |
| Track length | 5.8 m |
| τ | 0.02 sec |

The state of the pole balancing problem is described by four variables:
x=the position of the center of the cart on the track in meters.
ẋ=the velocity of the cart in meters/second.
θ=the angle of the pole from vertical in radians.
θ̇=the angular velocity of the pole in radians/second.
x=the position of the center of the cart on the track in meters.

Referring to FIG. 8B, the specific parameters/variables are shown with respect to cart 815 moving in a linear manner in one of two directions and where an object is to have a pole 825 be balanced on the cart 815. In this control problem, a force is applied to cart 815 and the state is updated every 0.02 seconds. The range of values for each state parameter is continuous. There are multiple ways to encode input 845 at input neurons 875 of the network 865 and decode output of output neurons 885 from the network 865 to the environment 855. The output values for this problem are fairly straightforward, since there are three possible actions (apply a force of −10 N, apply a force of 10 N, and apply no force at all to the cart 815). In both examples, this is encoded using two output neurons 885. One corresponds to −10 N and the other corresponds to 10 N. The output neuron that fires the most is the chosen action. If neither of the output neurons fires in the desired window, then no force is applied.

The inputs and outputs may be individually studied and substructures extracted therefrom. Using causality paths or once successful (or unsuccessful substructures) are identified, these may be stored for future use or repeated to improve the process of solving the control problem. Affective and computational networks may be added or subtracted as will be discussed herein as well as learning and training algorithms substituted which may be more successful.

Figure 1:
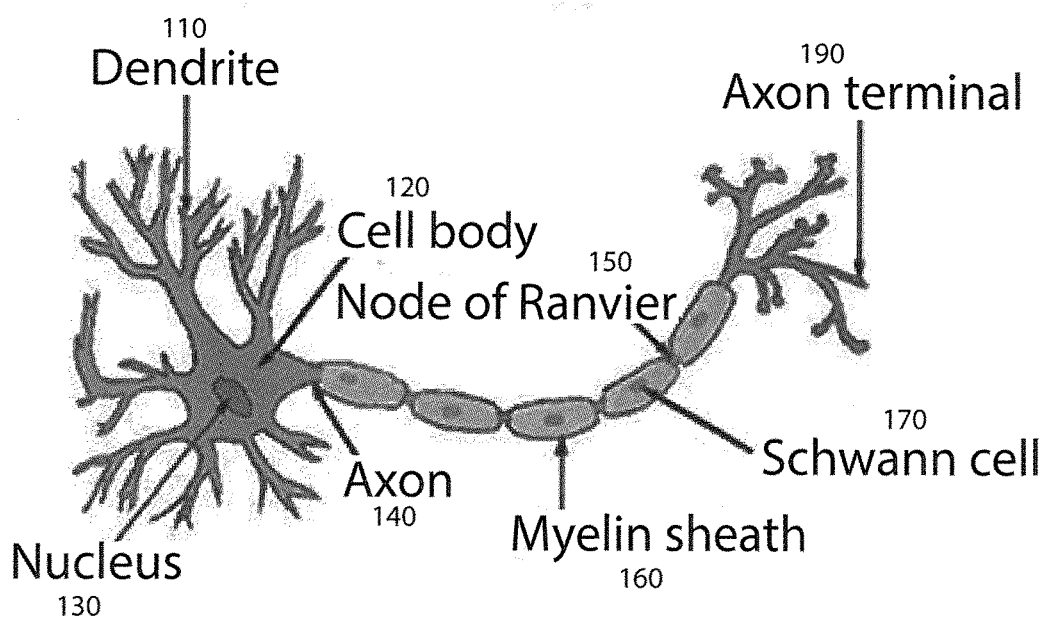
FIG. 1 is a prior art diagram showing selected features of a typical neuron and its components.
Figure 2:
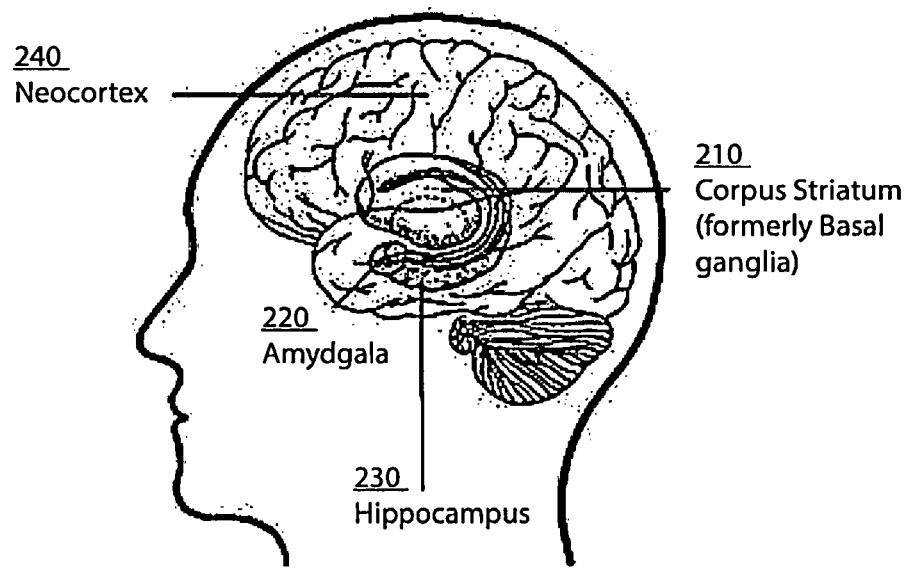
FIG. 2 is a prior art diagram of the human brain and some of its components.
Figure 3:
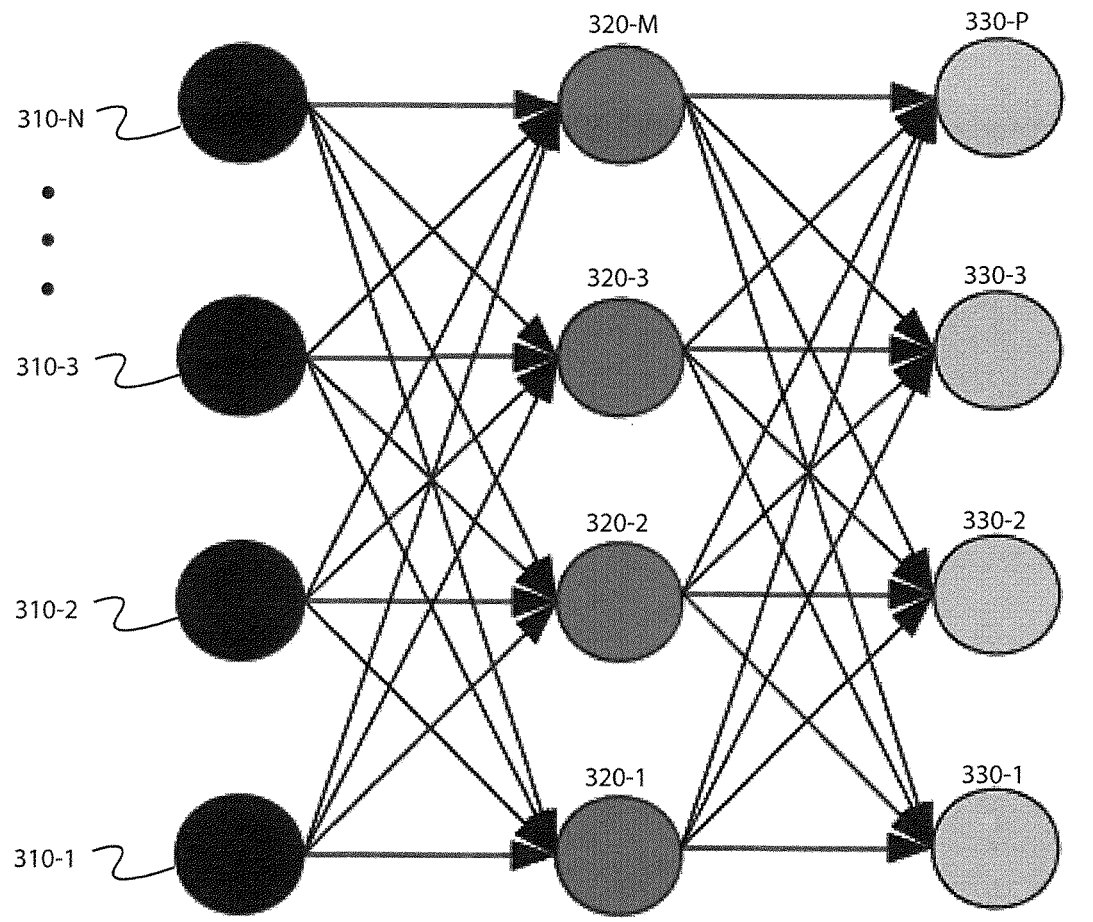
FIG. 3 is a prior art representation of a fully-connected feed-forward neural network showing input neurons, so-called hidden neurons and output neurons.
Figure 4:
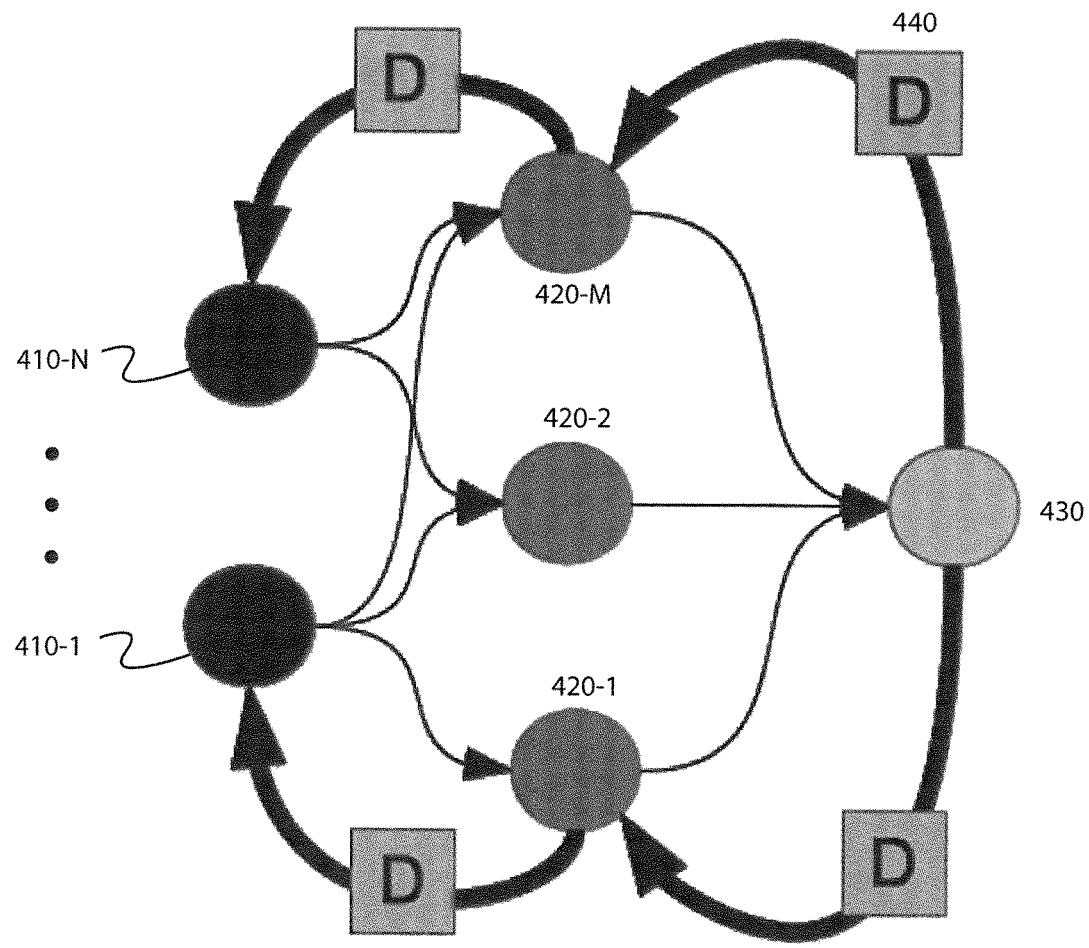
FIG. 4 is a prior art representation of a recurrent neural network with input, hidden and output neurons, the representation having delay elements labeled D.
Figure 5:
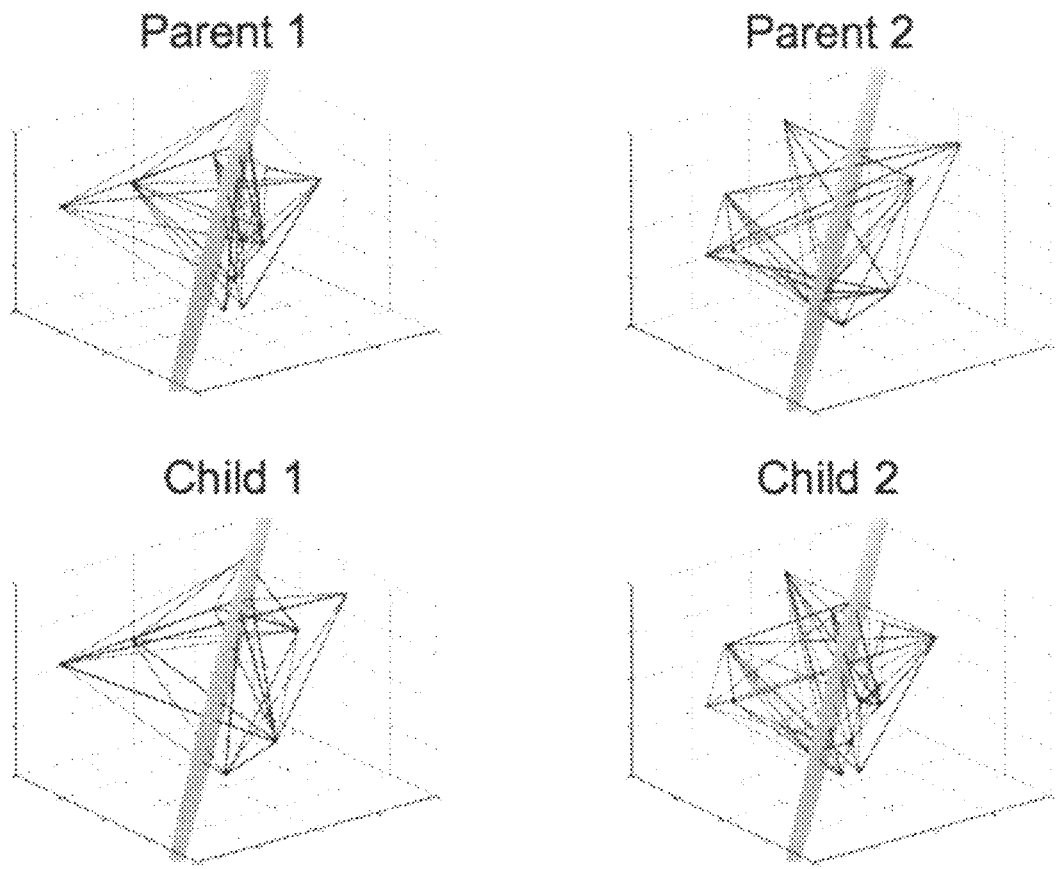
FIG. 5 is a pictorial representation of crossover with three dimensional representations of Parent 1, Parent 2, Child 1 and Child 2.
Figure 6:
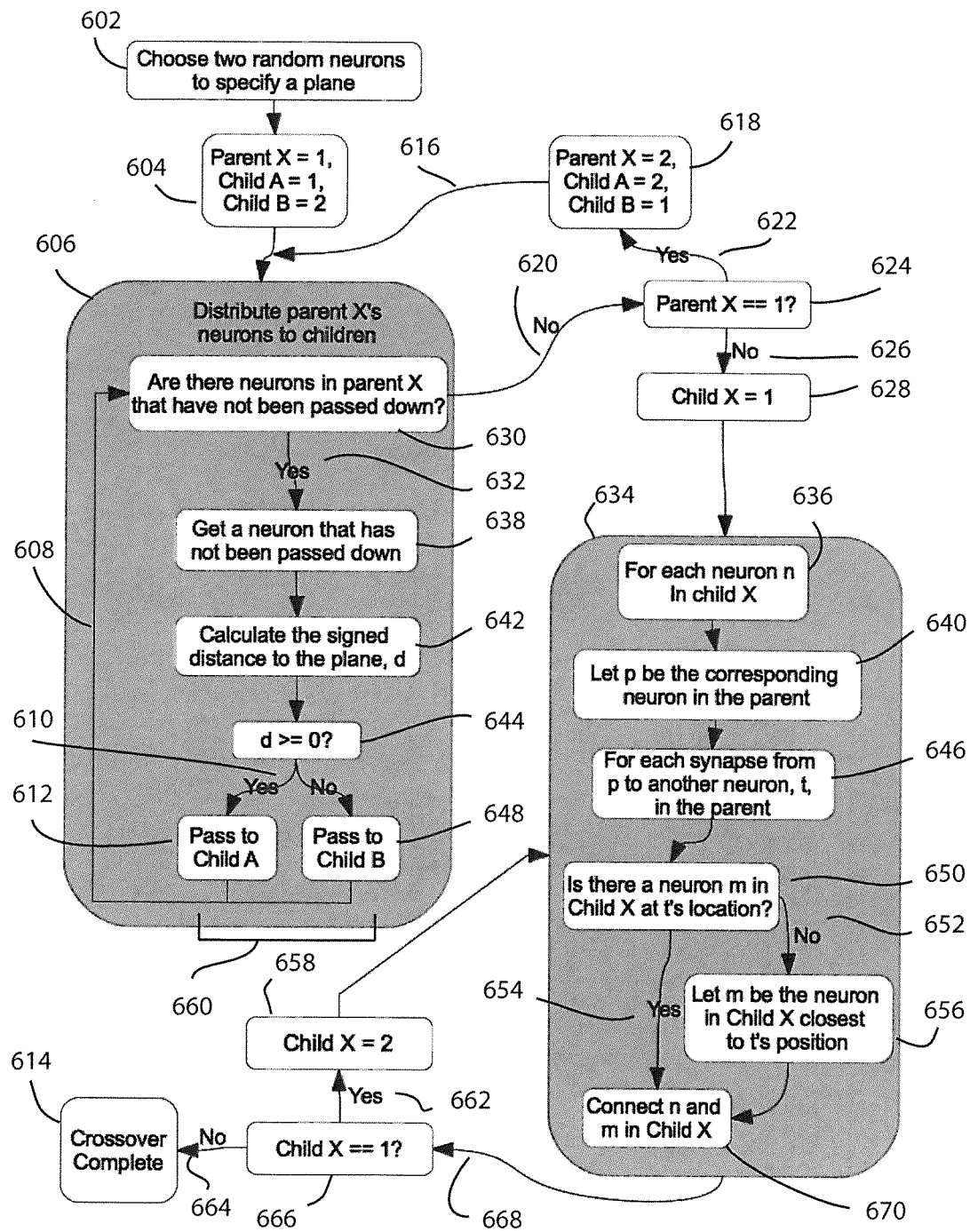
FIG. 6 is a flowchart showing a process of crossover, which is related to Parent 1, Parent 2, Child 1 and Child 2 crossover FIG. 5.

A fitness function is defined for each application (control, anomaly detection and classification), and parents may be selected using tournament selection. Networks are represented and manipulated directly in this implementation. Both crossover and mutation operations are applied with some probability to the parents selected. An example of crossover is shown in FIG. 5 and a corresponding flowchart in FIG. 6. Details about the crossover and mutation operations as they apply to our network structures without affected systems are discussed with reference to FIG. 6.

At 602, there is a choice made of two random neurons to specify a plane (for example, a point and a second vector defining a point orthogonal to the plane. At 604, let parent X be 1, child A be 1 and child B be 2. Process 606 distributes parent X's neurons to children. Step 630 asks are there neurons in parent X that have not been passed down. If Yes, at 632, a neuron is gotten that has not been passed down; otherwise, if No at 620, Parent X is set to =1 at 624. From 638, the signed distance to the plane, d, is calculated at 642. Based on d's calculation at 642, the neuron is sent to one of the two children in 660. If d is greater than or equal to 0 at 644, and so Yes at 610, then, the process passes to child A at 612, and if No to child B at 648 and the path 608 from one of 612 or 648 returns to 630; therefore, both conditions 660 are properly handled.

From 624, if Yes at 622, the parent X=2, Child A=2 and Child B=1 at 618 and by arrow 616, the process returns to process 606 to distribute parent X's neurons to children. On the other hand, if the answer is No at 626, then Child X=1 at 628 and, at 636, process 634 begins with respect to child X. For each neuron in child X, at 640 let p be the corresponding neuron in the parent. At 646, for each synapse from p to another neuron, t, in the parent, at 650, is there a neuron m in Child X at t's location at 650? If Yes at 654, then, connect n and m in Child X at 670. If No at 652, let m be the neuron in Child X closest to t's position at 656 and connect n and m in Child X at 670. From 670, 668 leads to 666 which asks is Child X=1 and if not at 664, the crossover is complete 614. If Child X is 1 at 666 and Yes is returned at 662, then Child X is set to 2 at 658 and the process for child X 634 begins again at 636.

Both crossover and mutation operations are altered slightly to compensate for the inclusion of the simple affective systems. In particular, the desired firing rate is included as part of the training. An example of a training algorithm is described by way of example with reference to FIG. 7A.

Figure 7A:
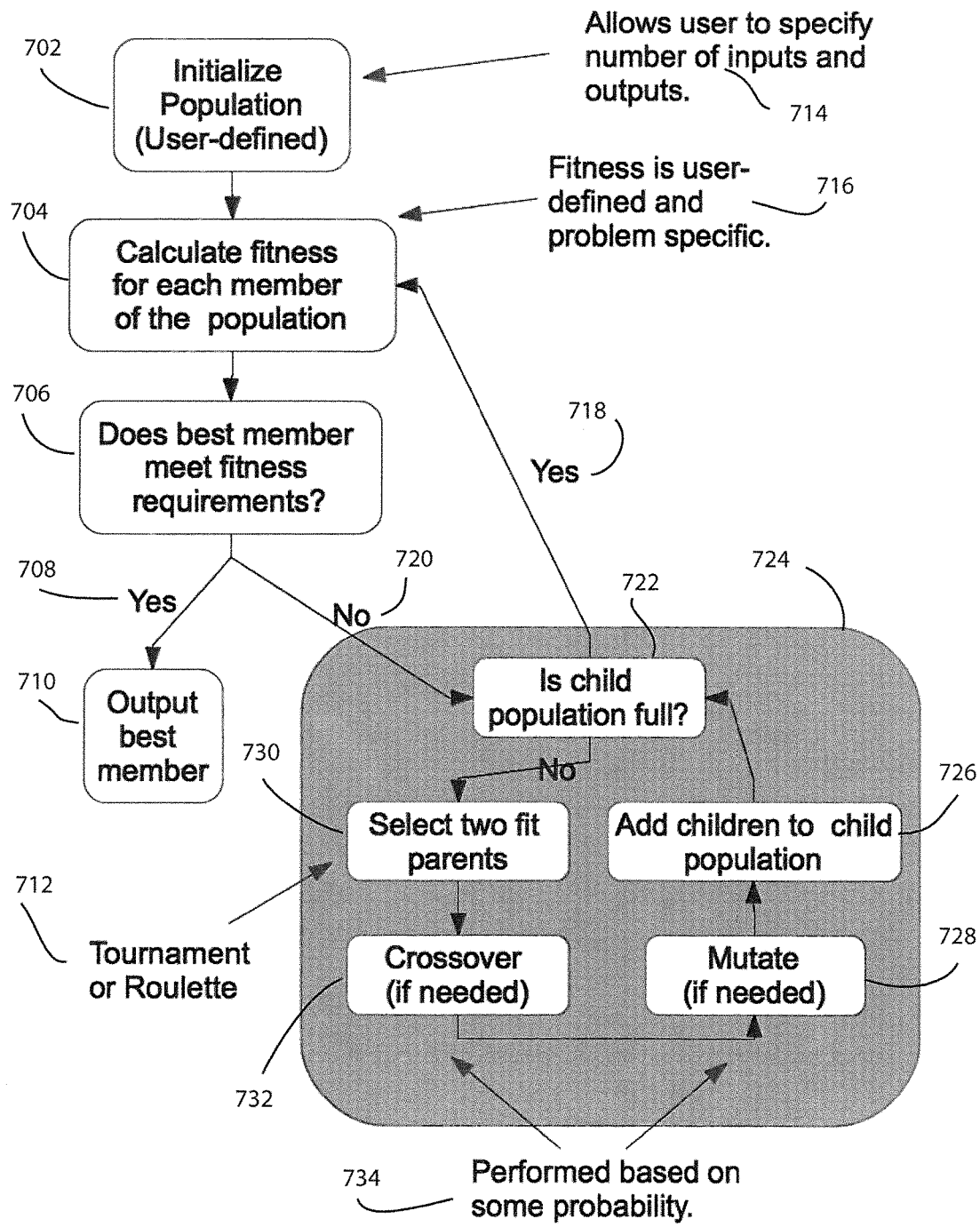
FIG. 7A is a flowchart showing a training method using tournament or roulette processes.
Figure 7B:
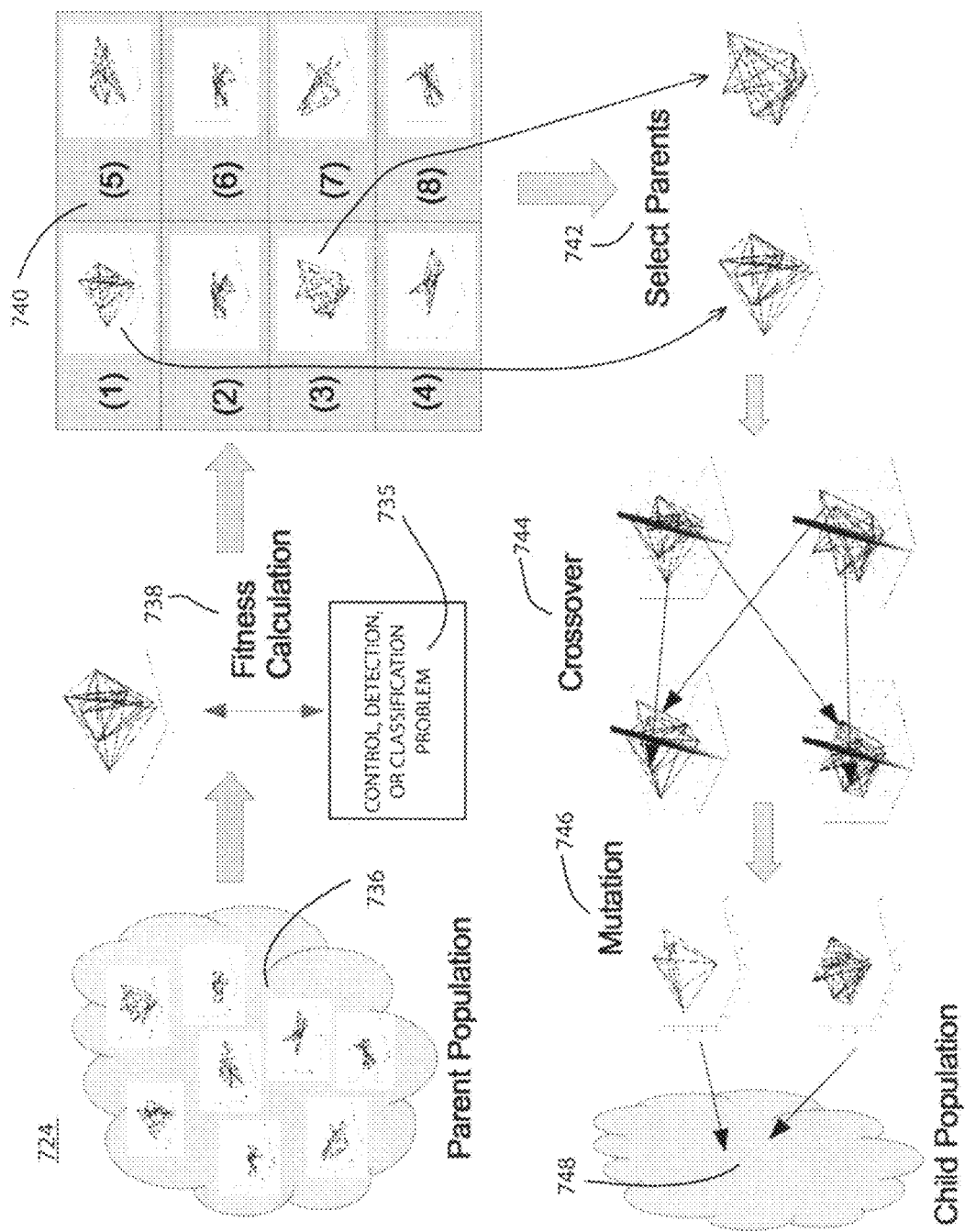
FIG. 7B is a flowchart showing the formation of a child population from a parent population introduced as block 724 of FIG. 7A.

Referring to FIG. 7A, there is provided a flowchart of an exemplary training algorithm utilizing tournament or roulette processes 712. At 714, the training permits a user to specify a number of inputs and a number of outputs. This leads to 702 where a user may define and initialize a population. Then, at 716, a user may define fitness and a specific problem. Steps 702 and 716 lead to calculating fitness for each member of the initialized population at 704. At 706, does the best member meet the fitness requirements? If Yes at 708, the best member is output at 710. If No at 720, the tournament or roulette process 724 begins by asking at 722, is the child population full? If Yes at 718, there is a return to fitness calculation 704. If No, then, two fit parent networks are selected at 730 using a roulette or tournament selection 712 for the parent selection process 730. After parents are selected, a crossover is performed at 732 if needed. Also, a mutation is performed at 728 if needed. The crossover and mutation operations are performed based upon some probability 734. Children networks are added to the child population at 726 and the crossover/mutation process 724 begins again at 722 asking if the child population is full which continues until the answer is Yes at 718. FIG. 7B provides a blow-up of the crossover/mutation process 724 used to evolve the population of networks of FIG. 7A.

Referring now to FIG. 7B, a parent population 736 is created and maintained in the crossover/mutation process 724 used to evolve the population of networks via evolutionary optimization (EO). A fitness calculation 738 for one of control, anomaly detection, classification or other application 735 of a NIDA/DANNA is applied to the parent network population resulting in a plurality of networks, for example, networks 740 which may be eight in number. Of these, selected parents 742 result (for example, parent networks 1 and 3). Crossover 744 is applied with some predetermined probability, and, if applied, then, preferably no child network may be a clone of a parent. Two selected parents 742 result in two preferably different children with crossover 744. After crossover 744, mutation 746 may be applied with some predetermined probability and child population 748 results through repetition of 742-746.

In the crossover operation 744, the average desired firing rate of the parents is preferably taken to be the desired firing rate in both children produced. In this case, a new mutation 746 that sets the desired firing rate to a randomly selected value between zero and the number of neurons in the network is added to the mutation operation. The parameters of the evolutionary algorithm are given in the Table 3. Mutation Types and Rates are provided in Table 4.

TABLE 3

Evolutionary Algorithm Parameters

| Parameter | Value |
| --- | --- |
| Population size | 500 |
| Mutation rate | 0.9 |
| Crossover rate | 0.9 |
| Tournament size | 20 |

TABLE 4

Mutation Types and Rates

| Mutation Type | Mutation Rate |
| --- | --- |
| Change sign of the weight of a randomly selected (RS) synapse | .267 |
| Randomly change the weight of a RS synapse | .267 |
| Add a synapse between two RS neurons that are not already connected | .133 |
| Delete a RS selected synapse | .133 |
| Add a neuron at a RS position | .027 |
| Delete a RS neuron | .013 |
| Change the threshold of a RS neuron | .027 |
| Change the desired firing rate to a RS value between 0 and the number of neurons | .133 |

An array of programmable adaptive neuromorphic elements may use a field programmable gate array FPGA and the Dynamic Adaptive Neural Network Array or DANNA component models. A VLSI (application specific integrated circuit (ASIC)) may also be used. Embodiments of a DANNA will now be described with reference to FIG. 9A through FIG. 10B and FIGS. 12A to 14. The capacity, logic structures, functions and layout of Xilinx Virtex-7 FPGAs (a Xilinx Zinq FPGA with an ARM processor may also be used to construct a DANNA with programmed control) provide the potential to support useful array sizes, up to 10,000 (or more) programmable elements. Programming, control and I/O interfaces are described to enable the creation of a target neural network and the monitoring of its operation. Finally, the potential performance of an FPGA-based DANNA is discussed with a VLSI-based DANNA implementation.

A model of a neuron inspired by the Hodgkin-Huxley model may comprise operating components such as a neuron charge accumulator, a threshold and a refractory period, and may also comprise a synaptic propagation delay and a weight. This neuron element may introduce dynamic behaviors in the network, serving as memory and influencing system dynamics. Unlike most proposed ANN architectures, but similar to natural neural processes, these dynamic effects may be distributed throughout the network, and are directly influenced in the present ANNs by the evolutionary programming methods utilized to construct and adapt the ANNs for specific purposes such as control, anomaly detection and classification.

The primary function of a DANNA neuron element (which may also serve as a synapse to be discussed further herein) is to accumulate "charge" by adding the "weights" of firing inputs from connected synapses to its existing charge level until that level reaches a programmable threshold level. Each neuron has an independently programmable threshold 901 received from a threshold register (not shown). Referring to one of FIG. 9A or 9B, the depicted circuit element is advantageous in that it may comprise either one of a neuron and a synapse. The neuron will be discussed first. Threshold input 901, indicated by an asterisk or star *, receives a threshold value stored in a register not shown and provides that value to Accum (Accumulator) input C and to Comparator 917 input B. Inputs 0-8 (8 bits in FIG. 9A, 0-15 or 16 bits in FIG. 9B) to MUX/Select 910 are selected by Input_Sel input (3 bits, FIG. 9A; 4 bits FIG. 9B). An Accum, Inc/Dec Weight, Neuron/Synapse register (not shown) stores whether the element is a neuron or synapse and provides an increment/decrement value to CTRL input of Accumulator 915. Meanwhile the charge value stored in Latch is output by an 8 bit lead to input A of Accum/Latch 919 for comparison with Threshold at comparator 917. When the threshold is exceeded at 917 and given clock Acquire_Clk a Fire signal is output and latch 921 outputs Element Output. When the threshold is reached and the element is a neuron, if the neuron is not in its refractory period, the neuron fires, and the neuron's charge is reset to a bias level, dependent on the design parameters for the network. If the neuron is within its refractory period defined by an LTD/LTP Refrac period input from a register not shown to CNT input 904 of 4-bit counter 935, then the neuron maintains its charge but does not fire. An LTD/LTP state machine receiving an Element_Fire signal from above helps determine if Inc/Dec Weight output to CTRL input of 919 decide whether to fire or continue accumulating. Thus, a neuron can accumulate charge during its refractory period (input 904), but it cannot fire during this period. As soon as a neuron fires, it enters its refractory period. The refractory period for all neurons is preferably a constant value set for a given application or operational characteristic. One utility of the refractory period is to limit the maximum firing rate of neurons which typically limits energy consumption by the neuron element of a DANNA.

We have chosen a weighted-sum threshold activation function for the neuron charge given its implementation simplicity and functionality, but other activation functions could be implemented (e.g. linear, sigmoid or Gaussian).

The neuron charge function $H_{kj}(t)$ can be expressed as:

$$H_{kj}(t) = \sum_{i=1}^{N} w_i(t)x_i(t) + H_{kj}(t-1)$$

where kj is the location address in the 2-dimensional array (kjl in a 3-dimensional array), N is the number of neuron inputs, $w_i$ is the weight of input $x_i$ and t is the discrete sample time for network sequencing. Weights can be negative or positive discrete values with minimum and maximum limits set by the functional requirements of the target applications. For this implementation we chose to use signed 8-bit weights (−128 to +127) and a 9-bit charge accumulator.

The neuron activation function $a_{kj}(t)$ (the point at which a neuron will fire its output) can be expressed as:

$$a_{kj}(t) = f(H_{kj}(t)) = \begin{cases} 1 \text{ if } H_{kj}(t) \geq \theta(t) \\ 0 \text{ if } H_{kj}(t) < \theta(t) \end{cases}$$

where θ is the neuron's programmable threshold. When the neuron's charge reaches its threshold level the charge of the neuron is reset to a predetermined bias level before starting a new charge accumulation phase. The bias value is the same for all neurons in the network in the current design. For this implementation the thresholds are limited to binary values from 0 to +127. This neuron model follows to some extent a computational model for a neuron proposed by Rosenblatt (Rosenblatt 1958).

Additional features of our neuron model are the number of inputs/outputs and its firing refractory period. The implementation of FIG. 9A supports 8 input/output (I/O) ports connecting to nearest neighbor elements. The implementation of FIG. 9B supports 16 input/output ports to Input Data Mux/Select 910 selected by Input Sel input as a 4 bit select input to Mux (3 bit select in FIG. 9A for 8 input/output ports). Note that each port can be an input and/or an output, and each port that is enabled to accept an input used must connect to an element (feeding the neuron) programmed as a synapse. Input port sampling is done sequentially by Input Sel and must be randomized to avoid having a single synapse dominate the interactions with the neuron, and to avoid specified, undesirable learning behaviors such as crediting LTP/LTD actions to a preferred or single synapse. This is done by having the first port address sampled in a network cycle be random and each subsequent port address be in sequence from the first address (such as binary ordering by port number).

The neuron refractory period defined at 904 is the amount of time, measured in network cycles, which a neuron must hold off firing from a previous firing condition. We have set the neuron refractory period to one network cycle, meaning if the input firing rate and weights are sufficiently high, a neuron can fire on every network cycle. If the firing rate for neurons needs to be programmable, an alternate design may implement a programmable firing refractory period that may be input 904.

A model for neurons of a DANNA allows them to be either input neurons or internal neurons (not connected as input neurons or output neurons in the DANNA). Input neurons may be placed along specified edges of an array to facilitate routing. Neurons may be connected to other neurons via one or more synapses. Synapses are directed (later shown as arrows), so each neuron has one or a set of synapses to other neurons and a set of synapses from other neurons.

Figure 9A:
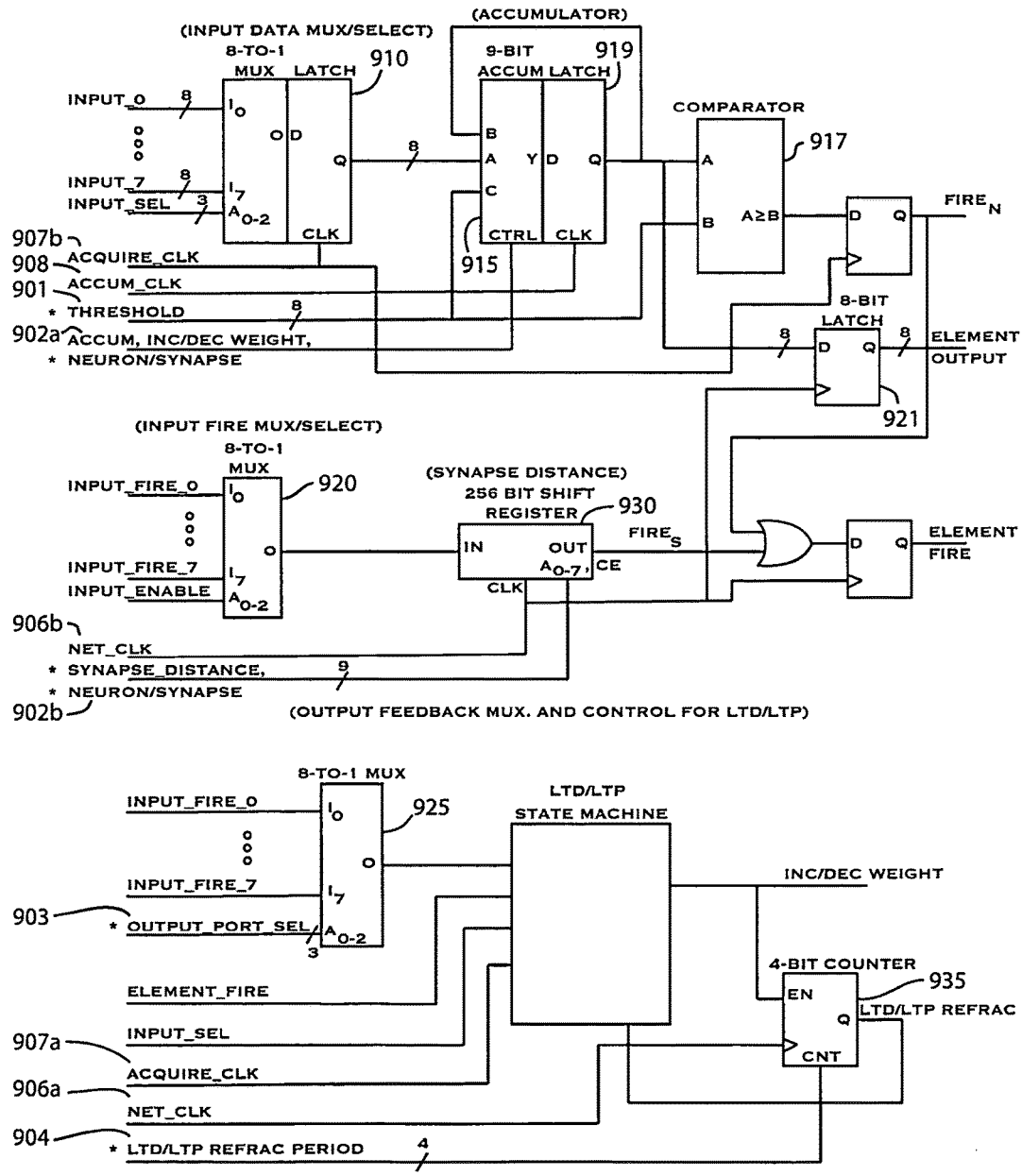
FIG. 9A shows a diagram of a single array element that may implement all the functions necessary to support its operation as either a neuron or a synapse assuming 8 inputs.
Figure 9B:
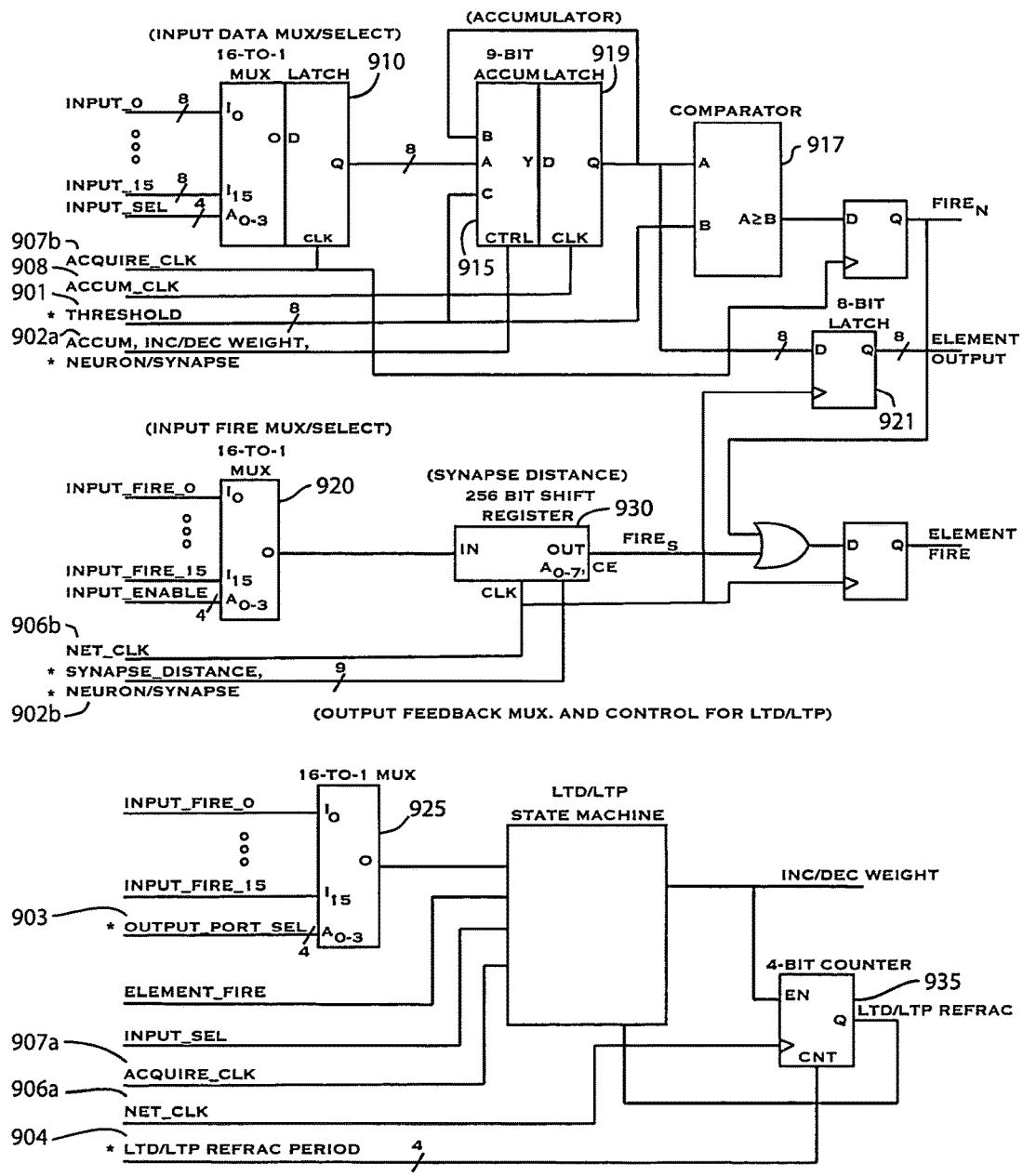
FIG. 9B shows a similar diagram of a single array element for either a neuron or synapse assuming 16 inputs.

As indicated above the element of FIG. 9A or FIG. 9B may be selected to comprise a synapse in the alternative to serving as a neuron. Synapses may also connect to other synapses, for example, in order to implement delays in excess of the capability of a single synapse, and to implement longer signal path lengths between neurons they connect. Synapses are defined by the neurons they connect; each synapse may be directed from one neuron to another neuron. Each synapse circuit element represents the distance between two neurons and the weight (or strength) of the synaptic connection. The distance between the two neurons is represented as a delay, implemented using a first-in/first-out (FIFO) shift register clocked at the network cycle rate, and determines how long it takes for charge to travel along the synapse where the charge value is stored and fed to Accum, Inc/Dec Weight 902a. Also note that Synapse_Distance is fed at input 902b Synapse_Distance, Neuron/Synapse. The weight of the synaptic connection determines how much charge arrives at the second neuron after the first neuron fires. This network model does not implement the concept of myelination, but myelination is equivalent to a reduction of the (programmable) delay. Alternatively, a hardware implementation may be used, for example, a clock divider circuit for changing delay or by connecting synapses together of programmed delay to double delay. If two synapses are each of length d, then it takes the same amount of time (delay) for charge to travel from one end of each synapse to the other. Synapses of a DANNA capture selected features of both axons and synapses found in biological neural networks.

A primary function of a DANNA synapse circuit element is to adapt and transmit a weighted firing signal based on: 1) the firing rate of its input neuron, 2) the firing conditions of its output neuron and 3) its programmable distance which represents the effective length of the synapse. Again, note inputs Accum, Inc/Dec Weight, Neuron/Synapse 902a and Synapse_Distance, Neuron/Synapse 902b. Two of the unique characteristics of our synapse model are: 1) the weight value held by the synapse can automatically potentiate (long-term potentiation, or LTP) or depress (long-term depression, or LTD) (Inc/Dec) depending on the firing condition of its output neuron and 2) the ability to store a string of firing events in its "distance FIFO" (Synapse_Distance input 902b) to simulate a synapse transmitting a set of firing events down its length. Note we are preferably implementing a synapse's length into a representative number of discrete time periods using a programmable shift register.

A synapse can have one (out of eight) I/O ports (FIG. 9A or one of 16 in FIG. 9B) enabled as an input and one (out of eight, FIG. 9A; out of 16, FIG. 9B) I/O ports enabled as an output (Input Fire Mux/Select 920). When a synapse receives a firing event from an input neuron, it places this event on its distance FIFO 930. Preferably, multiple input events received during each element clock cycle (906a) are OR'ed together to create a single input event to the FIFO register. The distance FIFO 930 is a programmable shift register that can store from 1 to 256 firing events (one per network cycle programmed as the "distance" of the synapse). When each firing event reaches the output of the distance FIFO 930, the present weight value stored in the synapse is transmitted as a firing event on its output port (Element Fire). The names of components and clock signal lines and the like chosen are merely exemplary and are not to be considered limiting to the scope of the claims. For example, Inc/Dec Weight is a signal line which functions to increment or decrement weight.

As mentioned, the synapse weight will automatically adapt based on its firing condition and the firing response of its output neuron. LTP and LTD occur in biological brains; it is speculated that they play a major role in learning. The adaptive synapse weight function, $w_{kj}(t)$, can be expressed as follows:

if $S_{kj}(t) = 1$, then $w_{kj}(t+1)$ $$= \begin{cases} w_{kj}(t) + LTD \text{ if } a_{neuron}(t_s) = 1 \\ w_{kj}(t) + LTP \text{ if } a_{neuron}(t_s) = 0 \text{ and } a_{neuron}(t_s + 1) = 1 \\ w_{kj}(t) \text{ if } a_{neuron}(t_s) = 0 \text{ and } a_{neuron}(t_s + 1) = 0 \end{cases}$$

where $S_{kj}(t)$ is the synapse output firing condition, $a_{neuron}(t_s)$ is the activation function or firing condition of the neuron connected to the synapse's output at the time during the network cycle it samples the synapse output, LTD is the "long term depression" value for the synapse, and LTP is the "long term potentiation" value for the synapse. Note that $(t_s+1)$ is the next input sample cycle after the neuron has sampled the synapse output; given eight inputs, the network cycle is divided into eight input sample cycles.

For a preferred implementation, the LTP and LTD values are set at +1 and −1, respectively. Therefore, a synapse's weight is increased by one if it causes its output neuron to fire and is decreased by one if it fires when its output neuron is already firing (Accum, Inc/Dec Weight, Neuron/Synapse 902a). It is unchanged in all other conditions.

Finally, a synapse has a programmable LTP/LTD refractory period (LTD/LTP Refrac Period 904). This programmable value (ranging from 0 to 15) represents the number of network cycles a synapse must wait from its last weight potentiation or depression before it can adjust its weight again. This value is input to Cnt input of 4-Bit Counter 935. This function limits the rate of potentiation/depression of a synapse's weight. All potentiation and/or depression conditions experienced during the LTP/LTD refractory period are ignored; they have no effect on the synapse weight. The utility of the LTP/LTD refractory period is to adjust the relative rates of change of synaptic weights and neuronal firing activity. The LTP/LTD refractory period and the neuron refractory period can be used in combination.

An array element shown in FIG. 9A or FIG. 9B implements all the functions necessary to support its operation as either a neuron or a synapse where FIG. 9A portrays an eight input of 8 bits each embodiment and FIG. 9B portrays a sixteen input embodiment of 8 bits each to Mux/Latch 910. To minimize the physical implementation size of the array element, as many functional components as possible are used to support portions of each neuromorphic function. To maximize performance and minimize size, we, by preference, may use a simple state-machine design (LTD/LTP State Machine) and avoid the use of digital signal processors, floating-point units, arithmetic-logic units, memory arrays and other common microprocessor units. However, a more complex state machine and further processing may be implemented in alternative embodiments (for example, Xilinx Zinq).

The states used to sequence the array element are defined as follows: 1) Select an input port (1 of 8 or 1 of 16) and 2) acquire input fire condition (Note: all 8/16 ports of an element are sampled (or not) during a single network cycle). (Inputs to neurons, for example, may be selectively enabled or ignored if they are not to fire (on a neuron by neuron basis). Next, check the fire condition of the element assigned to the output port (used to determine LTD/LTP if the element is configured as a synapse). Load the synapse FIFO 930 with the input fire condition if the element is a synapse. 3) Accumulate the acquired input weight with the current charge state at accumulator 915, 919 and compare the accumulated charge with the programmed threshold at comparator 917 if the element is configured as a neuron. The accumulator 915, 919 holds the LTD/LTP weight if the element is a synapse. Depress or potentiate synapse the weight (Inc/Dec Weight 902a) based on the firing condition of the element assigned to the output port. 4) Fire the output and reset the accumulator 915, 919 to the bias value if the charge≥the threshold if the element is a neuron and optionally if the neuron is not refractive (for refractory periods>1). Fire the output if a fire event is at the output of the synapse FIFO 930 if the element is a synapse.

The "Fire Output" and "Acquire Input" states may overlap, reducing the state machine to two states. A network cycle consists of eight (sixteen) element cycles, and the element may sample eight (FIG. 9B, sixteen) inputs during a single network cycle. Therefore, in the example of FIG. 9A, it takes eight (FIG. 9B, sixteen) element cycles to complete one network cycle. The following list of functional components is implemented in the array element; these components are illustrated in the block diagram of the element in FIG. 9A for 8 inputs and FIG. 9B for 16 inputs.

Referring now to FIG. 9A, the following types of programmable registers are used in FIG. 9A: An 8-bit Threshold/Weight Register (stores threshold for neuron, or weight for synapse) and is an input 901; an 8-bit Synapse Distance Register (synapse mode only) 930 receives inputs IN from Input Fire Mux/Select 920, Net_Clk 906b and Synapse_Distance 902b; an 8-bit Input Enable Register 910 receives 8 bit inputs 0-7 (FIG. 9A) or 0-15 (FIG. 9B) and Input_Sel as well as CLK from Acquire_Clk 907b; a 4-bit Mode/Output Select Register (Neuron/Synapse; 3-bit (FIG. 9B, 4-bit) output port select 903 if a synapse, which is used to determine which connected elements output should be monitored for LTD/LTP), and a 4-bit LTD/LTP Refractory Period Register (synapse mode only) (input 904 to 4-bit counter 935). Note that a star * in the drawings FIGS. 9A and 9B is used to designate such registers as inputs. A clock diagram will be described with reference to FIG. 10C.

The 8×9-bit I/O port 910, 920 will now be described with reference to FIG. 9A. Each port includes an 8-bit unidirectional I/O data interface to communicate "weights" to 910 and a "fire" signal to 920 respectively. An I/O can communicate a "fire event" from a neuron to a synapse or a "weight" from a synapse to a neuron. The 8-to-1 input port multiplexers 910, 920, 925 and the latch 910 associated with mux 910 are further described as follows. Each input port is 9-bits wide (1-bit "fire" to 920 and 8-bit "weight" signals to 910). The network provides global input select signals (Inp_Sel) to support sequencing through all connected inputs. A pseudo-random number generator may be used to randomize the input sampling sequence during each network cycle. (See in FIG. 10A of the related DANNA patent application of the same inventors and filed concurrently herewith, Global Clocks and Input Selects 1005, and FIG. 10B of the present application) which may be implemented in any known manner depending on choice of clock rate and divided as necessary to provide select and acquire and accumulate functions and the like for the desired network).

The 9-bit accumulator (adder 915, comparator 917 and latch 919) will now be described. This holds and calculates "charge" for a neuron or "weight" for a synapse. Comparator 917 also compares "charge" to "threshold" for a neuron. The accumulator 915 accumulates input firings from all enabled inputs to the neuron (inputs enabled selectively from 0 to 8 (FIG. 9A) or 0 to 15 (FIG. 9B). The weight of each input firing event is stored and added to the "charge" in the order it is sampled. Each weight is an 8-bit signed integer. When an element is a synapse, its weight will be depressed or potentiated, by adding −1 or +1 respectively, (Inc/Dec Weight 902a) depending on the effect the synapse firing event has on its connected neuron.

The 8-bit output register 921 to hold output communications to connected array elements (the "threshold" when configured as a neuron and the "weight" when configured as a synapse) will now be described. The output register value (Element Output) is driven onto the output port during a "firing event" and held active for one network cycle. At all other times the output is zero.

A Synapse Distance FIFO 930 stores input firing events to a synapse and maintains the firing delays between those events. This is implemented via a 1-bit wide×256 entry shift register 930. The Synapse Distance Register 930 selects the appropriate "tap" off the event shift register to implement the "distance" (a delay) associated with the configured synapse. Equivalently, a signal injection point may be selected.

A 4-bit counter and register (or 16-bit shift register) 935 with programmable length will now be described. This holds and implements the LTP/LTD refractory period for a synapse. A global programmable refractory period register (output designated LTD/LTP Refrac Period 904) is used to drive a 4-bit refractory period "length" to all elements.

Clock inputs are created by a network clocking circuit and distributed to manage fan-out and minimize clock skew. Fan-out implements a way to have more than 8 (or 16 or more) input/outputs as will be discussed further herein. These include a Global Network Clock (Net_Clk) 906a and 906b, also shown as signal G_N_C. in FIG. 10C, an Acquire/Fire Clock (Acquire_Clk) 907a and 907b, also shown as A_F_C. in FIG. 10C, and an Accumulate Clock (Accum_Clk) 908, also shown as A_C. in FIG. 10C, provides accumulated clock time. The Global Network Clock 1005 sets the network cycle time. Acquire/Fire Clock 907 controls the element cycle time and Accumulate Clock 908 enables the accumulator latch 919 input CLK to perform two operations every element cycle (load and accumulate clock time).

A Programming/monitoring interface and control (which may comprise a PCIe Interface) 1040 (or other known interface technology or method may be used) enables register reads/writes from/to the external interface. In the current implementation, each circuit element in the array is directly addressed via a multiplexed 8-bit address/data port (which supports a 16-bit global element address and an 8-bit data port), a 3-bit element register select, a read/write signal, a strobe, a clock, a Run/Halt signal and Reset (16 signals total).

FIG. 9B is a bock diagram very similar to FIG. 9A except providing for sixteen digital circuit element inputs of eight bits each and so a four bit (1 of 16) select. It is not believed necessary to discuss FIG. 9B in great detail. The element code appended hereto is for the sixteen bit element and associated registers shown in FIG. 9B (which like FIG. 9A may be a neuron or a synapse).

Figure 10A:
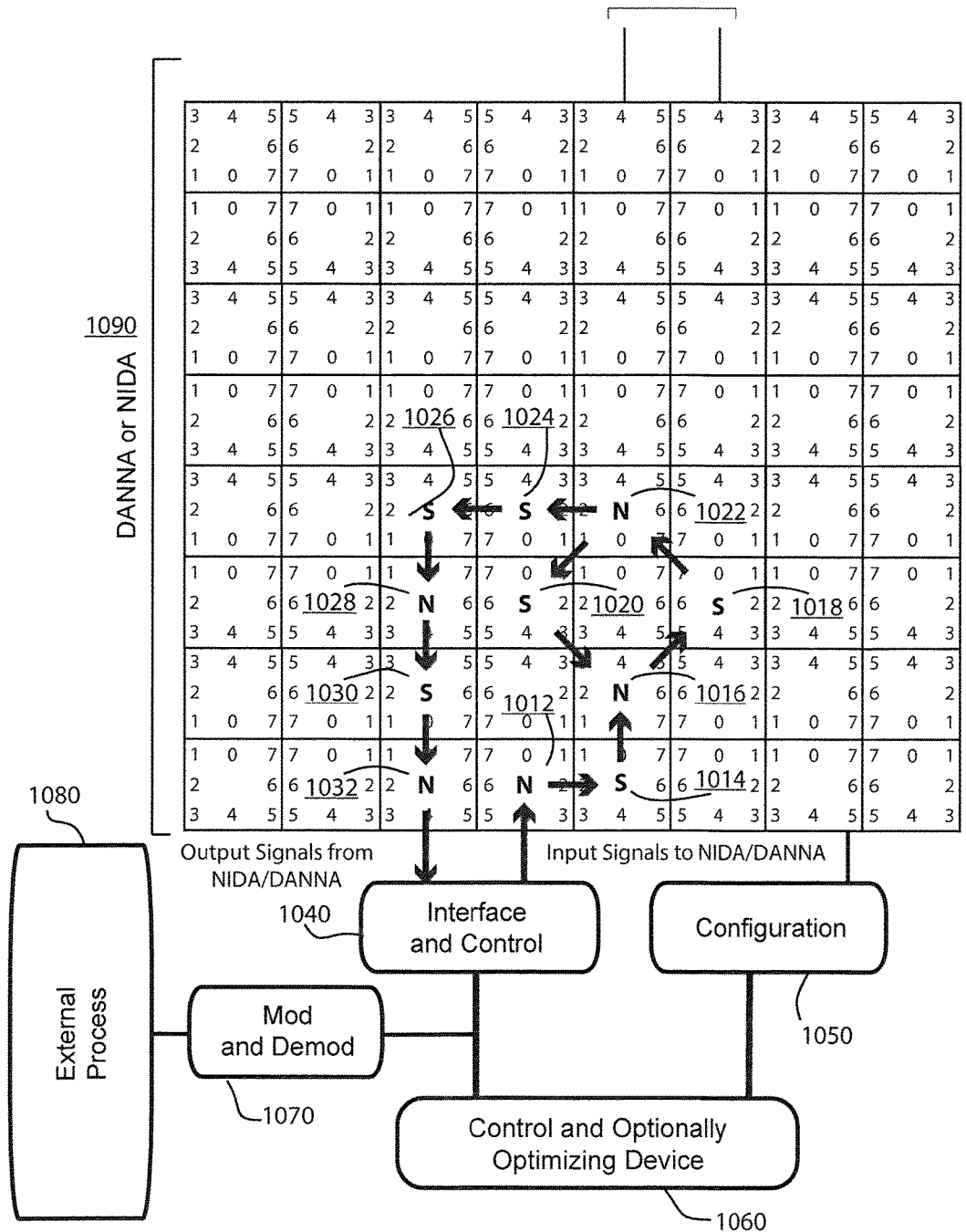
FIG. 10A shows a high-level block diagram of a DANNA or NIDA array of elements with selected elements configured to implement an exemplary artificial neural network, interface and control circuitry, configuration circuitry, an interface to an external process, and a control and optionally optimizing device; the circuit elements of a DANNA may be digital circuit elements.
Figure 10B:
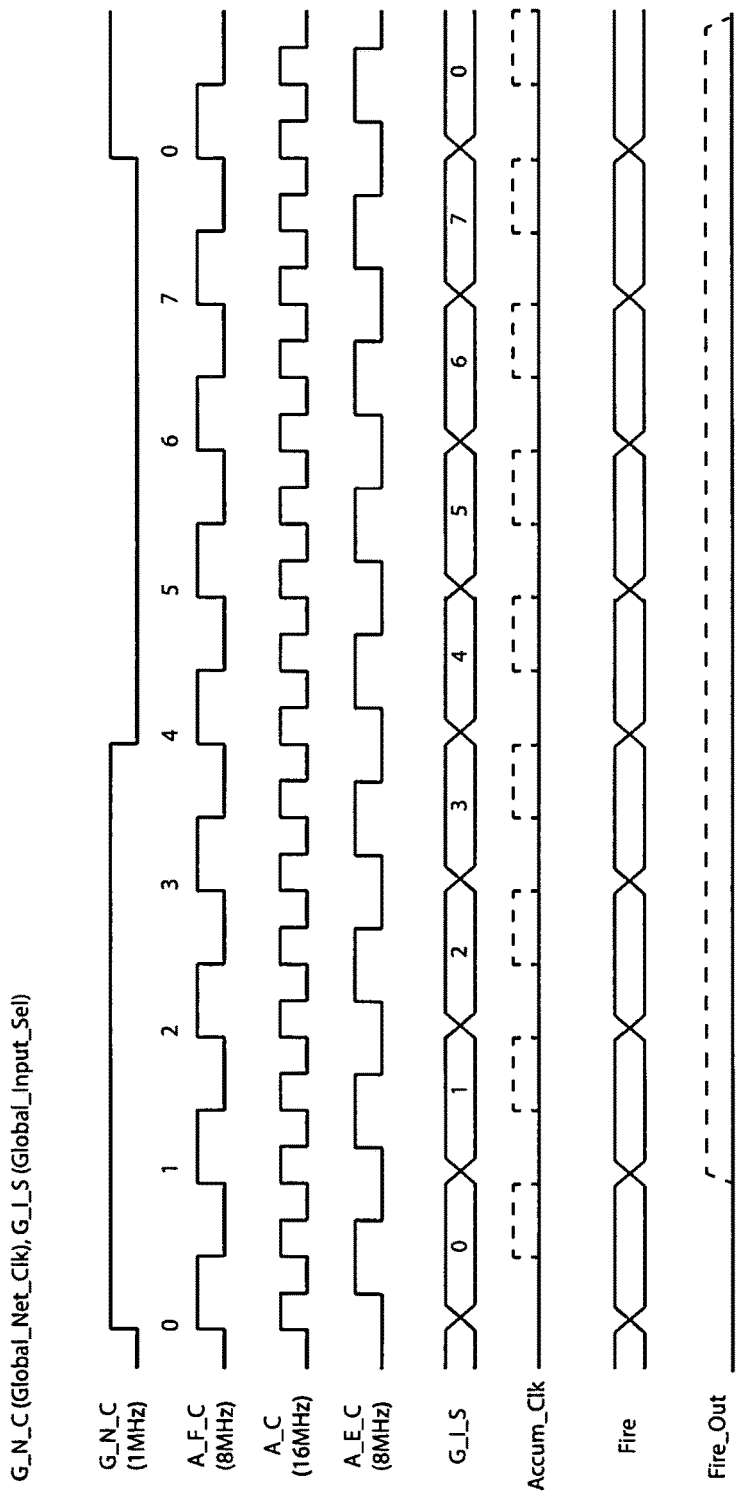
FIG. 10B provides a clock time diagram for the clocks shown in FIG. 9A, FIG. 9B and FIG. 10A.

Referring to FIG. 10A, there is shown a high-level block diagram of the array of elements of FIG. 9A or 9B or of a NIDA and the programmatic and control functional elements. This may be modified in alternative implementations to provide additional control and monitoring functions. The element array may be structured as a 2-dimensional array that is k elements wide by j elements high (elements being one of a synapse and a neuron). Each circuit element connects to eight (16 or 24 or 32 . . . ) of its nearest neighbor elements (directly above, below, to the right and left, and diagonal), except for circuit elements on the edge of the array, which have a limited number of connections. Some of the edge elements are used as inputs/outputs to external signals and devices and are neuron elements in a NIDA and use a synapse in a DANNA.

Any input shown in FIG. 10A (the eight input element) may receive an input as an output from any of eight connected elements. Each element (in this figure referred to as a circuit element or "cell") may receive an output from eight others without blocking another signal. I/O's may be sequentially addressed to prevent signal blocking generally. Other numbering schemes may be used in FIG. 10A and the numbering scheme shown is merely exemplary of all possibilities.

Referring again to FIG. 10A, in one embodiment, a DANNA array of circuit elements (which may be FPGA's) connects to interface and control 1040 which may comprise a PCIe interface that is used for external programming and adaptive "learning" algorithms that may monitor and control the configuration and characteristics of the network and may have array elements 1012, 1014, 1016, 1018 . . . 1032. Of these, 1012, 1014 and 1032 may be located on an edge of the array and may have external inputs or outputs. Array elements, including 1014, 1016, 1018, 1020 and 1022 may preferably also have inputs or outputs that are internal to the array.

Figure 14:
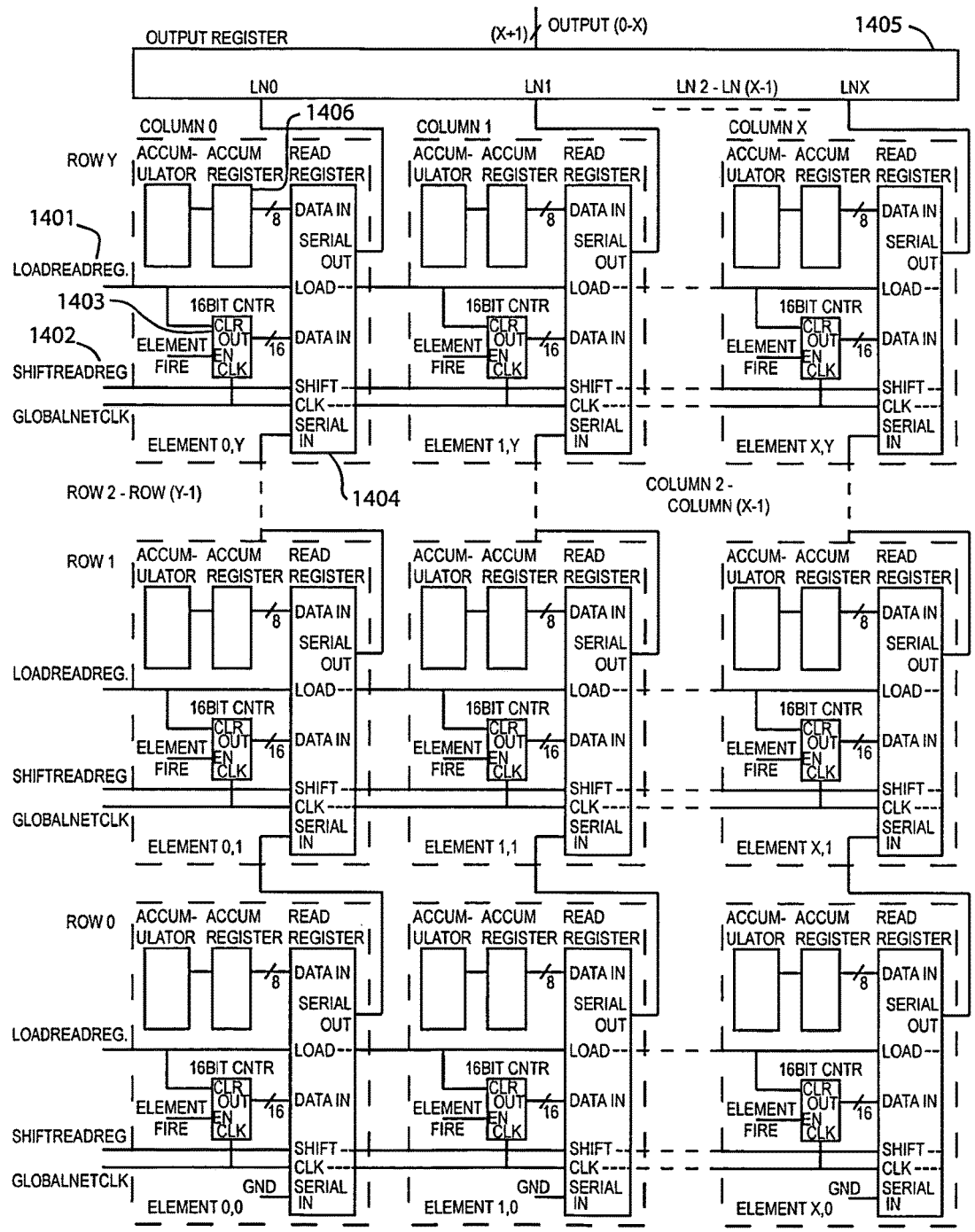
FIG. 14 shows a DANNA of X columns and Y rows of circuit elements having an output register for selectively receiving outputs from read registers of the X columns of circuit elements which may be monitored by an element monitoring process.

Other interfaces may be used as indicated in FIG. 10A and FIG. 14 for monitoring. Interface and control 1040, such as a FMC bus, a serial or parallel communication interface, or a network interface using, for example, copper wiring such as CAT6 or fiber optic or wireless network interface. Additional devices may be used to implement an interface such as computers known in the art. The interface 1040 provides for communication between the DANNA or NIDA or combination of substructures thereof and a control and, optionally, optimizing device 1060, which is optional and may not be present in stand-alone implementations.

Each element may sample eight of its input ports of FIG. 9A (or 16 of FIG. 9B) within a network cycle. This may be accomplished using a global input select function. A 63-bit linear-feedback shift register (LFSR) may be used with a loadable 3-bit counter to generate random starting address sequences for the input selects which guarantee that the first element selected during each network cycle is randomly chosen with roughly uniform probability. Other means of randomly selecting inputs may be used. Eight element-inputs (FIG. 9A circuit element) may be sequentially sampled beginning with the randomly chosen one within a single network cycle. Randomization of input sampling is important to prevent the domination by one input of the behavior of a neuron.

Figure 12A:
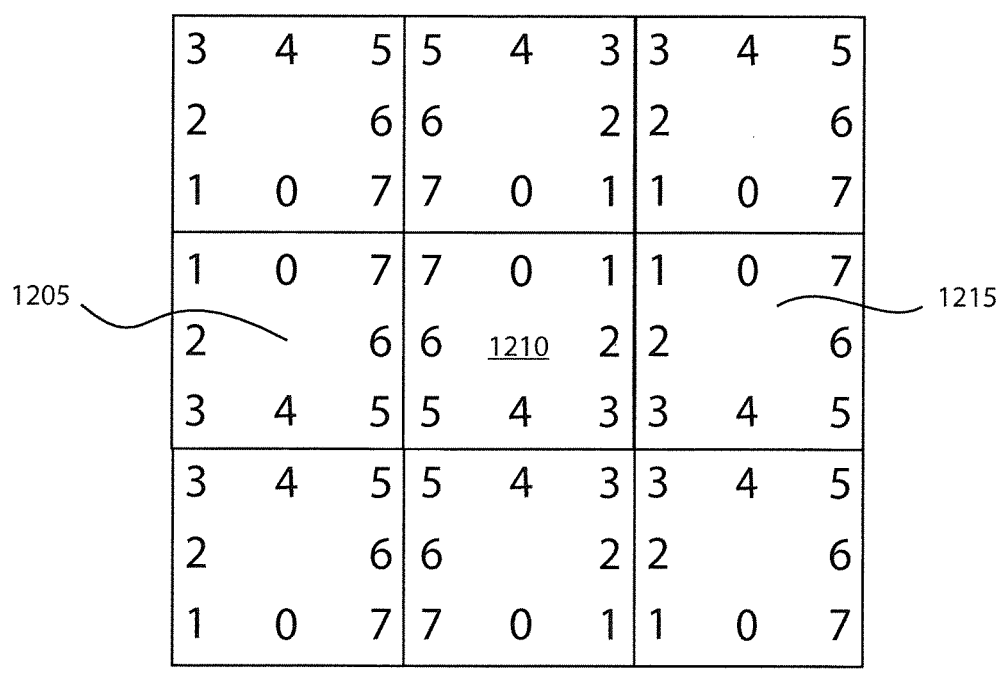

A design feature of the element array is the numbering scheme used for the I/O ports. Connected I/O ports on adjacent network elements may have the same port number to facilitate implementation of the synapse's LTD/LTP function. The element I/O port number scheme used is shown in FIGS. 10A, 12A and 13.

The Xilinx Vivado™ Design Suite was used for the design, implementation, simulation and layout of the initial DANNA element array. VHDL was used as the description language for all designed components. The code is found below for the several components of each circuit element. Again, the Virtex-7 series of Xilinx FPGAs may be used. The main logic resource used on the Xilinx 7-series FPGAs is the "configuration logic block" or CLB. Each CLB contains two Slices, which each have four 6-input "look-up tables" (LUTs), eight flip-flops and arithmetic carry logic. There is also logic to implement wide multiplexers and long shift registers. Other tools and hardware may be used such as Xilinx Zinq and Alterra FPGA by way of example.

An element implementation may require, for example, 84 LUTs and 64 flip-flops. One may fit the element in a tightly arranged 28 Slices or 14 CLBs using the Vivado floor planning and placement tools. Note that none of the on-chip digital signal processors (DSPs) or Distributed Ram Blocks was used in the element design as can be seen in either FIG. 9A or 9B.

Element simulations of DANNA and construction of elements verify full functionality for both neuron and synapse modes of a circuit element of either FIG. 9A or 9B. A target clock rate for the network may be 1 MHz and 8 MHz for the element (sample rate for the inputs). Further timing simulations showed we may clock the network at 8 MHz and the element at 64 MHz. A 10 MHz network clock and 80 MHz element clock rate are achievable (if not higher rates). The higher clock rates are important because evolutionary optimization (EO) is typically used to design a DANNA for a specific implementation and application. EO ideally configures multiple DANNAs, simulation or execution of them against the application (for example, for signal detection or classification, or to control a (possibly simulated) physical object's behavior, and a limiting factor in the optimization may be execution and evaluation of the performance of individual DANNAs. Higher clock rates translate directly to more rapid convergence of the EO design steps.

Figure 11:
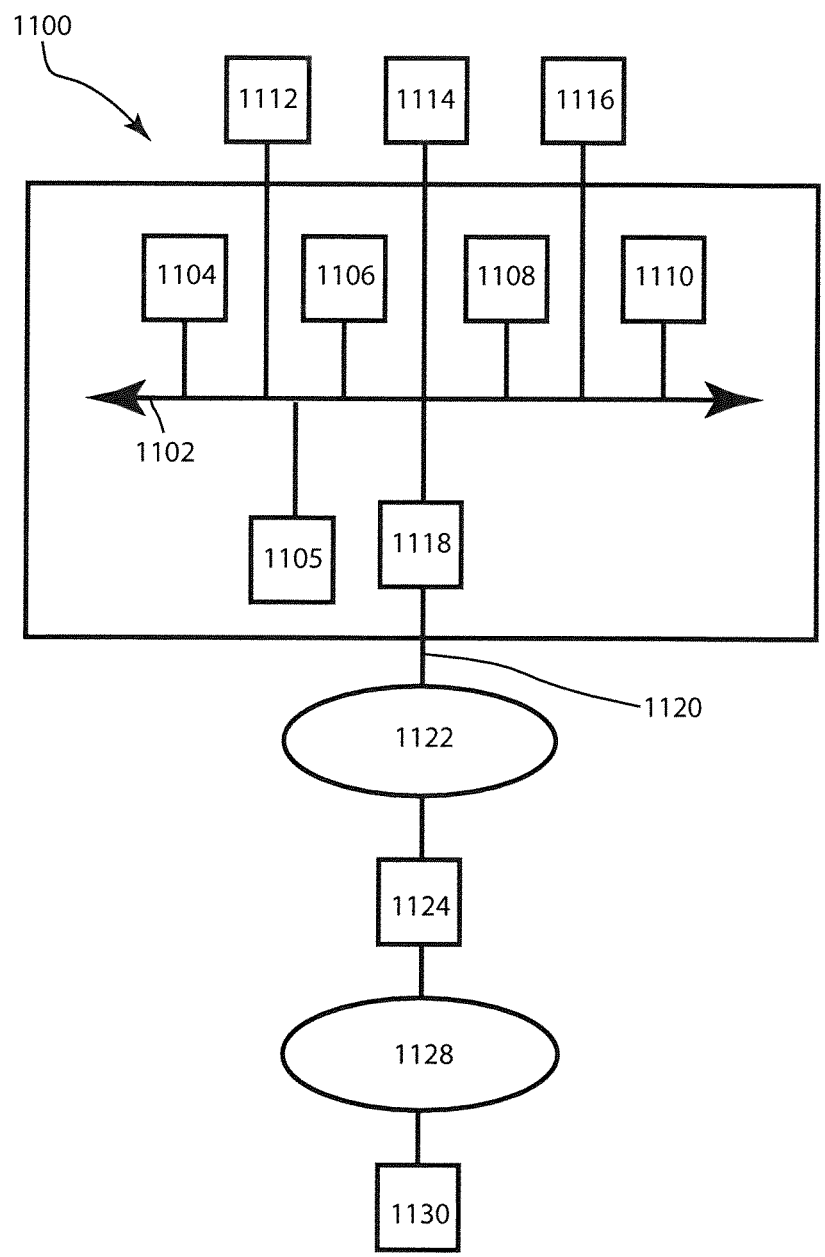
FIG. 11 is an overall schematic block diagram of a special purpose processor for executing an embodiment of processor apparatus for constructing, using and reusing components and structures in an artificial neural network.

The global functions were implemented and tested using the same design tools and simulation models as the element. This included the Clocks, Input Select, PCIe, programming interface, and programmable registers for network control and LTD/LTP refractory period. A PCIe and programming interface may be used. By reducing the PCIe interface to a single lane (lx), this significantly reduces the logic required to interface the array to an external computer system (FIG. 11, 1100).

A final design was configured, loaded and tested on two different Xilinx evaluation boards: the VC709 evaluation board featuring the XC7VX690T FPGA and the VC707 evaluation board featuring the XC7VX485T. The 485T FPGA has 75,900 Slices, and the 690T FPGA has 108,300 Slices. An array of approximately 2500 elements was placed on the 485T FPGA and an array of approximately 3500 elements on the 690T FPGA. Using Xilinx's largest Virtex-7 FPGA, the XC7V2000T, an element array of approximately 10,000 elements may be constructed. With the array sizes achieved, many solutions needing a neural network array (DANNA) can be supported.

Now, again referring to FIG. 10A, a DANNA system will be described in further detail comprising an optimizing device 1060 and a neuromorphic device. A DANNA may be implemented that is comprised of one or more subsystems sometimes referred to herein as components or substructures. If two or more subsystems are present, these subsystems can communicate. One preferred embodiment of a subsystem is comprised of two computational elements (only one computational network 820 is shown in FIG. 8A). The first computational element is comprised of at least one processing circuit or device referred to herein as an element or cell, and the first computational element will be referred to herein as a neuromorphic device. The second computational element implements an evolutionary optimization (EO) algorithm that can modify the operation or configuration of the first computational element in response to measurements of the performance of the first computational element. The second computational element will be referred to herein as an optimizing device. The first and second computational elements may be two physical devices that can communicate, different portions of the same device, such as an integrated circuit, field programmable gate array (FPGA) or application-specific integrated circuit (ASIC), or implemented by one or more physical devices, such as with a general purpose computer or processor such as a server, a desktop workstation, a laptop, or an Intel or AMD processor, a networked collection of computers, or supercomputer using software. An optimizing device may be interfaced to a DANNA/NIDA neuromorphic device.

A parallelization of such optimizing device and neuromorphic device combinations may be constructed. The devices can communicate using communications hardware or software components, as depicted in the diagram, where the communications can employ communications protocols such as TCP or UDP, wireless or wired networks such as Ethernet, Gigabit Ethernet, WiFi, WiMax, ATM and 3G or 4G technologies such as 4G LTE, hardware communications structures such as PCIe, serial or parallel communications channels which may be electrical or optical, and may employ either digital or analog communications methods and/or devices, as are well known in the fields of electrical engineering and computer engineering. It is preferred that embodiments having more than one subsystem coordinate the operation of those subsystems to achieve a common purpose, such as the control of a physical or virtual (such as software) system, classification of signals, which may be indexed by either time or frequency, including signals obtained using radar or sonar, and signals that represent data indexed by two or three dimensions such as medical signals obtained using CAT, MM, or PET scanning technologies or a combination thereof and medical signals obtained using EEG, MEG, or chemical sensing technologies, or a combination of any of these.

It is not required that the subsystems of an embodiment have common goals. For example, a subsystem's goal may be the improvement or stabilization of the behavior of a second subsystem, while the second subsystem's goal may be the control of an external process, or the classification of one or more signals, or the identification of characteristics of at least one signal. As a second example, a goal of a subsystem can be affective, such as the promotion of bonding of other subsystems to operate as a team to achieve one or more goals, or such as the control or influence of the seeking behavior of a second subsystem whose goal is the exploration of its environment, as in a robotic or unmanned vehicle. A third example of an affective goal of a subsystem is the control or influence of a fear response in a second subsystem to cause the second subsystem to avoid unnecessary risk or unacceptable risk of damage or destruction, as in the control of an unmanned vehicle in a hostile environment. A fourth example of an affective goal of a subsystem is the control or influence of a rage response in a second subsystem, as in being able to trigger defensive or offensive actions in an autonomous system. A fifth example of an affective goal is to control the behavior of an automated process upon prediction of a component failure.

The optimizing element may be further divided into two sub-elements, an evolutionary optimization component (EO component) and a performance measurement component where the first sub-element implements the evolutionary optimization algorithm, and the second sub-element implements one or more measurements of the performance of the first computational element. Either the first or second computational element may be comprised of multiple circuits or devices as shown below. For example, the second computational element may be one or more general purpose computer processors such as Intel or AMD processors, and each processor may have one or more computational cores and be capable of executing multiple threads, either simultaneously using multiple cores or by time-slicing or using other methods that are well-known in the field of computer engineering.

The neuromorphic device of the first computational element may comprise multiple cells/elements as shown FIG. 10A, where each cell/element may implement functionality characteristic or similar to that observed of a biological neuron or synapse. The figure shows, by way of example, cells that are organized in a two-dimensional array, but other organizations can be used such as a linear, ordered, or indexed array of cells, which may be in one, two, or three dimensions, or the cells may be virtual components existing in a system implemented in software.

In FIG. 10A, cells/elements of DANNA/NIDA 1090 may also be designed to implement other functionalities. For example, a call may be designed to implement the functionalities characteristic or similar to that of a place node or a transition node or an arc of a Petri net. In this case the functionalities may be extended to include different types of place nodes, transition nodes, and arcs, for example by implementing both enabling and inhibiting arcs that enable a transition node to fire and inhibit a transition node from firing, respectively. Another type of extension is the optional inclusion of additional functionality or parameters in the functionality of a place or a transition. For example, a place may be required to cause any Petri net tokens to remain within a place for a specified time period, which may be a random time characterized by a probability density or distribution that may be characterized by one or more statistical parameters. As an additional example, a transition may be required to cause a function of its input tokens, or of parameters or variables associated with its input tokens, to satisfy a mathematical relationship before the transition can fire or be enabled.

Still referring to FIG. 10A, in a preferred embodiment the cells can be programmed or configured by a device or function implemented either internal to or external to the neuromorphic device. FIG. 10A illustrates an interface and control structure 1040 that may be accessed by an external device or process 1080 such as the optimizing device using the communications pathway (for example, mod and demod 1070), which may consist of signal lines or pins on a physical device to which other components may be connected or software structures that may be constructed, used and reused. In this embodiment, the interface and control structure 1040 is interfaced with or communicates with the cells/elements or configuration devices (illustrated in the figure as the configuration structure 1050), which may include memory elements and may be either a part of or separate from the cells/elements. A function of the interface and control structure 1040 is to effect the configuration of the cells/elements into a neuromorphic network, such as a network of neurons and synapses described by a neural network or a network of place and transition nodes and arcs described by a Petri net.

Where the cells of the neuromorphic device of FIG. 10A may implement functionality characteristic or similar to that observed of a biological neuron or synapse, when it is clear from the context, the terms "neuron" and "synapse" will be used for either circuitry, devices or software (NIDA) that implement these functionalities, or a biological neuron and synapse. In a first preferred embodiment each cell/element can be configured or programmed to implement either a neuron or synapse as described above, and such configuration or programming can be changed by an action of the optimizing element. In a second preferred embodiment, each cell/element can be configured or programmed to implement either a place or a transition associated with a Petri net, and such configuration or programming can be changed by an action of the optimizing element. Optionally, the optimizing element may initialize parameter values or state information or variables associated with a cell/element.

In these preferred embodiments the optimizing device can configure two or more cells by specifying connections between them, such connections being signal pathways or devices that allow information, which may be represented or transmitted by digital (binary, typically represented as zero and one, true and false, or by two symbols), analog (having continuous value, optionally within some range of values), or discrete (having one of a set of multiple and distinct values that may be represented by a set of integers or symbols) values. Each signal pathway can be designed and implemented to transmit or convey information, as one or more values, either serially or in parallel, as is known in the art from one or more cells to one or more cells, which may but do not have to be the same. The connectivity between cells that may be formed by the connections specified by the second computational element can be called "programming", "initializing", or "configuring" the neuromorphic device or circuit, and the resulting specification and implementation of the configurations of the cells, of the optional parameters, states, or variables associated with one or more of the cells, and of the connectivity between cells can be called the "configuration" or "program" of the neuromorphic device or circuit.

In a preferred embodiment, the cells/elements of the neuromorphic device operate in an asynchronous or discrete event manner, meaning that events or actions occur at times which conditions are met within one or more cells to cause the creation of an event at that time. In practice the cells/elements will typically operate in a synchronous or clocked manner, meaning that a clock signal exists, which preferably has a short time period relative to the rate at which external signals received or generated by the neuromorphic device change values, and that events occur at times that are coincident or nearly coincident (allowing for signal propagation, logic gate, or other device delays) with transitions of the clock signal's values. More than one clock signal may exist and be used or generated by the neuromorphic device, as is well known in the art of electric engineering and computer engineering, and these clock signals are typically related by phase offsets and/or the division of a common clock frequency by positive integers.

In a preferred embodiment that utilizes cells/elements that implement neurons and synapses, cells that are configured to implement synapses are used to implement connections between cells/elements that are configured to implement neurons, and possibly between those neuron cells and external components or other components within the neuromorphic device, which may, without limitation and by example, be a counter, a device to select one of a set of values, which may be digital, analog, or discrete, a demodulator that produces a digital or analog signal that depends upon a signal received from a cell configured as a neuron, or a modulator that converts a digital or analog signal to a signal that can be transmitted to a cell configured as a neuron. Thus, a cell configured as a synapse has one or more inputs, which are each connected to a cell, and has one or more outputs, which are each connected to a cell. In both cases the cells connected to the cell configured as a synapse may be configured as either a neuron or a synapse. This allows multiple cells configured as synapses to transmit information along pathways within the neuromorphic device or circuit. If the embodiment utilizes software or a combination of software and hardware to implement a neural network, then the components that translate and transmit or receive signals to/from external devices of other components within the neuromorphic device may be implemented in software (NIDA), a combination of software (NIDA) and hardware (DANNA) or other combination of known ANN's and/or substructures of any of these.

In a preferred embodiment that utilizes cells/elements that implement the place and transition nodes and the edges of Petri nets, cells that are configured to implement edges are used to implement connections from cells configured to implement places to cells configured to implement transitions, and to implement connections from cells configured to implement transitions to cells configured to implement places. Edges can implement connections from cells configured to implement transitions to external components or other components within the neuromorphic device, which may, without limitation and by example, be a counter, a device to select one of a set of values, which may be digital, analog, or discrete, or a demodulator that produces a digital or analog signal that depends upon a signal received from a cell configured as a transition. Edges can also implement connections from external components or other components within the neuromorphic device to cells configured to implement places, where the external components or other components within the neuromorphic device may, without limitation and by example, be a counter, a device to accept an input of one of a set of values, which may be digital, analog, or discrete, or a modulator that converts a digital or analog signal to a signal that can be transmitted to a cell configured as a place. It is also possible to reverse the roles of places and transitions in the implementation of a Petri net, where places transmit signals to external devices as outputs from the neuromorphic device, and transitions receive signals from external devices as inputs using, by example and for illustration only, modulators, demodulators, counters, digital to analog or analog to digital converters, or other components as are known in the fields of electrical engineering and computer engineering. If the embodiment utilizes software or a combination of software and hardware to implement a Petri net, then the components that translate and transmit or receive signals to/from external devices of other components within the neuromorphic device may be implemented in software (NIDA) or a combination of software (NIDA) and hardware (DANNA) or known ANN's or substructures of any of these.

The utilization of the neural hardware for the control of an external process or system 1080 is now described with reference to FIG. 10A. Note that control, or the influence of the behavior of the external process in a desired manner, is one of many possible applications, and that there are different types of control. An external process 1080 is shown that has at least one input and at least one output. These possibly multiple inputs and outputs are connected or interfaced to the neural hardware using, for example, a modulator and a demodulator 1070. For the purpose of this application, "modulator" is a term used to describe a device that converts values produced by the external process into one or more events, which may occur asynchronously or synchronously with a clock, where the events are applied to the neural network via the interface and control structure shown in the figure. As an example, the modulator may be a pulse-width modulator that converts a signal to a sequence of pulses of different width, and the leading and training edges of these pulses may be associated with events applied to the neural network. In a similar fashion and for the purpose of this application, a "demodulator" is a term used to describe a device that converts events produced by the neural network and delivered to the demodulator via the interface and control structure into a signal represented by values that can be applied as one or more inputs to the external process. As discussed elsewhere in this application, a modulator and a demodulator 1070 as described herein is only one way in which a sequence of events can be converted to a signal for input to an external process, and in which a signal output from an external process can be converted to a sequence of events. For example, a digital to analog converter (DAC) can be utilized to convert a signal's value at a given time to a digital representation, which may be a sequence of binary digits represented by high and low voltages, ones and zeros, or different currents, or the presence and absence of a voltage, current, or light, and this digital representation can be converted to a sequence of events by, for example, clocking the binary digits out of a storage device such as a shift register to be presented to the neural network as events.

There can be an arbitrary number of inputs and/or outputs, and that these outputs can be of different types. For example, they can correspond to signals that assume values in a continuous set between real numbers a and b, represented by the interval of values [a,b]. This value set can instead be a set of discrete values, which may be ordered, for example with values that can be placed in a one-to-one correspondence with the positive integers and that may represent a discretization of the interval [a,b]. A discrete value set can also be represented by a set of symbols, such as the letters of the alphabet, {a, b, c, . . . , z} or the union of this alphabet set with the numerals, {0, 1, 2, . . . , 9}, but other sets of symbols may be used. For example, the value may be an image, a portion of an image, or a pixel value from an image; (see, for example hand-written digit classification in the related NIDA patent application of Birdwell and Schuman filed concurrently herewith).

Cells/elements of the neuromorphic device can be selected by the controlling and optionally optimizing device 1060 in FIG. 10A, via one or more of the interface and control structure and the configuration structure, and programmed to function as neurons, represented by the letter N in the figure, or as synapses, represented by the letter S. Furthermore, these programmed cells can be interconnected by action of the optimizing device to form a neural network. In FIG. 10A, the lines originating and/or terminating at a cell/element labeled N or S represent these connections, and the connections allow events to be transmitted from, for example, a neuron N 1012 through, for example, a synapse S 1014 to one or more neurons N 1016 and/or to/from synapses S 1018, 1020 respectively. In one preferred embodiment of the neruomorphic device, the cells/elements are organized as a two-dimensional array, and each cell/element may be connected to one or more of up to eight (or in an alternative embodiment 16, 24, 32 or other multiple of 8) of its neighboring cells. Furthermore, neurons N or synapses S may be connected via the interface and control structure 1040 as shown to send events to or receive events from a modulator, demodulator 1070, or other structure in order to influence or be influenced by an external process 1080.

FIG. 10A also illustrates a representation of a neural network that can be programmed by an optimizing device. An explanation of the operation of the neural network is provided. A signal is received by neuron 1012 from, for example, an external process 1080 after it has been converted to a sequence of events via its connection to Interface and Control 1040. This signal may, or may not, cause neuron 1012 to "fire", where the firing process creates an event that is applied to the input of synapse 1014. A neuron N can be modeled as an accumulator that sums, or accumulates, weights associated by events applied to its inputs. The weights can be positive, zero, or negative; a weight of zero implies that events that arrive at the neuron's input on that signal line have no effect on the neuron. The value stored or computed by the accumulator is preferentially bounded between minimum and maximum values and is compared to a threshold value, and if the accumulator's value exceeds the threshold value, then the accumulator's value is reset to an initial value, which is typically zero, and the neuron 1012 creates an event that is applied to the input of synapse 1014.

Optionally, the neuron 1012 may have a non-zero refractory period parameter. If the refractory period is not zero and the neuron 1012 has fired more recently than this period of time into the past, the neuron 1012 will not fire again until the end of the refractory period. This functionality can be implemented with a count-down timer that is initialized to the refractory period when the neuron 1012 fires, and with logic that prevents the firing of the neuron 1012 if the count-down timer holds a non-zero value. Furthermore, the count-down timer stops counting down when it holds a zero value. Another way to implement the refractory period is with a RC (resistor-capacitor) network, where the capacitor is charged to an initial voltage when the neuron 1012 fires. The voltage across the capacitor can be compared to a threshold voltage, and circuitry can be utilized to prevent the neuron from firing if the voltage across the capacitor is greater than the threshold voltage. Note that in the preceding discussion the comparison could be "greater than or equal to" instead of "greater than". Other implementations can be utilized, as are well-known in the art of electrical engineering and computer engineering.

If the weight associated with the signal line between interface and control 1040 and neuron 1012 is positive and events continue to arrive at neuron 1012's input along this signal line, neuron 1012 will eventually fire, causing an event to be presented at an input of synapse 1014. In a preferred embodiment, there is no weight associated with an input created by a neuron; instead, the weight is associated with a synapse and applied to events that traverse through the synapse and are applied to the input of a neuron. These weights may be associated with either the synapse or the receiving or destination neuron and its input signal line. The effect is the same in either case, but the manner in which the neuromorphic device is implemented may be different.

In a preferred embodiment, a synapse has an associated time delay, which may also be represented or viewed as a distance if an event propagation velocity is defined for the synapse. The time delay is applied to events that are applied to a synapse at one or more of its inputs, and the effect is that the events do not exit the synapse for application to a neuron's input (or an external process 1080 or other device) until an amount of time corresponding to the time delay has passed. Preferably a synapse may have more than one and possibly many events in transit via its implementation of a delay function, allowing the events to exit a synaptic output in the order they are received at the synaptic input and delayed by the time delay associated with the synapse. For example, if the time delay, which is a parameter of the synapse, is 5 seconds and the synapse receives an event A at time 2 seconds, the event produced at the synapse's output that corresponds to event A will not be emitted until time 7 (2 seconds plus a delay of 5 seconds). If a second event B is received at time 3 seconds, a second event will be produced at the synapse's output that corresponds to event B at time 8 seconds (3 seconds plus a delay of 5 seconds). When each emitted event is presented to a receiving neuron connected to or associated with one of the synapse's output, a weight value is associated with the emitted event, and the neuron uses that weight value to update its accumulator (unless the result would exceed an optional maximum or be less than an optional minimum accumulated value).

Thus, in a preferred embodiment, a cell/element can be programmed to represent either a neuron or a synapse, a neuron has an accumulator, optionally with a maximum and a minimum allowed stored value, a threshold, and an optional refractory period parameter, and a synapse has an associated time delay parameter and a weight, which may instead by associated with an input of a neuron. The configuration of a programmed neural network comprises the cells/elements of the neuromorphic device of FIG. 10A that are used to implement neurons and synapses, the connections between the neurons and synapses, and the parameters of these neurons and synapses. This configuration is preferentially initialized and possibly modified by the control and optionally optimizing device 1060 via the interface and control structure 1040 and/or the configuration structure 1050.

Neurons 1016 and 1022 and synapses 1018 and 1020 may comprise a loop in the depicted neural network. A loop may be regenerative in a neural network in the sense that, given appropriate initial conditions, one or more of its neurons may create a sequence of events indefinitely. Such a loop can be one example of a central pattern generator (CPG). Such as loop may be a substructure or component that is useful and so its structure and function stored in a database or library for use or reuse; (see FIG. 20, library 2040). The regenerative behavior is dependent upon the structure of the loop, the weights associated with the synapses or inputs to the neurons, and the time delays associated with the synapses. For example, if neuron 1016 has an initial accumulator value of 1 and a threshold of one, and if neuron 1022 has an initial accumulator value of 0 and a threshold of one, and if both synapses 1018 and 1020 have time delay parameters of 1 and weights of 1, then both neurons 1016 and 1022 will fire, creating an event, once every 2 seconds. If the time delay associated with either synapse 1018, 1020 is decreased (increased), then the firing rate of both neurons 1016, 1022 will increase (decrease). If the weight of synapse 1020 has a value of −1 instead of 1, then neurons 1016 and 1022 will each fire only once (unless possibly when a threshold is negative in which case it may be possible for a neuron to fire even upon receipt of an event having a negative weight); furthermore, a subsequent event input from synapse 1014 to neuron 1016 with a weight of 10 will cause neurons 1016 and 1022 to fire exactly once. Events produced by neuron 1022 can follow a path through the neural network comprising synapses 1024, 1026, and 1030, and neurons 1028 and 1032, to be received by interface and control 1040 from an output signal line represented by output 4 of neuron 1032, and such signal can cause a signal or change in a signal to external process 1080 via modulator and/or demodulator 1070. This, or a portion thereof containing one or more neurons and/or synapses, is an illustration of an implementation of a dynamic system using a neural network of the type described herein, where for the purposes of this application a dynamic system is a system, process, or device whose current output is determined by its current input and an internal state, and where such dynamic process may be coupled via one or more output(s) and/or input(s) to an external process 1080. In these cases, the internal state comprises the values of the accumulators in the neurons and any events that have been applied to inputs of synapses but for which corresponding outputs from the synapses have not yet been created or applied to inputs to neurons.

Now, methods for communicating with distant elements in a DANNA will be discussed. An array of circuit elements of FIG. 9A or FIG. 9B was first shown in FIG. 10A. In FIG. 10A, an element 1012 is shown with addressable Input/Outputs 0 through 8 in a simplified embodiment. Element 1012 may have, for example, eight inputs or outputs to other internal array inputs or outputs of other circuit elements. Similarly, element 1014, by way of example, may have Input/Outputs 0 through 8 which may connect to yet another circuit element internal to the array. Circuit element 1032 is shown as providing inputs or outputs to components external to the array devices (such as a display, a camera, a radio or scanner). In a DANNA, this element is typically a synapse. We will define an output neuron as the neuron providing an output to an external process.

A given element may exist in two or three dimensional space and so may be addressed with coordinates X, Y in space (Z if three dimensional space). More dimensions may be utilized. Each I/O may be addressed as a number between 0 and 7 (FIG. 9A) or 0 and 15 (FIG. 9B). This address will be referred to herein as an I/O Address Select signal and proceeds from a control unit which may be a random number generator, a counter or other known means of generating addresses for sequential addressing of elements. The "I/O select address" of each I/O for connected elements may align so when each "element input" is sampled by that element, the element connected/driving this input is aware of the response to its "output". There are many ways to "layout" and "connect" the elements. The ways shown in the drawings are just examples. The key is the "I/O select addressing" and the ability of an element to determine how a connected element responds to its transmission of a "fire" condition.

An array of elements can be implemented using a FPGA or an ASIC device other integrated circuit device, as previously disclosed, using an element that is configurable and programmable and that can communicate with its eight (8) nearest neighbors using communication links for input and output, as shown in FIG. 10A showing an exemplary array of elements of a DANNA with a communication path shown. Note that the array can be of any size by repeating the pattern of any 2×2 block of elements along an edge (or a portion thereof). The inputs and outputs in this figure are numbered in order to identify the inputs and outputs in adjacent elements to which they are connected. To elaborate, consider FIG. 12A, which is a subset of the above array, namely a 3×3 array of elements (neurons or synapses). The center element 1210 in this 3×3 array may communicate with its eight neighbors using the middle communication link along each side to communicate with the element immediately to the left, right, top, or bottom, and may use the corner communication link to communicate diagonally with one of the four corner neighbors using a two-dimensional I/O address select signal. The numbering system is arbitrary but, in FIG. 12A, for example, I/O 6 of 1210 may communicate with I/O 6 of 1205 while I/O 2 may communicate with I/O 2 of element 1215. As discussed above, elements 1205, 1210 and 1215 may selectively be a neuron or a synapse.

This same connectivity pattern can be utilized to connect any element with up to eight (8) additional elements located more distantly from the element. The approach can be applied more than once to provide connectivity to elements at different distances from any element, and any element may be so connected. The central element 1210 must acquire inputs from each of the adjacent elements for which the input line from that element is enabled. (Enabling and disabling is determined by a set of binary values in the central element 1210, each value corresponding to one of the inputs.) In a hardware implementation, it is advantageous to sample the enabled inputs sequentially (although not necessarily in the order shown in the diagram) because this requires significantly less complexity (and area) in the implementation of the element. Sequential sampling implies there is an order in which the enabled inputs are read, and when long-term potentiation (LTP) or long-term depression (LTD) is implemented to affect the future values transmitted from the adjacent elements to the central element, the order of sampling can significant.

In a preferred implementation, inputs from adjacent enabled elements are sampled sequentially. Consider the clock signals shown in FIG. 10B. The Global Network Clock, otherwise known as the firing clock, is labeled G_N_C. The Acquire Fire Clock, labeled A_F_C, is used to sequentially select each input (using the 3-bit Global Input Select signal, labeled G_I_S, assuming there are eight inputs as in the diagram above) and operates at a frequency eight times the frequency of the G_N_C. These clocks are also shown in FIGS. 9A and 9B for each of an 8 I/O embodiment of an element and a 16 I/O embodiment of an element respectively (but labeled differently).

Long term potentiation (LTP) and long term depression (LTD) functions are implemented by synapses and modify synapse weights. A design alternative is to implement LTP and LTD in the inputs of the neurons. The current value of a synaptic weight is gated to the output of the synapse at the beginning of a G_N_C cycle (preferably but not necessarily the leading edge) if the output of the synapse's FIFO indicates that an output should be generated; otherwise a weight of zero is gated to the output. LTP and LTD are implemented by monitoring the output of an adjacent neuron, which is specified by the configuration of the synapse. The neuron's input from the synapse should be enabled; otherwise, no LTP/LTD occurs within the synapse.

Referring again to FIG. 12A, suppose that central element 1210 of the above array is configured as a neuron and the two horizontally adjacent elements 1205 and 1215 are configured as synapses. LTP/LTD should occur symmetrically on all synapses connected to enabled inputs of a neuron. To accomplish this either the order in which the neuron's inputs are sampled should be randomized, or the initial input to be sampled should be randomly selected, after which the inputs are sampled sequentially. The second approach is preferred. In this case, the neuron 1210 of FIG. 12 may sample, in successive G_N_C cycles, inputs in the order (3,4,5,6,7,0,1,2), (1,2,3,4,5,6,7,0),(4,5,6,7,0,1,2, 3), . . . , where the first input sampled (3, 1, 4, . . . ) is chosen randomly with approximately equal probability. The parentheses are merely used to group input indices into groups of 8 corresponding to cycles of the G_N_C and the assumed eight inputs of each element. It is preferable that all elements of a neuromorphic array utilize the same input sampling sequence. This reduces the complexity of the implementation, and it also significantly simplifies the logic necessary to implement LTP/LTD in the elements configured as synapses 1205 and 1215. This is because when a neuron's input, such as 1210 is connected to a synapse's output, such as 1205 the synapse knows when its output is sampled by the neuron and thus when it needs to monitor the neuron's output to detect if the output generated by the synapse caused the neuron to fire. Furthermore, the synapse can monitor the neuron's output before the neuron samples the synapse's output and determine if the neuron has already fired during the current cycle (caused by a different input or an input sampled during the previous cycle of the G_N_C) and is therefore in its refractory state. If instead the order in which the neuron's inputs are sampled is randomized, each input should have approximately equal probability of selection for sampling. In this case one method to implement LTP/LTD requires an additional signal line from the neuron to the synapse to provide an indication that the neuron fired because of that synapse's input.

A number of different methods and implementations exist in the digital hardware literature to enable the random selection of an input to a neuron. As suggested above, a random number generator may be used. Or, for example, a linear feedback shift register can be used. A second method and implementation is to store a large number of randomly generated values to be used to select the first input to be sampled during each G_N_C cycle. A third method is to store digits of an irrational number, or a long sequence of non-repeating digits. A fourth method is to sample an analog noise source such as a reverse biased diode junction or a source of thermal noise in order to choose one or more binary digits. A fifth method is to use a digital signal processor (DSP) block to compute a sequence of pseudo-random digits or binary values using, for example, a cryptographically sound random number generator algorithm or a software implementation of a linear feedback shift register or a linear congruential generator. Several of these methods can be implemented in hardware without resort to an algorithm implemented in software and executed by a DSP or other processor.

The numbering scheme (0, 1, 2, 3, 4, 5, 6, 7 or 0-15 or 0-24 (a three ring element has been constructed with a ring structure analogous to that shown in FIG. 13) is arbitrary as is the sequence through which the hardware (DANNA or control unit) implements the scans of the elements. Greek letters or pictographs could be used instead of numbers. Whatever the symbols used and whatever sequence is used to interrogate inputs and to produce outputs by elements, two elements that are connected by an input/output line(s) must synchronize their actions with respect to that line in order to implement LTP/LTD (and, each element must do this with every other element to which it is directly connected by an input/output line(s). The numbering schemes given are one example; other obvious examples would be to reverse the numbering or order in any or all rings or circles or layers of numbered I/O lines, and to interleave the numbering or ordering of I/O lines between such circles, rings, layers. Any numbering scheme or permutation of these numbers will work, as long as all numbers or symbols are replaced by permuted values.

The pattern of interconnections between elements can be repeated by connecting from each element to 8 (16, 24) elements not adjacent to said element, as for example disclosed in some of the figures, and the same (or a similar) pattern of interconnections can be used multiple times to provide connections among all elements. FIG. 13, described further herein, discloses a way to do this using, for example, 4 equivalent patterns of interconnections for a distance 2 layer. Further examples are discussed in the related DANNA patent application incorporated herein by reference.

By example, and referring to FIG. 13, element 1320 is connected to adjacent elements 1304*a*/1304*b*, 1312, 1325, 1326, 1305a/1305b, 1310, 1318, and 1308 using a distance 1 layer or ring structure and input/output signal lines labeled with the digits 0, 1, 2, 3, 5, 6, and 7 (where 1304a/1304b and 1305a/1305b had two rings or layers). In this example, all of the elements (1302a/1302b, 1308, 1304a/1304b, 1312, 1306, 1316, 1318, 1320, 1325, 1328, 1315a/1315b, 1310, 1305a/1305b, 1326, 1330, 1314, 1322, 1324, 1332, 1334, 1335a/1335b, 1336, 1340a/1340b, 1342, and 1345a/1345b) are connected to their adjacent neighboring elements in this manner. Note that the "a" and "b" designations in the elements' reference numbers in FIG. 13 refer to the distance 1 layer and distance 2 layer input/output signal lines, respectively. In a like manner, elements 1302a/1302b, 1304a/1304b, 1306, 1315a/1315b, 1305a/1305b, 1330, 1335a/1335b, 1340a/1340b, and 1345a/1345b are connected to elements at a distance of two (skipping one intervening element) using, for example, the same pattern of interconnections used for the distance 1 layer connections. By example, element 1305a/1305b is connected to elements 1304a/1304b, 1306, 1330, 1345a/1345b, 1340a/1340b, 1335a/1335b, 1315a/1315b, and 1302a/1302b using a distance 2 layer or ring structure and input-'output signal lines labeled with the digits 8, 9, 10, 11, 12, 13, 14, and 15. The input/output signal lines so numbered are indicated by the reference numbers containing the "a" designation in the instances where, for clarity, this distinction has been made, as in the portion of element 1305a/1305b referenced by 1305a. In order to implement distance 2 layer connections for all elements, four (4) patterns of interconnections are necessary, corresponding to the pattern of heavier lines in FIG. 13 and three similar interconnection patterns (not shown) including one of elements 1308, 1316, and 1318. Not all interconnection patterns of a distance K layer (K an integer and at least one) need be implemented; for example, 0, 1, 2, 3, or 4 may be implemented for a distance 1 layer of interconnections, and any N may be implemented, where N is an integer between 0 and 25, inclusive, may be implemented for a distance 5 layer of interconnections. Examples that indicate the possibility of one or more layers corresponding to distances 1, 2, 3, and 5 are illustrated in the related DANNA patent application filed concurrently herewith of the same inventors.

Another aspect is the randomization of the choice of the first I/O line to be used by an element during each cycle, after which the other elements are used in a predefined sequence. The utility of this randomization is to ensure that on average all elements' outputs are treated equally by a receiving element so that LIP/LID effects are equally probable in each of the connected elements. This prevents one element from "hogging" the effects (for example, claiming credit for making a neuron fire) of all LIP/LTD activities with a connected element.

Yet another aspect is the manner in which LIP/LTD is implemented. As an overview, an element (configured as a synapse) that delivers an event to a receiving element configured as a neuron watches the receiving neuron's output line (that returns to the synapse) to detect whether the neuron is already firing (in which case there is a LID effect) or fires in response to the delivered event (causing LTP). This "watching" occurs at a specified point in time after the delivery of the event to the neuron, and the hardware is designed in a manner that allows the synapse to determine whether its event, or an event delivered by another synapse, caused the neuron to fire.

Referring again to FIG. 12A, suppose that element 1205 is configured as a synapse, and that the element is configured as a neuron 1210. Assume that input 6 of the neuron 1210 is enabled and that the synapse 1205 is configured to monitor its input/output signal line 6 to detect when the neuron 1210 fires. When the synapse 1205 emits an event (a weight) on its outputs, the neuron 1210 detects that event. The neuron 1210 adds the weight received on input 6 to its charge accumulator, and then either (a) the neuron's charge state is not sufficient to cause the neuron to fire, in which case either the next input is sampled or the neuron 1210 presents its output to its neighbors (after all inputs have been sampled) or (b) the neuron 1210 is not refractory (has not determined previously during the current firing cycle that it must fire and is not already firing) and its charge state is sufficient to cause the neuron to fire, in which case it changes its output to indicate that it is firing on the next phase of the firing clock, or (c) the neuron 1210 is refractory (has determined previously during the current firing cycle that it must fire or is already firing), in which case it samples the next input or presents its output to its neighbors.

It is preferred that the neuron 1210 indicate on its outputs that it will fire on the next G_N_C cycle immediately or soon after its determination that it will fire. Note that in this preferred design only the neuron's output at the beginning of each G_N_C is sampled to connected elements to determine if it has fired. By changing its output mid-cycle, connected synapses are able to determine when their outputs caused the firing event, or that their output could not cause the neuron to fire because it is in its refractory state and is already firing.

The Dynamic Artificial Neural Network Array (DANNA) hardware definition may specify a grid of elements, each of which that can be defined as either neurons or synapses. Each element can connect to eight (16 or 24 and so on) of its neighbors. Depending on the type of element, this connectivity may be restricted. For example, one definition of a synapse only has one enabled connection from another element and only connects to one element (which may be the same element). Thus, the other six or seven output ports are not in use. Because of this definition of a synapse, arbitrarily defining a path in the grid may inadvertently cut off a portion of the grid from the current network. Other definitions of a synapse are possible, allowing multiple inputs. If multiple outputs are allowed, one can be monitored by the other synapse to implement LTP/LTD without introducing logical ambiguity.

Moreover, there are many structures that do not utilize as much of the connectivity of the network as may be needed to solve many complex problems. Thus, it may be advantageous to pre-define a grid structure, so that when designing the network, only parameters are optimized (thresholds of the neurons and delays and weights of the synapses). We define one grid structure in terms of a 4×4 element block and discuss possible permutations of that grid structure. An example of a 4×4 element block that we define is given in FIG. 12B.

Figure 12B:
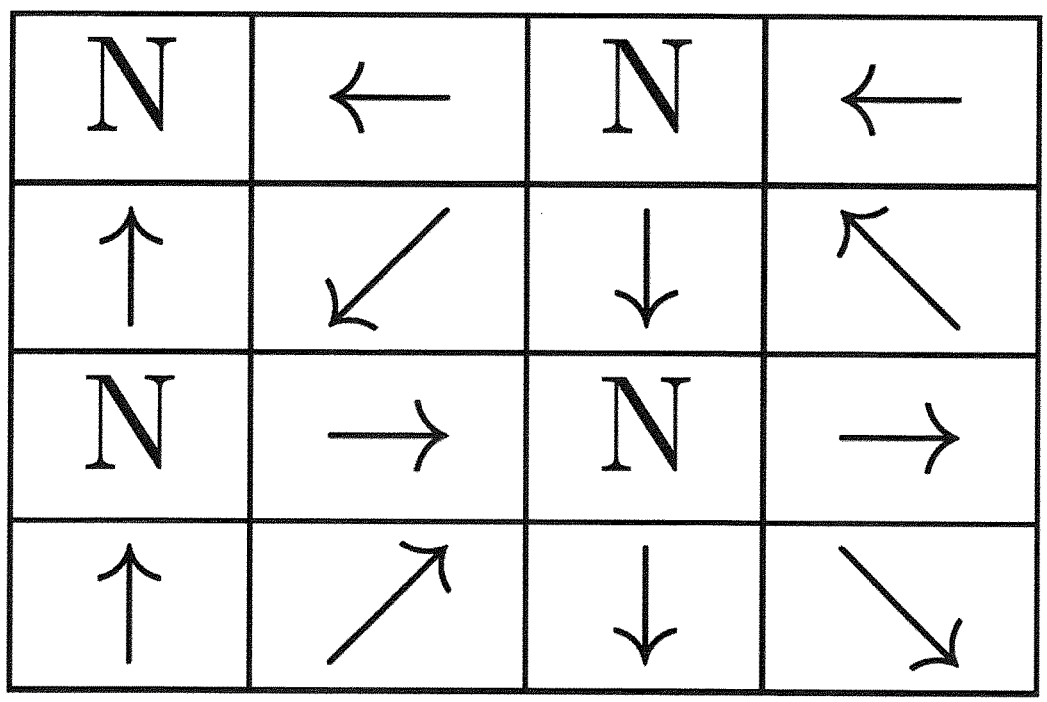
FIG. 12B shows a representative four by four block of circuit elements comprising neurons N and synapses, the synapses represented by arrows.
Figure 13:
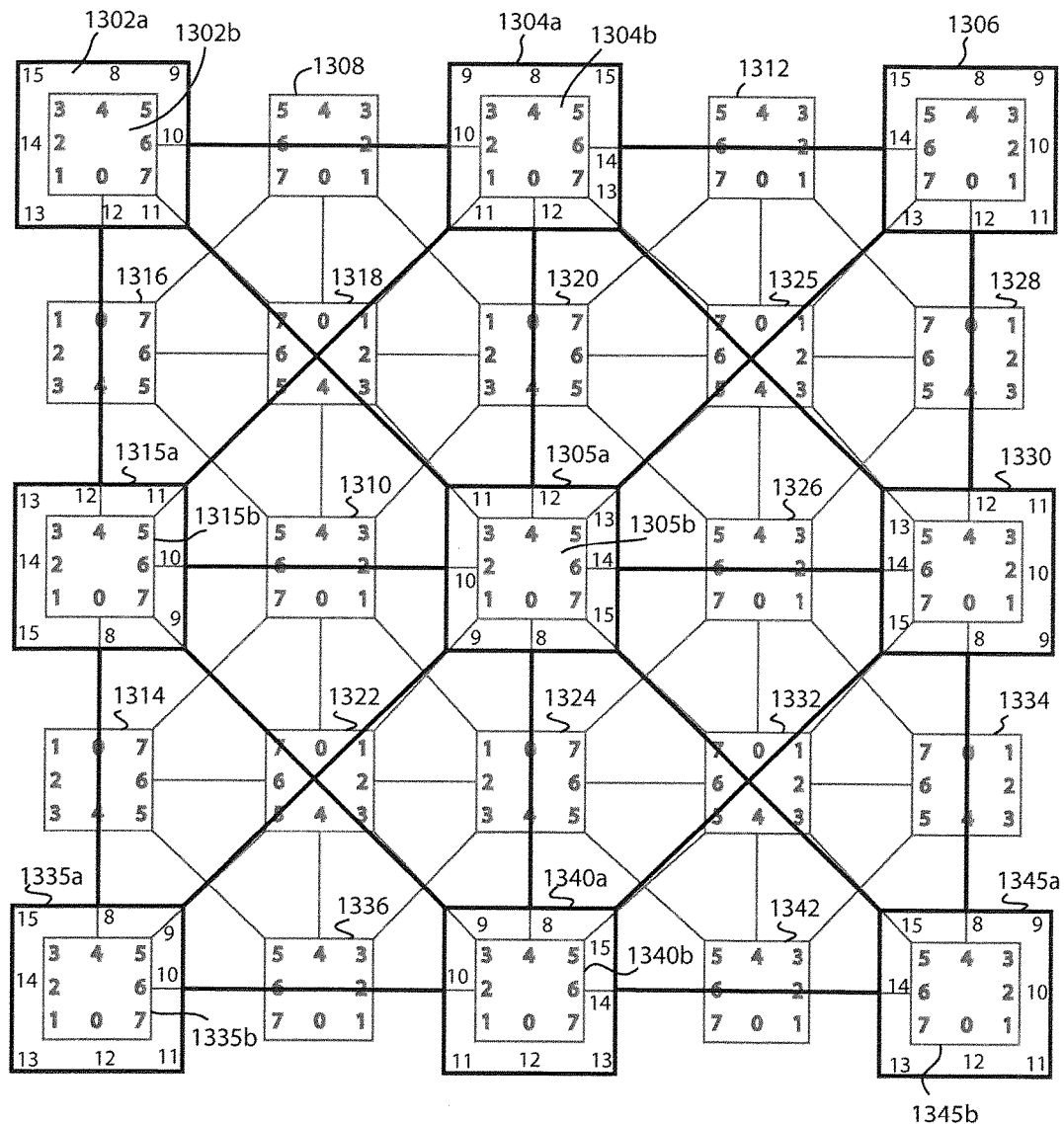
FIG. 13 shows an array with a second set of connections, skipping every other element such that a given circuit element may have as many as 16 indicated I/O's numbered 0-15.

Each arrow represents a synapse in FIG. 12B. In all 4×4 blocks, neurons are placed at coordinates (r, c) where r and c are both even (assuming both row and columns are indexed starting at zero). Synapses on even rows are one of the following (where all synapses in that row are of the same type): ← and →. Synapses in even columns are one of the following (where all synapses in that column are of the same type): ↑ and ↓. Synapses in odd rows and odd columns are one of the following: ↑, ↓, ←, or →. For this definition, interior neurons (those that are not along a border) are guaranteed to utilize at least four of their connection ports: the port to the element directly above, the port to the element directly below, the port to the element directly to the left and the port to the element directly to the right. Moreover, two of these are incoming connections, and two are outgoing connections.

Figure 12C:
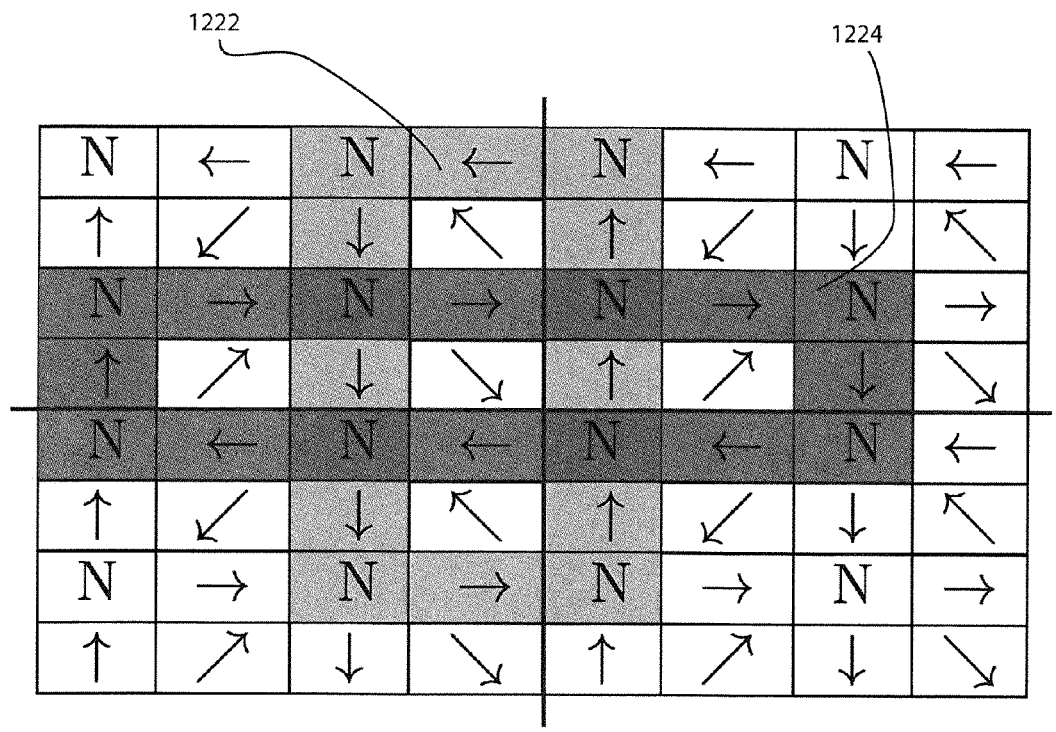
FIG. 12C shows four (4) four by four blocks of circuit elements showing an overlapping dark gray loop through certain neuron (N) and synapse (→) elements 1224 that overlaps a second light gray loop 1222 of neurons and synapses.

These 4×4 blocks of elements (FIG. 12B) may be tiled together to form arbitrarily large networks. These larger network blocks have built in cycles (FIG. 12C) that are likely to be useful in many computational tasks, as we know that "cyclical" connections play important roles in the mammalian brain. FIG. 12C shows (4) 4×4 element blocks (forming a square) and also shows a first highlighted path 1222 forming a counterclockwise loop and a second highlighted clockwise path 1224 which loops may overlap one another. Loops 1222 and 1224 are examples of cycles in this tiled 4×4 example.

Consider by example the following design: Assume that the neuron samples each of its enabled inputs (assume there are eight) at the beginning of one clock cycle of the A_F_C, a clock operating at 8× the frequency of the G_N_C. Assume also that the neuron and synapse have agreed upon an input/output signal line numbering scheme such as is shown in the first diagram under "Random selection of inputs". In particular, such a numbering scheme requires that adjacent elements use the same index number to refer to the input/output signal line that connects them, as shown. Assume also that the adjacent elements use the same sequence of indices to sample input signal lines during each G_N_C cycle; for example, they might use the sequence (3,4,5,6,7,0,1,2) or the sequence (3,5,7,1,2,4,6,0). Regardless of the sequence, because of this agreement the neuron samples its input signal line 6 during the same A_F_C cycle as the synapse that generated that input determines whether its output caused the neuron to fire, or whether the neuron is in its refractory state.

LTD/LTP Definition and Operation:

When an element is programmed and/or is operated as a synapse, it has the ability to potentiate (increase) or depress (decrease) its weight as a function of the impact its "output firing" has on the neuron connected to its output. This potentiation of a synapse weight is referred to as "Long Term Potentiation" or LTP. We refer to the depression of a synapse weight as "Long Term Depression" or LTD. If a synapse's firing causes its connected neuron to fire, it will potentiate its weight by a predetermined amount (in one example implementation, it increments its weight by 1). If a synapse's firing occurs while its connected neuron is already in a "firing state", it depresses its weight by a predetermined amount (in our example implementation it decreases its weight by 1). The amount of potentiation and depression is the same for all synapses in an array and can be set during the arrays' implementation.

Each synapse of a DANNA may monitor the firing state of the neuron connected to its output so it can determine if its weight is be altered. To support this function, the I/O of each element may be assigned an "I/O select address". There may be, for example, 16 I/O select addresses for arrays using elements with 16 I/O ports (FIG. 9B, for example). Elements may be connected in the array such that the I/O ports used to connect elements together have the same I/O select address. Since each element has access to the output port of each of its connected elements, this I/O select address assignment allows an element to monitor the firing of each element connected to its I/O. A global I/O address generator may be used to sequence the sampling of each I/O for the elements in an array during a single array cycle. This address sequencing and the assignment of the same I/O address to the connections between elements allows each element to monitor elements assigned to it as an output element.

We define an "output select register" as a programmable register in each element that indicates which I/O port (or address) is being used as the active I/O port (input enabled) by a connected element. The "output select register" is only valid when the element is programmed as a synapse. A synapse may be defined as having only one of its connected elements enabled to receive its output. When the I/O select address matches the contents of the output select register and a synapse is in a firing state, that synapse can sample the firing state of the element programmed as its connected output neuron.

There are three possible conditions which can result from a synapse firing: 1. The output neuron does not fire; 2. The output neuron fires at a time associated with sampling the input associated with the connected synapse; and 3. The output neuron was already firing, caused by another firing connected synapse who's I/O was sampled earlier in the network cycle.

A network cycle may be divided into 16 clock cycles (for arrays with elements with 16 I/O ports such as FIG. 9B). If a neuron fires one clock cycle after a particular I/O select address (the point at which the neuron samples this I/O port), the synapse associated with this I/O port will assume another synapse caused the neuron to fire and depress its weight if it is presently firing (condition #3 above). If a neuron fires two clock cycles after an I/O select address, the synapse associated with this I/O port will assume it caused the neuron to fire and potentiate its weight if it is presently firing (condition #2 above). If a synapse detects no firing by its connected neuron, its weight sees no change (condition #1 above). Note that the choice of "number of cycles" after an I/O address select to sample a neuron's firing state may be driven by the state machine design (LTD/LTP State Machine in either FIG. 9A or 9B) of the element and somewhat arbitrary. We could have shortened or lengthened this sample point by one clock cycle as well.

Referring now to FIG. 11, there is shown an overall schematic block diagram of a special purpose computer processor system 1100 on which an embodiment of an interface and a controller 1040, 1060 may be executed. FIG. 11 illustrates an overall system block diagram of a special purpose processor architecture and environment 1100 that may be used according to an illustrative embodiment of a NIDA and/or for controlling a DANNA, combination thereof or combination of substructures thereof for performing at least one of a control, detection and classification application. The processor may comprise but not be limited to comprising a computer or an intelligent device such as a smart telephone, personal computer, server, client, or other processing device. The special purpose processor features a neural event data collection and identification software application for receiving data from one or more various input devices (electrodes, camera, scanner, keyboard, touchscreen, analog to digital converters, modulators and other known input devices) and includes but is not limited to including a communications interface or interfaces, a program controlled computer and/or a computer bus and output devices such as human body implants, radio frequency data transmitters, computer displays, and other output devices known in the art.

Comparison of one or more neural network's performance against a desired performance or the behavior of a device or process may be done manually or automatically and may include learning in a learning environment prior to application, using special purpose or customized hardware or a separate special purpose computer or processor, or, according to a special purpose computer-implemented algorithm on a computer system 1100 according to FIG. 11. At least one input device receives a neural event or spike that may, for example, comprise an analog to digital converter or a modulator such as a modulator using pulse width modulation or another modulation method known in the art for encoding varying signals or sampled signal values as discrete or digital values or events, and, as appropriate, a neural event simulator or hardware device. Methods of a first embodiment and subsequent embodiments of a system 1100 may be utilized in connection with computer readable media which may be provided for temporary or permanent storage in a personal computer, an intelligent communications device or other computer or computer system 1100 comprising one or more parallel processors known in the art. Two or more computer systems 1100 may be employed to operate neural networks and implement interfaces between neural network simulations and their environments or operating neural networks in real time in a cooperative manner in order to address large-scale applications in the control, detection and classification arts. In this case, the two or more computer systems 1100 may communicate using communications devices within or attached to each computer system 1100 such as a network adapter, a radio transceiver, a cellular telephone or a device that interfaces to a packet-switched network or a telephone line. For real-time applications of control, detection and classification, computation speed is important, and communication and external processor delays may be preferably avoided.

FIG. 11 is a block schematic diagram that illustrates a special purpose computer system 1100 upon at least one embodiment of a NIDA, a DANNA, a substructure thereof or combination of any of these with other functioning neural networks known in the art for performing one of a control, detection and classification application. Computer system 1100 may include a bus 1102 or other communication mechanism for communicating information, and at least one device 1104 such as an input device that may be an analog to digital converter, at least one electrode, a modulator or an event data receiver coupled with the bus 1102 for receiving, processing and forwarding collected event data information for local use or remote transmission to a remote server. Other devices 1104 may comprise an are not limited to a camera, a GPS system, a scanner, an event simulator, an environmental data sensor, real-time of day and date stamping, interfaces to mammalian (human or otherwise) tissues including neural tissues or cells, muscular tissues or neuro-muscular biological systems, robotic systems, location and movement sensing of a simulated human body, reporting devices and other known devices, for example, of a typical personal computer and/or medical devices for collecting data. Further such devices may comprise a computer, a graphics processor, a FPGA or another digital device having a configuration or program and simulating the behavior of a physical system such as a mechanical linkage, an engine, a compressor, a motor, a power generation system or a biological organism.

Computer system 1100 also includes a main memory 1106, such as a random access memory ("RAM") or other dynamic storage device, coupled to bus 1102 for storing information and instructions to be executed by controller processor 1105. Main memory 1106 also may be used for storing temporary variables, parameters or other intermediate information during execution of instructions to be executed by processor 1105 such as a neural network event data collection, image and identification software application or human identification software application. Memory may also be used as a communications medium or device to effect the transfer of information between computer system 1100 or its components and substructures such as another computer system 1100, a computer peripheral (for example, a keyboard, touchscreen, printer or display) or another type or category of processor such as devices within a supercomputer or implemented using a FPGA, a graphics processor or other device configured to operate as a neural network. Computer system 1100 may further include a read only memory ("ROM") 1108 or other static storage device coupled to bus 1102 for storing static information and instructions for processor 1105. A storage device 1110, such as a magnetic disk, optical disk, solid-state memory, or the like, may be provided and coupled to bus 1102 for storing neural event information, neuron and neural network image or visualization data and computer command data and instructions. Such stored information may optionally be modified by the execution of a stored program on a processor 1105 in computer system 1100 or located in another system or device. For example, such stored information may be accessible to other computer processors, devices or peripherals via a direct memory access (DMA) protocol and hardware or by using a communications channel. A storage device or any device coupled to the bus 1102 may be removable using a coupling mechanism such as a universal serial bus (USB) or other hardware specific to the type of storage hardware, such as a CompactFlash, SD or microSD card reader or p[ort (or the port may be local such as a wireless LAN). A removable storage device may be utilized to transfer information to or from computer system/intelligent device 1100. Information may also be transferred using a computer network or other communications network. Any of memories 1106, 1108, 1110 may retain program instructions according to any embodiment of data collection software and analysis hypothetically related to a simulated or real neural network, for collecting measurement data from, for example, a chemical, electrical, environmental, energy, vehicle system or transportation system or infrastructure. Measurement data may be collected in the form of events, as in, for example, events that correspond to the transmission of packets of data in a communications or communication network or through a communications device such as a network switch or amplifier.

Computer system 1100 may optionally be coupled via bus 1102 to a display 1112, such as a cathode ray tube ("CRT"), liquid crystal display ("LCD"), plasma display, television, small intelligent mobile telephone display or the like, for displaying information about the neural network and its modification from program execution or command instructions from the neural team or predetermined command instructions to a trained computer user. Display 1112 may provide a virtual keyboard for data input, a real keyboard (touchscreen), a joystick, a mouse and selector, a neural network reader or a one or two dimensional bar code reader via a camera or a touch screen. Display 1112 may provide a screen image comprising a whole or portion of a neural network configuration, optionally including at least one input neuron, an output neuron, neurons connected between input and output neurons by synapses and a visual representation of the structure of the neural network, for example, by displaying icons representing neurons and lines or arcs, with or without arrows or other designations indicating directions and coloring or shading or dash/dotted lines indicating activities or portions of the neural network. The screen image in one embodiment may be split to display multiple views, including, for example, a display of a neural network configuration or status and a visual camera image section for showing the environment of the control, detection or classification application. There may be a section of the image providing an ordered command set selectable for different possible neural stimulation events, showing a causality path, tracing a neural pathway from a particular input neuron and a display of information about an external or monitored process.

Alternatively, displayable information may be delivered to or collected from a computer user or another computer system or computer program using a communication interface 1118 or removable storage device. Communications interface 1118 can function as an interface between computer system 1100 and additional devices for collection of information, such as a neural stimulator for simulated senses, one or more affective systems, a neural probe for receiving electrical or magnetic signals corresponding to neural events in living tissue. The analog to digital converter, modulator or other devices 1104 as are well-known in the field in addition to a neural network event input device. Devices 1104 can include a digital to analog converter or a demodulator or a relay or other device capable of responding to events generated by a neural network during its simulation or real-time activity to affect an output of information to another device or system.

Communication interface 1118 can enable communication using wires, wirelessly (e.g. Bluetooth or WiFi), optical fiber, infrared light-emitting diode and photo reception, carrier wave, electromagnetic waveform or other technologies known in the art. There may be more than one communication interface 1118 (for example, satellite and land-based RF). An input device 1114, which may include a physical or virtual keyboard including alphanumeric and other keys, may be coupled to bus 1102 for communicating information and command selections to processor 1105 and for storage in memory. An optional type of user input device is cursor control 1116, such as a mouse, trackball, stylus, or cursor direction keys, for example, as may be found on some personal data assistants (PDA's) for communicating direction information and command selections to processor 1105 and for controlling cursor movement or the display on display 1112. The input device typically has two degrees of freedom in two axes, a first axis (e.g., x) and a second axis (e.g., y), that allows the device to specify positions in a plane. This input device may be combined with a display device such as a LCD with a touch screen, commonly found on mobile telephones or other telecommunications or presentation devices such as the Apple iPad or a computer tablet using the Android operating system. Alternatively, information and command selections may be communicated to processor 1105 using a communication interface 1118. Optionally, separate communication interfaces (for example, a WLAN) may be used to deliver information to a computer user or another computer system 1100 or computer program, and to communicate information and command selections to processor 1105.

The invention is related to the use of special purpose computer system 1100 for local and remote and automated neural network support with respect to a particular neural event or collection of sequential events of a particular application of the ANN. Such neural event data may be read into main memory 2606 from another computer-readable medium, such as storage device 1110 or via a keyboard. Execution of the sequences of instructions contained in main memory 1106 causes processor 1105 to perform the process steps described herein. In alternative embodiments, hard-wired circuitry may be used in place of or in combination with software instructions to implement the invention. For example, a field-programmable gate array (FPGA), VLSI or application-specific integrated circuit (ASIC) may be used. Such a device can, for example, implement associative memory to aid in indexing, search, and retrieval of neural network information or substructure or component information stored in memory or a database or library thereof to, for example, identify an event and provide a response. Thus, embodiments of the invention are not limited to any specific combination of hardware circuitry, computer systems 1100 and software. For example, one processor 1105 may be a control processor and optionally implement an evolutionary optimization algorithm and another processor 1105 may implement one or more neural networks (NIDA's or substructures thereof or related neural networks such as a DANNA) and include interfaces to and form a process, device or neural network for one of a control, anomaly detection and classification application.

The term "computer-readable medium" as used herein refers to any medium that participates in providing instructions to processor 1105 for execution or for storing information in a form that can be accessed by a processor. Such a medium may take many forms, including but not limited to, non-volatile media, volatile media, and transmission media. Non-volatile media includes, for example, optical or magnetic disks, solid state memories, and the like, such as storage device 1110. Volatile media includes dynamic memory, such as main memory 1106. Such a medium is non-transitory, i.e., it is intended to store data and computer instructions and does not output data to transmission media unless requested. Transmission media includes coaxial cables, copper wire and fiber optics and antennae. Transmission media can also take the form of acoustic or light waves, such as those generated during satellite and land-based radio wave and telecommunications data communications.

Common forms of computer-readable media include, for example, a floppy disk, a flexible disk, hard disk, magnetic tape, or any other magnetic medium, a CD-ROM, any other optical medium, solid-state memory, punch cards, paper tape, any other physical medium with patterns of holes, a RAM, a PROM, and EPROM, a FLASH-EPROM, any other memory chip or cartridge, a carrier wave, or any other medium from which a computer, controller or processor can read. Various forms of computer readable media may be involved in outputting one or more sequences of one or more instructions to processor 1105 for execution.

Computer system 1100 may include one or more communication interfaces 1118 coupled to bus 1102. Communication interface 1118 provides a two-way data communication coupling to a network link 1120 that may be preferably connected, for example, to a local area hospital network, a manufacturing site network or a chemical or energy process measurement network 1122 for one of control, anomaly detection or classification. The network 1122 may be used to affect the control of or take other automated actions within the hospital, manufacturing site network, chemical or energy process or other systems, sites or processes with similar networked communications infrastructure. For example, communication interface 1118 may be an integrated services digital network ("ISDN") or digital subscriber line (DSL) card or a modem to provide a data communication connection to a corresponding type of telephone line or wireless link. Preferably, communications transmitted over such a link are encrypted or otherwise protected according to known encryption schemes and/or watermarking algorithms to uniquely identify a source, for example, of a neural network event capture device or camera or scanner or neural network imager or graph or other input source. As another example, communication interface 1118 may be a network card (e.g., an Ethernet card) to provide a data communication connection to a compatible local area network ("LAN") or wide area network ("WAN"), such as the Internet or a private network. Wireless links may also be implemented in an example of running neural event simulation algorithms for improving an artificial neural network via an intelligent telecommunication device using, for example, WiFi, Bluetooth, or third generation (3G) or fourth generation (4G) wireless technologies such as WiMax or LTE. In any such implementation, communication interface 1118 sends and receives electrical, electromagnetic or optical signals that carry digital data streams representing various types of information between an artificial or real neural network and a neural event data collection device (such as an analog to digital converter). For example, a neural event may require a data communication connection to an information database comprising, for example, an artificial neural network for performing control, anomaly detection or classification, substructure thereof, component or a real neural network of millions of neurons. Portions of the computations associated with the collection and identification of neural event data and improvement of the artificial neural network through learning, the use of affective systems and evolutionary optimization as described herein may be distributed across multiple computer systems 1100 which may communicate using one or more communication interfaces 1118.

Network link 1120 typically provides data communication through one or more networks to other data devices. For example, network link 1120 may provide a connection through local network 1122 to a host computer 1124 or hospital server or manufacturing site, chemical or energy process or other systems, sites or processes or to data equipment operated by an Internet Service Provider or private network service provider ("ISP"). Such a service provider may operate in a "cloud" computing environment such that it is a web accessible service for, for example, an artificial neural network. The "cloud" may provide a NIDA for one of control, anomaly detection or classification or a component such as a visualization tool. An ISP in turn provides data communication services through a packet data communication network such as the worldwide network commonly referred to as the "Internet" 1128, an extranet, an intranet or other private or public network. An example of a private network is a secure data network used for transmission of information, commands and data. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages, commands and receive messages, commands and data, including program code, through the network(s), network link 1120 and communication interface 1118. In the Internet example, a server 1130 might transmit a requested code for an application program through Internet 1128, host computer 1124, local network 1122 and communication interface 1118 to a local intelligent device and apparatus.

Server 1130 may have associated clients, not shown, for assessment, analysis, artificial neural network control, and retrieval of stored simulated or real neural events and networks or substructures or components.

The received code may be executed by processor 1105 as it is received, and/or stored in storage device 1110, or other tangible computer-readable medium (e.g., non-volatile storage) for later execution. In this manner, computer system 1100 may obtain application code and/or data in the form of an intangible computer-readable medium such as via a carrier wave, modulated data signal, or other propagated signal. Special purpose hardware or hardware combined with a special purpose computer processor and memory may be configured and used to assess the performance of the neural network or the special purpose computer system 1100 itself for performing one of control, detection and classification. Device 1130 may comprise an identical or very similar range of components as system 1100 located at a remote site. For example, display screen 1112 of a remote site or local intelligent device 1100 may be a screen split into four (or more) or comprise four (or more) different screens or components. A similar screen may be associated with device 1130 not shown (device 1120 may have keyboard entry, a camera, a scanner, a neural probe, an analog to digital converter, a modulator, a memory of various types and the like connected by a bus). The screen 1112 on either system 1100 or device 1130 may show views from input device 1104, a section showing commands displayed at either end and views and data inputs from other data collection devices coupled to a console of system 1100 which may be remotely operable by neural network operators.

Computer system 1100 can be configured using the methods of this invention to provide services across a network or via a so-called cloud of servers to personnel or automated systems having client computers or intelligent telecommunications devices capable of connection to a network or other communication interface. These services can also be provided to other software, located in either computer system 1100, the cloud or a separate computer system such as a remote server or a cloud service connected by a network, network link, or communication interface to computer system 1100. The services can be protected using methods of authentication and/or encryption that are known in the fields of computer science and computer security in order to ensure data are neither compromised nor disclosed and to trace all accesses to the data. The computer system 1100 and other associated information storage and communication components can be protected using devices and methods that are known in the fields of computer science and computer security, such as with firewalls, physical access controls, power conditioning equipment, and backup or redundant power sources. The protection devices and methods, embodied as hardware, software or a combination of hardware and software, may be incorporated in computer system 1100 or exist as separate components typically connected by a network or other communications hardware. The information stored by computer system 1100 and computer-readable media can be further protected using backup or redundant information storage systems, such as those that are well-known in the art. Examples include tape storage systems and RAID storage arrays.

Neuroscience-inspired dynamic architecture (NIDA) (or DANNA) networks can be viewed as graphs representing the interconnections among two types of components: neurons (nodes) and synapses (edges). Neurons may have two parameters (threshold and refractory period) and exist in a bounded three-dimensional space. They accumulate charge or lose charge from a neutral state and fire when the charge exceeds the threshold; upon firing, neurons enter a refractory period, during which they may still accumulate charge but may not fire, even if the charge exceeds the threshold. Input neurons receive information from the environment, output neurons send information to the environment, and hidden neurons do not interact with the environment. Synapses are directed connections between two neurons and carry charge from one neuron to another. In this sense, the synapses of a NIDA correspond to the axons and synapses in a biological network. Synapses are defined by two parameters: delay and weight. Delay is governed by the length of the synapse(s) (distance between the two neurons the synapse(s) connects) and determines how long it takes for a fire event at the sending neuron of the synapse to affect the charge of the neuron at the receiving end of the synapse. The weight of the synapse determines how much the synapse charge increases or decreases at the destination neuron. (We note that this architecture is generalized in the DANNA hardware implementation.)

Unlike many traditional artificial neural networks, the operation of the network is governed by a discrete event simulation, where event types include fire events in neurons and change in charge events in synapses. One simulated time unit in the discrete event simulation corresponds to the time it takes for charge to travel one distance unit in the network.

NIDA (and DANNA) networks may be designed for a particular task within one of control, detection and classification applications using evolutionary optimization (for example, FIGS. 7A and 7B) and other optimization processes discussed herein. The design process determines the structure of the network (the number and placement of the neurons and synapses), the parameters of the network (such as the thresholds of the neurons and weights of the synapses), and the dynamics of the network (the delays of the synapses). We note advantages and some disadvantages to the use of evolutionary optimization (EO) to design NIDA networks (and networks in general). It is important to note that many of the network structures produced by evolutionary optimization may have equivalent behavior. A superficial example of this is that the same network rotated or translated in the three-dimensional space will behave exactly the same way as the original network. However, because of the varying parameter values, there are many other structures that are not as easily recognizable as equivalent that may still behave very similarly. This is one reason a visualization tool to explore the behavior of NIDA (or DANNA) networks is important.

In order to examine the behavior of the NIDA networks, NIDA was applied to create a three-dimensional (3D) network model as a special purpose software embodiment that may be executed on the special purpose processor of FIG. 11. Special purpose processing was used to represent the structure of a given special purpose network to scale (for example, in the classification arts). Visualization of spatial information is particularly important for NIDA (or DANNA) networks, since their structures are not pre-defined, but rather evolve over generations to better suit the given task (for example, control, anomaly detection and classification). An embodiment of a special purpose visualization tool of the present invention supports zoom and rotate so that the user can efficiently observe and explore the entire network or substructures within it. Neurons are preferably represented as spheres, all of the same size, while different colors may be used to differentiate between input, hidden, and output neurons. Colors may be chosen to be the same or time-varying. Alternatively, size, shape, or other distinguishing features of the visual representation of the neuron can be used in place of color. Synapses may be depicted as lines between neurons with cones (arrow heads), for example, at the output end to indicate direction of the synapse. Shading or variation in visual line thickness over time could also be used to indicate direction. Synapse color differences may encode positive versus negative weight, and stroke weight represents magnitudes of synapse weight (discretized to one-pixel increments). Multiple color schemes are available to suit various media. Two modes of operation, interactive and image rendering for video, allow a user to either interactively examine the network throughout the simulation or define preset interactions to be rendered for high frame rate videos and visualize development of neural pathways of a special purpose network over time.

An optimization procedure can be used to evolve a DANNA network by modifying the structure of the network, as determined by the number of elements used, the type of each element, and their adjacencies relative to each other, and/or the configuration parameters of one or more network elements. It can also be advantageous to modify the network clock frequency (G.N.C.) using the optimization procedure and a programmable clock. This allows the speed of operation of the network to be tuned to the time constants or other dynamic characteristics of a process (hardware, software, or mixed) to which the network is connected, providing improved performance or improved adaptability or tuning to current process conditions.

Classification—Breast Cancer, Diabetes and Iris Applications

NIDA networks which may be categorized as spiking neural network architectures trained with genetic algorithms or evolutionary strategies may be applied to compare against published results of other known networks using these datasets. The three classification data problem sets are the Wisconsin breast cancer data set, the Pima Indian Diabetes data set and the iris (flower) data set. Methods known in the literature using neuroevolution to train include the following all of which can be found in the literature and are not described in detail here: MPANN (Memetic pareto ANN, Abbass 2002); Fogel (Fogel et al. 1990 and 1995); Alba-GA (Alba and Chicano 2004); Alba-GALM (Alba and Chicano 2004); Alba-GABP (Alba and Chicano 2004); GP-StdX (Garcia-Pedrajas et al. 2006); GP-GaX (Garcia-Pedrajas et al. 2006); GP-SaX (Garcia-Pedrajas et al. 2006); MGNN-roul (Palmes et al. 2005); MGNN-rank (Palmes et al. 2005); MGNN-ep (Palmes et al. 2005); and EPNet (Yao and Liu 1997).

Spiking neural network methods include: SRM SNN (Belatreche et al. 2007); DSSNN (Belatreche et al. 2007); SpikeProp (Bohte et al. 2002 and Belatreche et al. 2007); Jin (Jin et al. 2007); SNN-PARDE (Pavlidis et al. 2005). Other methods compared include MDT (Abbass et al. 2001 and Abbass 2002); MatlabBP (Belatreche et al. 2007); Alba-BP (Alba and Chicano 2004); Alba-LM (Alba and Chicano 2004); HDAANNs (Yao and Liu 1997); FNNCA (Yao and Liu 1997); Perceptron (Parekh et al. 2000); MPyramid-real (Parekh et al. 2000); MTiling-real (Parekh et al. 2000); Pav-BP (Pavlidis et al. 2005); Pav-MBP (Pavlidis et al. 2005); and Pav-SMBP (Pavlidis et al. 2005).

Results for the diabetes set were also given for the following as reported by Michie et al. 1994: Logdisc, logistic discrimination; Cal5, a decision tree method; DIPOL92, a hybrid algorithm; Discrim, a linear discriminant analysis; Quadisc, a quadratic discriminant analysis; CART, a classification and regression tree analysis; RBF, radial basis function; CASTLE, casual structures from inductive learning; NaiveBay, Naïve Bayesian classifier; IndCart, a CART extension; and SMART, another classification and regression analysis. The first appearing acronyms are used in the tables and figures introduced below.

Breast Cancer

The Wisconsin breast cancer data set comprise 699 instances of patient information related to diagnosing breast cancer. There are nine relevant attributes per instance, each of which may be assigned a value between 1 and 10: clump thickness, uniformity of cell size, uniformity of cell shape, marginal adhesion, single epithelial cell size, bare nuclei, bland chromatin, normal nucleoli and mitoses. These nine attributes serve as inputs to all the networks including NIDA. The output of the network corresponds to one of two values: benign or malignant. There are missing values in the data set, which means that some of the instances are incomplete. The 699 instances can be divided into two sets: training and testing, where the training instances are used to train networks to complete the task and the testing set is used to verify how well the network was trained to complete the task. Results are reported in terms of classification error on the testing set.

The networks used in this comparison had nine inputs neurons, one corresponding to each attribute. There is a single output neuron. If that output neuron fires in the last 50 time steps of a 500 time step simulation, then the network classifies that instance as malignant; if the output neuron does not fire in that window, the network classifies that instance as benign. The values of each attribute are integer values and thus are easily converted into pulse streams. If the value is x, then x pulses were applied to the corresponding input neuron, starting at time 0, and spaced five simulated time steps apart. Thus, if the value is 3, then three pulses are applied to that neuron, one at time 0, one at time 5, and one at time 10. The missing values were set as 0 and thus ignored by the network. Other encoding schemes can be used.

A population of size 100 was used, with a crossover rate of 0.9 and a mutation rate of 0.99. The NIDA evolutionary optimization was allowed to proceed for 100 epochs or until the best fitness was achieved. The fitness function ran 150 randomly selected training instances of both malignant and benign types and evaluated how the network performed on those training instances. The fitness value was the fraction correctly classified. A perfect fitness function score corresponds to correctly classifying all 300 randomly selected instances, which may be a second stopping condition of the evolutionary optimization.

Table 5 below shows the results, listed by increasing testing error rate for a variety of methods on the breast cancer data set. Various known methods used different sized training/testing sets. NIDA's results are in bold type in Table 5 and are shown for two sizes of training/testing set. NIDA obtained the third best overall results amongst these comparative results and the best results for the smaller training size. The two methods with higher results than NIDA are Alba-GALM and GP-GaX, both neuroevolution methods that train traditional artificial neural networks. It is important to note that Alba-GALM is a method that made use of both a genetic algorithm and the Levenberg-Marquardt method to train the neural network for this task. This method may outperform NIDA because Levenberg-Marquardt is particularly suited for solving this type of problem for feed-forward neural networks. GP-GaX, on the other hand, uses an advanced crossover operation based on genetic algorithms to avoid the competing conventions problem, so it is essentially a nested genetic algorithm. Both of these methods are restricted to feed-forward neural network architectures, unlike NIDA, which works on recurrent architectures and with spiking neural networks. NIDA outperforms all of the spiking neural network methods on this task in terms of classification error.

TABLE 5

| Technique | Number Training Examples | Number Testing Examples | Testing Error |
| --- | --- | --- | --- |
| Alba-GALM | 525 | 174 | 0.02 |
| GP-GaX | 525 | 174 | 0.46 |
| NIDA | 525 | 174 | 0.5747 |
| Alba-BP | 525 | 174 | 0.91 |
| HDANNS | 525 | 174 | 1.149 |
| Jin | 525 | 174 | 1.2 |
| EPNet | 525 | 174 | 1.376 |
| Alba-GABP | 525 | 174 | 1.43 |
| FNNCA | 525 | 174 | 1.45 |
| NIDA | 341 | 358 | 1.676 |
| SRM SNN | 341 | 358 | 1.8 |
| MPANN | 400 | 283* | 1.9 |
| Fogel | 400 | 283* | 1.95 |
| SpikeProp | 341 | 358 | 2.4 |
| GP-SaX | 525 | 174 | 2.48 |
| MDT | 400 | 283* | 2.5 |
| DSSNN | 341 | 358 | 2.7 |
| MatlabLM | 341 | 358 | 2.7 |
| MatlabBP | 341 | 358 | 3.1 |
| MGNN-ep | 525 | 174 | 3.14 |
| Alba-LM | 525 | 174 | 3.17 |
| MGNN-rank | 525 | 174 | 3.22 |
| MGNN-roul | 525 | 174 | 3.23 |
| GP-StdX | 525 | 174 | 6.19 |
| Alba-GA | 525 | 174 | 16.76 |

Diabetes

The Pima Indian diabetes data set is composed of 768 instances of patient information related to diagnosing diabetes. There are eight attributes per instance: number of times pregnant, plasma glucose concentration, diastolic blood pressure, triceps skin fold thickness, 2-hour serum insulin, body mass index, diabetes pedigree function, and age. These attributes serve as input to the network. The output of the network corresponds to whether or not the patient has diabetes, based on those attributes. There are missing values in the data set, which means that some of the instances are incomplete.

The networks used in this comparison had eight input neurons, one corresponding to each attribute. There is a single output neuron. If that output neuron fires in the last 50 time steps of a 500 time step simulation, then the network classifies that instance as positive for diabetes; if the output neuron does not fire in that window, the network classifies that instance as negative. The input values were real-valued and not easily translatable to pulse streams, so, as was done in many of the other works using these data set, the values for each attribute were scaled to between 0 and 10 and rounded to the nearest integer. As in the breast cancer test case, if the scaled value is x, then x pulses were applied to the corresponding input neuron, starting at time 0, and spaced five simulated time steps apart. The missing values were set as 0 and thus ignored by the network. Other encoding schemes can be used.

A population of size 100 was used, with a crossover rate of 0.9 and a mutation rate of 0.99. The evolutionary optimization was allowed to proceed for 100 epochs or until the best fitness was achieved. The fitness function ran 75 random training instances of both class types and evaluated how the network performed on those training instances. The fitness value was the fraction correctly classified. A perfect fitness function value corresponds to correctly classifying all 150 randomly selected instances, which is the second stopping condition of the evolutionary optimization.

Table 6 gives the classification error results for the diabetes classification task. The results in the table are listed in increasing order by testing error. This task has a much higher testing error for all methods than both the breast cancer and iris testing sets, indicating that this task is particularly difficult to perform. For this method, NIDA again achieved the third lowest testing error. GP-GaX and GP-SaX outperformed NIDA on this task. GP-SaX uses simulated annealing instead of genetic algorithms to perform crossover, but again, it is a nested optimization algorithm. The same weakness applies to GP-SaX as GP-GaX; it is a method that is restricted to traditional artificial neural network architectures, specifically networks with a single hidden layer, whereas NIDA is a more flexible architecture and training method. Again, NIDA outperformed the spiking neural network methods given, as well as all of the statistical methods reported in Michie et al. (1994).

TABLE 6

| Technique | Number Training Examples | Number Testing Examples | Testing Error |
|---|---|---|---|
| GP-GaX | 576 | 192 | 18.4 |
| GP-SaX | 576 | 192 | 19.39 |
| NIDA | 576 | 192 | 20.3125 |
| GP-StdX | 576 | 192 | 20.82 |
| Jin | 576 | 192 | 21 |
| Alba-BP | 576 | 192 | 21.76 |
| Pav-SMBP | | | 21.88 |
| Logdisc | 576 | 192 | 22.3 |
| EPNet | 576 | 192 | 22.4 |
| DIPOL92 | 576 | 192 | 22.4 |
| Perceptron | | | 22.5 |
| Discrim | 576 | 192 | 22.5 |
| MTiling-real | | | 22.9 |
| SMART | 576 | 192 | 23.2 |
| MPyramid-real | | | 23.2 |
| Pav-MBP | | | 23.43 |
| RBF | 576 | 192 | 24.3 |
| ITrule | 576 | 192 | 24.5 |
| Cal5 | 576 | 192 | 25 |
| CART | 576 | 192 | 25.5 |
| Alba-LM | 576 | 192 | 25.77 |
| CASTLE | 576 | 192 | 25.8 |
| Quadisc | 576 | 192 | 26.2 |
| Alba-GALM | 576 | 192 | 28.29 |
| Pav-BP | | | 36.45 |
| Alba-GA | 576 | 192 | 36.46 |
| Alba-GABP | 576 | 192 | 36.46 |
| SNN-PARDE | | | 37.69 |

Iris

The iris data set is composed of 150 instances of measurement information of irises. There are four attributes for each instance: sepal length, sepal width, petal length, and petal width. These attributes will serve as input to the network. Each of the instances belongs to one of three classes of irises: Iris Setosa (class 0), Iris Versicolour (class 1), or Iris Virginica (class 2). The output of the network will correspond to one of these three class types.

The networks used in this comparison had four input neurons, one corresponding to each attribute. There is a single output neuron. The number of fires of the output neuron in the last 100 times steps of a 500 time step simulation was used to determine class. If the output neuron fired 10 times or less in this time window then the network classified the iris as class 0. If it fired between 10 and 20 times (including 20) then the network classified the iris as class 1. If it fired more than 20 times, then the iris was classified as class 2. The input values were real-valued and not easily translatable to pulse streams, so, as was done in many of the other works using these data sets, the values for each attribute were scaled to between 0 and 10 and rounded to the nearest integer. As in the breast cancer and diabetes test cases, if the scaled value is x, then x pulses were applied to the corresponding input neuron, starting at time 0, and spaced five simulated time steps apart. Other encoding schemes can be used.

A population of size 100 was used, with a crossover rate of 0.9 and a mutation rate of 0.99. The evolutionary optimization was allowed to proceed for 100 epochs or until the best fitness was achieved. The fitness function ran all 75 training instances and evaluated how the network performed on those training instances. The fitness value was the fraction correctly classified. A perfect fitness function value corresponds to correctly classifying all instances, which is the second stopping condition of the evolutionary optimization. Using all of the training data may lead to over fitting, but because of the small training size as much information as possible was used during training.

Table 7 gives the results for the iris classification task. The table lists the results in increasing order by testing error. NIDA achieved the best results for this task, outperforming both GP-GaX and GP-SaX, even though both of those methods used a larger training set. NIDA also outperformed all of the spiking neural network methods. NIDA often achieved perfect classification accuracy for the training set over the course of training, which may be one reason it was able to achieve a higher testing accuracy. Other methods have less restrictive stopping conditions for their training algorithms. This stopping condition is not good to use in general because it may lead to over fitting to the training set. However, NIDA may be less susceptible to that problem than methods using gradient methods for training because of the use of the genetic algorithm.

TABLE 7

| Technique | Number Training Examples | Number Testing Examples | Testing Error |
|---|---|---|---|
| NIDA | 75 | 75 | 1.3333 |
| Pav-BP | | | 2.66 |
| SNN-PARDE | | | 2.7 |
| DSSNN | 75 | 75 | 2.7 |
| SRM SNN | 75 | 75 | 2.7 |
| GP-GaX | 111 | 39 | 2.84 |
| GP-SaX | 111 | 39 | 2.95 |
| GP-StdX | 111 | 39 | 3.24 |
| SpikeProp | 75 | 75 | 3.8 |
| SRM SNN (sparse) | 75 | 75 | 4 |
| MatlabLM | 75 | 75 | 4 |
| Pav-MBP | | | 4 |
| Pav-SMBP | | | 4 |
| MGNN-ep | 111 | 39 | 4.68 |
| MatlabBP | 75 | 75 | 5.4 |
| MGNN-roul | 111 | 39 | 7.35 |
| MGNN-rank | 111 | 39 | 7.46 |

In these three examples (breast cancer, diabetes and iris), we discuss a neuroscience-inspired dynamic architecture (NIDA) and an associated design method based on evolutionary optimization. We present the results of this architecture and design method for a static classification task.

We note that our NIDA networks are not directly suited to static tasks (tasks in which there is no time component). However, many such tasks can be adapted to include a time component, as we did with the "scanning" of the handwritten digit images, thus taking advantage of the dynamic properties of our network. The main advantage of our network architecture and design method is that it can produce networks to solve a wide variety of tasks, including anomaly detection tasks, control tasks, and classification tasks. A primary disadvantage of using evolutionary optimization as the training method is that it can be relatively slow to adapt for some problem types. However, the flexibility that evolutionary optimization provides justifies its use.

A method for on-line learning using two populations of DANNA networks (or combination of NIDA/DANNA networks) is described with reference to FIG. 21. In this method, a period of off-line learning may be required. A population of networks that will be trained to accomplish a task is maintained and a learned model of the environment is also maintained. The learned model can also be a network as described herein, another neural network type, or any other model of the environment that can be adapted over time as the environment changes. During the period of off-line learning, the model of the environment is learned, and the networks of the population are trained based on the success of their interactions with the model of the environment, the environment itself, or a combination of the two. Alternatively, a physically based model, or a model determined using the principles of mathematics or physics, of the environment can be defined, and the networks of the population are trained based on the success of their interactions with this model of the environment, the environment itself, or a combination of the two. In some applications it may not be possible to use a period of off-line learning to determine a population of networks. In this case other methods may be used. For example, the networks may be specified manually or designed based upon the mathematics or physics of the model of the environment 2105.

Figure 21:
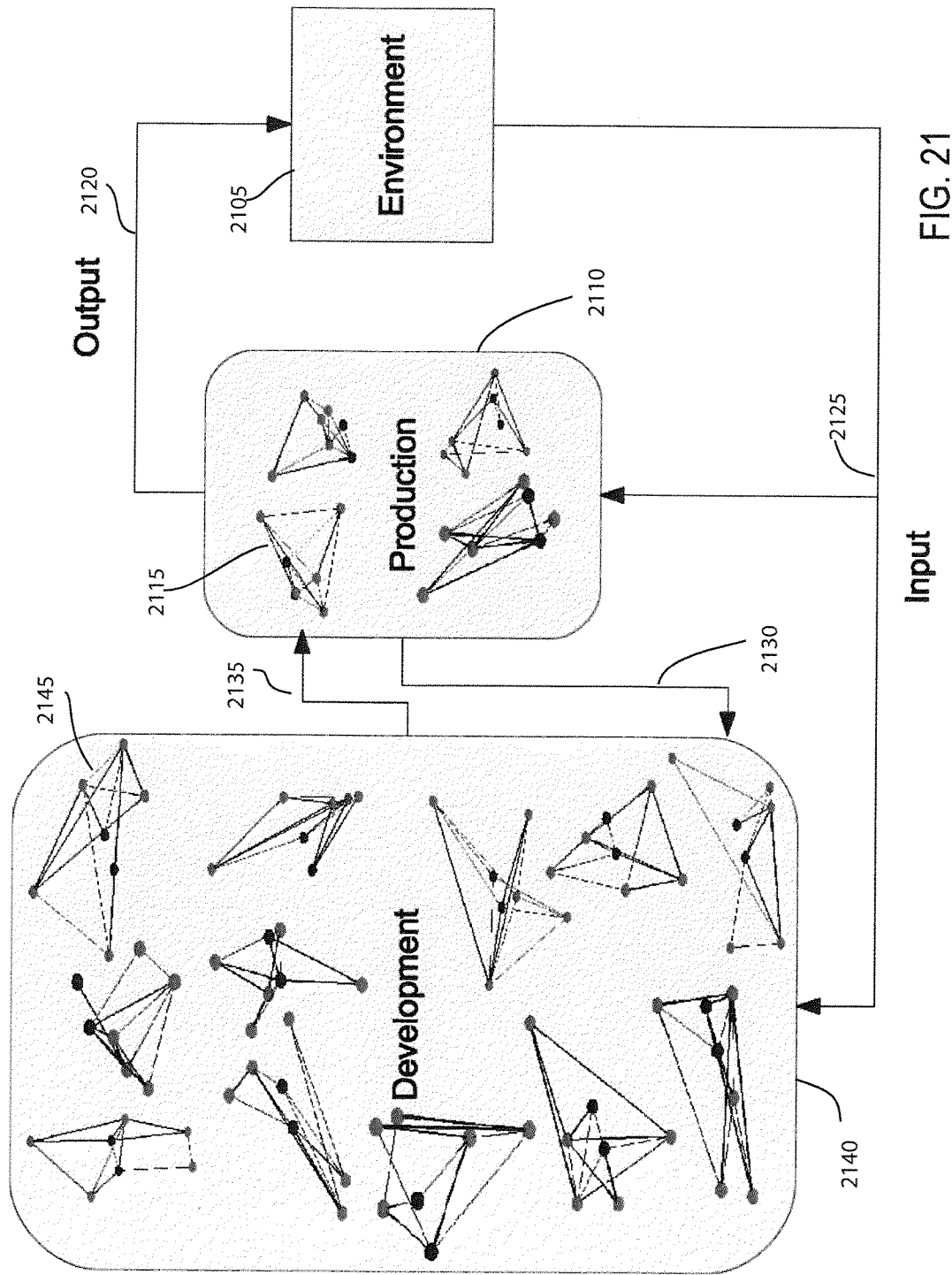
FIG. 21 is a general network diagram showing the relationship among development networks, production networks, and environment (where one or more NIDA or DANNA or substructure or combination thereof may affect a simulated or real world application) and input and output among development, production and the environment.

Referring to FIG. 21, at the end of this off-line learning period, or when the population of networks has been defined, this population of networks remains in software as a simulation or as a hardware implementation in one or more FPGA, but one or more of the best networks in the population are chosen to become "production" level networks 2110 that are preferably implemented in hardware. A combination of one or more of the output(s) of these production level networks is used to interact with the environment 2105, and again, the networks are judged based on the success of their interactions with the environment (potentially also with the model of the environment). All of the networks may be so judged, or a subset of the networks may be judged. Such a subset may be randomly chosen or chosen according to an algorithm that during multiple cycles chooses all of the networks at least once.

Preferably the model of the environment 2105 in software is updated as the environment changes. The networks that are simulated in software remain at the "development" level 2140 and may interact with the current model of the environment 2105. If or when a network in the "development" level 2140 outperforms one of the networks in the production "level" 2110 using the current model of the environment 2105, the network, for example, network 2145 at the development level is implemented in hardware using, for example, the disclosed array of neuromorphic elements, where the array may be located in a hardware component that is currently used by the production networks 2110 or a different hardware component, and interactions with the old production level network are shifted to the new network, while the old production level network is offloaded or read from the neuromorphic hardware (DANNA), and either added to the development population of networks 2140 implemented in software (NIDA) or removed.

The production and development populations of networks can be implemented in hardware and software, respectively, as disclosed above, both in hardware, both in software, or in software and hardware. The hardware may consist of one or more components, which may be neuromorphic and may be implemented according to the designs disclosed herein. The production hardware and development software implementation and the implementation where both production and development networks are implemented in hardware, are preferred.

Referring to FIG. 21, one approach is to split an evolutionary algorithm population pool into two teams: a production team 2110 and a development team 2140. The production team 2110, for example, may be made up of networks 2115 that perform well in the population. Inputs 2125 are provided by the environment 2105 to production team 2110 and to development team 2140. The output 2120 of the system is an aggregate, selection, or weighted combination of the outputs of the networks in the production team 2110. The development team 2140 may be lower performing networks that are maintained as part of the population for diversity. The entire population may be iterated over, except the production team 2110 may stay mostly in place (with fewer changes to the members), while the development team changes more rapidly. Members 2145 are promoted to the production team 2110 from the development team 2140 via 2135 depending on their performance. Similarly, members 2115 of the production team 2110 may be demoted 2130 to the development team 4540 or die off from the population entirely depending on their performance. (These may be extracted and reused even if they are unsuccessful because they are still useful as they may be extracted from an ANN used for the same task or sub-task of a given application (control, detection and classification).

The intent of this type of organization is that the production networks keep the overall system working regardless of the learning that is happening in the development networks. With this system, safeguards would be required to keep the production team's performance above a certain threshold. However, this threshold may not be explicitly given. For this type of system, an approximate value function, such as that used in reinforcement learning and approximate dynamic programming, may be useful.

Using this system, the overall performance of the algorithm should continue to improve. Also, using this method, the system should be adaptable to changes in the task at hand, if the task is changing over time. There are several issues associated with this approach that must be addressed in the design of an appropriate artificial neural network. One issue is how to score the networks that are part of the development population. The output of these networks is never reaching the environment and thus they have no effect on the performance of the task. Similarly, it may be difficult to score individual production-level networks as well, if there are many production networks and the result presented to the environment is some aggregate of the output calculated by the networks. Guidance on methods for doing this is available in the dynamical systems and control systems literature, as follows.

One approach is to maintain a model of the environment that is being updated based on the environment's behavior and to use the model of the environment to calculate the scores of the networks. For example, an error between the model's prediction of a system's behavior and the system's observed behavior can be used both to control, or improve, the system's behavior in a desired manner and to select or improve a model that can be used to predict future behavior. It is known in the field of neuroscience that regions of the human cortex implement models of, for example, the sensory systems on the surface of the body and the body's orientation and position in its environment. These models are utilized by neural systems to control the interaction of, for example, a hand with a coffee cup, or to maintain an upright posture while standing, walking, or climbing stairs. This approach is similar to model predictive control (Moran and Lee, 1999; Qin and Badgwell, 2003; and Garcia and Prett, 1989), internal model control (Garcie and Morari, 1982), multiple model adaptive control (Athans et al, 1977; Narendra and Balakrishnan, 1997; and Anderson et al, 2001), or to model reference adaptive control (Goodwin and Mayne, 1987; and Landau, 1974), and other known schemes reported in the systems and control literature such as QDES (Boyd et al, 1998), QDMC (Garcia and Morshedi, 1986), nonlinear QDMC (Gattu and Zafiriou, 1992), and LDMC (Morshedi et al. 1985). These methods provide computational techniques and estimation and/or control structures to select or adapt an appropriate model and utilize that model to control or improve the system's behavior with respect to a define measure of the system's performance. We disclose an analogous approach utilizing evolutionary optimization (EO) and one or more artificial neural networks of a population of artificial neural networks to implement and solve a control system application such as the pole balancing problem. The concept is to preferentially utilize models that accurately predict an observed process's behavior to decide what control actions or decision to apply. A typical method is to monitor an error, or innovations, process as a measure of a system's ability to surprise a model-based prediction of its behavior. Although the model may be out-of-date with the current environment, it may still give some information about how the controller or artificial neural network(s) perform and can this be used to guide the adaptation, modification, or replacement of an artificial neural network using a procedure such as evolutionary optimization (EO). It can be difficult to maintain an accurate model of a complex environment, but it is in general somewhat easier to steadily improve an existing model through its modification or replacement.

FPGAs such as those fabricated and offered for sale by Xilinx and Alterra may contain digital signal processor (DSP) blocks implemented within the FPGA. Such DSP blocks can be programmed and can execute a software program to process input signals and produce output signals. The FPGA can be configured so that some input signals to a DSP may originate with one or more neuromorphic DANNA elements as described herein. For example, the input signal to a DSP block may be the accumulated charge in a neuron, LTP/LTD events that occur in a synapse, the output from or input to a synaptic FIFO or a synapse, the number of inputs to an element that simultaneously receive an event or non-zero weight, the firing events of a neuron, or the input indices in a neuron that cause the neuron to fire or that have input events that are received while the neuron is in a refractory state. The input signal to a DSP block may also be a signal generated or sampled externally from the FGPA and received by the FGPA or an error signal that indicates the deviation of an externally measured value from a desired or expected value, or from a value predicted by a model, where the model may be implemented and simulated by a processor, the DSP block, or another DSP block. This list of kinds of input signals is not intended to be exhaustive. In each case, the input signals are a function of time and may be sampled on a recurring basis and represented as a sequence of sampled values or may be a sequence of events. In the latter case, an event may be a time of the event's occurrence or may be a time of occurrence and a value.

The software in the DSP block can implement a quality function to compute a metric indicating the quality or performance of an artificial neural network (ANN) or a portion of a ANN, or of a selected set of ANNs. The output of such a DSP can be used to guide an evolutionary or other optimization strategy to attempt to improve the performance of one or more ANNs as it interacts with a process or system, such as a physical system that exists externally to the FPGA. The software in the DSP may also implement a function that produces a sequence of values that are communicated to a device external to the FGPA such as a computer or another FPGA or a communication link.

It is possible to create DANNAs using one or more synapse and one or more neuron that use at least one output of an element of the DANNA to regenerate the behavior of the DANNA, causing an output of the DANNA to behave cyclically. A simple example is an adjacent neuron/synapse pair (for example, such a pair per FIG. 12B showing a plurality of such pairs) where the synapse is configured to implement a signal delay line of k>0 G_N_C cycles. If the synapse is configured to always emit the maximum weight value (or another weight value) that is guaranteed to cause the neuron to fire when that event is received by its enabled input, then once the neuron fires, it will continue to fire at least once every k>0 G_N_C cycles. This structure is an oscillator and is a simple example of what are termed central pattern generators in neuroscience.

Given a periodic input event sequence to a DANNA and a desired periodic output event sequence, evolutionary optimization can be used to determine a DANNA—an interconnected collection of neuromorphic elements or simulated neurons and synapses—that accepts that input sequence and generates the desired periodic output event sequence. By using a DANNA to create a cyclic input event sequence, as in the paragraph above using one neuron and one synapse, it is also possible to create a DANNA that will generate any desired arbitrary periodic output event sequence, and sets of such periodic output event sequences with specified relationships among them without any external input. This can be done using either hardware components such as those described and implemented using one or more FPGAs, or using a software (simulated) DANNA/NIDA or NIDA. This can be used, for example, to implement a pacemaker, a neural simulator that may be implanted, an oscillator or component of a mixer, modulator or demodulator for a radio or the communication system, and a joint controller or actuator mechanism for a robotic device.

A third modality is the creation of a DANNA that generates a desired finite event sequence in response to an input event. This is also possible using evolutionary optimization and either a hardware or software implementation of the DANNA/NIDA. The DANNAs that are created in this manner may incorporate examples of central pattern generators (CPGs). A CPG can be used to control the motion of a device such as a robot's arm or leg, to communicate a signal in response to detection of an event or condition, which may be done using an ANN such as has been described in the BICA 2013 paper by C. Schuman and J. D. Birdwell, or by using classifiers and/or detectors as are known in the arts of electrical and computer engineering and computer science. For example, a DANNA CPG can be used to control the motions of the legs of small autonomous vehicles or robots. An advantage of a CPG designed and implemented using these technologies is that it can appropriately respond to other signals (inputs) from its environment.

Over the course of evolutionary optimization, parameters and placement of neurons and synapses are manipulated to produce networks to solve tasks. Rather than limiting the optimization to single element changes, a sub-network of two or more elements that is known to be useful (e.g. a central pattern generator) can be added to the current DANNA network. A "toolbox" of simple components that are known to be useful can be used as both building blocks and additions to DANNA networks. The newly constructed network does not have to relearn how to build the simple components; it can take advantage of those simple components that are pre-built, thus learning or training time can be reduced.

Another use of sub-networks in a DANNA is the formation of collections of identical or highly similar sub-networks in a larger network. For example, a sub-network in a library of sub-networks and components and their sub-tasks (problems) (FIG. 20) may have utility in the detection of a feature in an image, where the feature, by way of example, can be a horizontal, vertical, or slanted line. An array of sub-networks can be defined in a larger network by locating the origins of the sub-networks onto a two-dimensional grid of coordinates within a rectangular region used to represent, input, or output an image, which may be one frame of a video or movie. In this manner, an ANN can be formed that processes all or a selected subset of the pixels in an image in parallel to find, by way of example, the horizontal lines in the image and produce an output image whose pixel values represent the presence of these lines at various locations within the input image. Different sub-networks can be utilized to detect or classify other types of imagery such as, for example, edges of images of objects, in-focus portions of an image, and portions of a selected color, level of saturation, or lightness.

Simple networks may be hand-tooled to perform certain tasks and then replicated across a larger network to perform more complex tasks. For example, a small network or substructure to detect a line in a small image as shown, for example, in FIG. 23A may be replicated to build a larger network to recognize lines in larger images as shown, for example, in FIG. 23B. It may also be useful to design an existing structure for one problem and tweak that structure or weights in that structure for a similar, though slightly different problem. For example, one task might be recognizing piano notes. The structure to recognize one note (e.g. F) may be very similar to the structure required to recognize another note (e.g. F#), but the distances or delays may need to be scaled. This general idea has wider applications as well, such as frequency recognition, edge detection, and character recognition.

One may also develop a library of components (FIG. 20) or NDA/DANNA (one or the other or both to construct more complex or simpler network architectures or sub-networks) that are analogous to components needed in signal processing, communication systems or controls. Examples include oscillators, band pass and band stop filters, feedback regulators, and pattern generators. Such a library can be utilized to select possibly useful sub-networks as discusses above using evolutionary optimization. One could use the library to handcraft solutions to particular applications.

Figure 20:
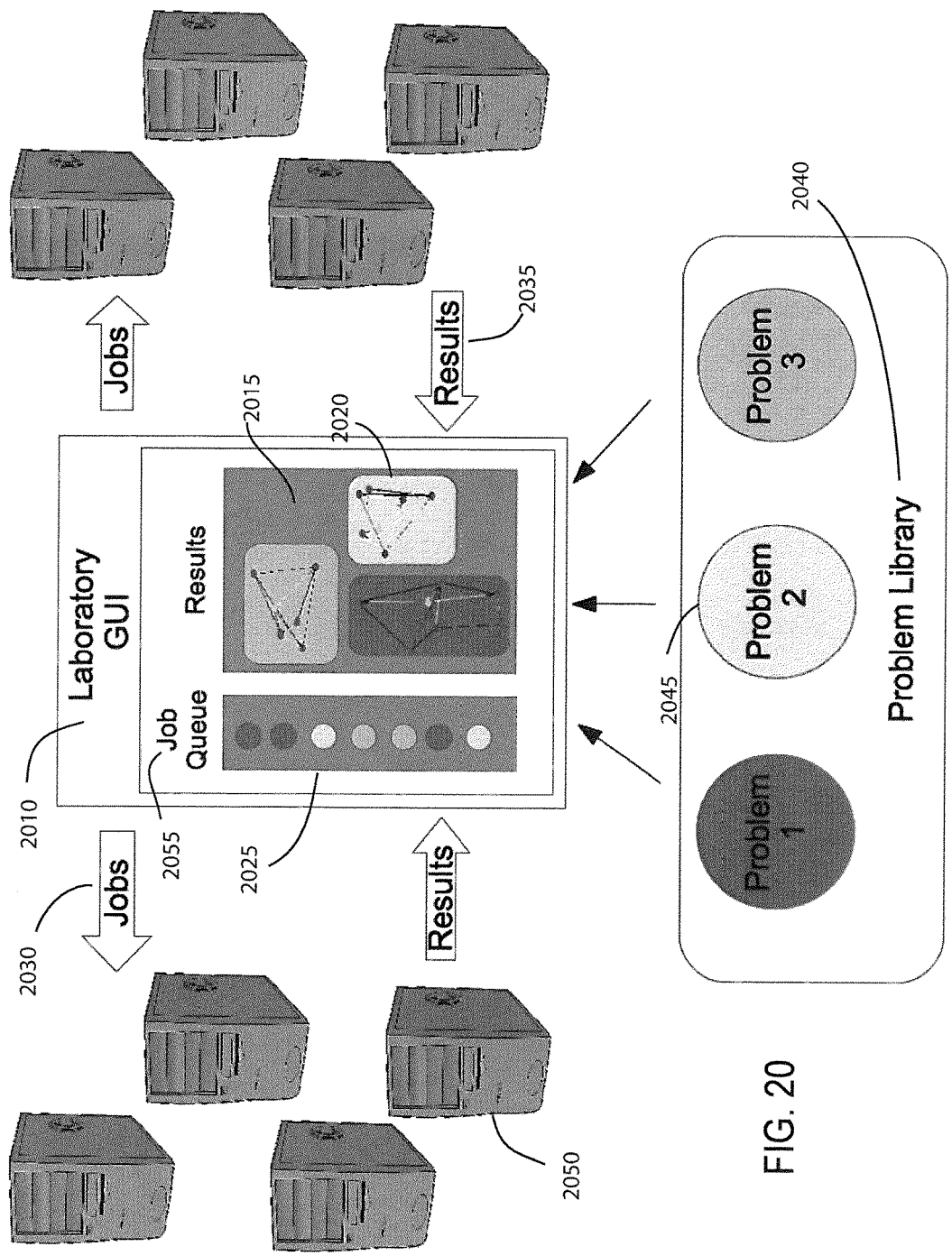
FIG. 20 shows an example of forming a problem/component/substructure library or database (comprising components and useful substructures for given sub-tasks and tasks or problems) and utilizing a central graphical user interface (GUI) to select a special purpose processor for handling a particular problem, for example, from the problem library, implanting or extracting substructures and components from the library and receiving results in the form of display, network decision, network performance or error rate, printout or simulated or real world actualization of results.

Referring to FIG. 20, there is shown an exemplary laboratory graphical user interface 2010 having a job queue 2055, holding submitted jobs 2025, results 2015 and networks 2020. A plurality of special purpose processors 2050 (FIG. 11) may receive jobs 2030 via GUI 2010 or a plurality of different jobs may be sent to a second set of special purpose processors outputting results 2035. Also shown may be a problem/component/substructure library 2040 of different problems, tasks, subtasks 2045 which, for example, may be a classification problem and associated component or substructure. GUI 2010 may be useful so a user may select from various problems/tasks and so create and distribute jobs/tasks to available resources which may be nodes in a cluster, gather results from these depending on application, display or affect results in a meaningful manner and so on. A visual analytics tool may be utilized as a way to analyze networks 2020 and/or display results meaningfully.

In order to better understand a method of increasing DANNA apparatus connections with reference to FIG. 10A, consider a redrawn representation of an array of elements with space inserted between the elements for clarity, as shown in FIG. 13 which shows an array of elements with space added between elements for clarity. The connections between elements may now be explicitly represented by lines as shown in FIG. 13, an array of elements with connections illustrated as lines (wherein the diagonal lines do not connect at the center of their X shapes).

Now, one may create a second set of eight connections between selected elements by skipping every other element, as shown in FIG. 13, an array with a second set of connections, skipping every other element (and so forming a three-dimensional embodiment). In FIG. 13, the original connections have been rendered in light gray in order to emphasize the new connections. For clarity, we refer to the two sets of connections as the first (original connections to nearest neighbor) and second rings or layers of connections, and we have labeled the second rings of connections using the numbers 8-15. Note that other labels can be used for any ring or layer.

The elements that do not have the second ring of connections in FIG. 13 can be connected using their own second rings in their own network of connections. When every other block is skipped, we call this a level-2 ring, and a total of four networks of level-2 ring connections are necessary in order to provide level-2 connections to all elements, although there is no requirement that all elements must have level-2 rings.

Referring to FIG. 13, we define a face of a DANNA as an edge, a plane or a collection of signals along one or more edges of a DANNA in a hardware implementation that exists in three-dimensional space. A face may be grouped with a subset or all of the input signals, a subset or all of the output signals, or a mixture. For example, one face of a cube may be associated with all inputs and outputs, where the network extends back into the cube, and a hierarchical description of the network allows the formation of hardware or simulation analogs to the cortical columns that are known to exist in the neocortex. As another example, a DANNA (or NIDA) can be constrained to be in a hexagon. In this case, one or more faces of the hexagon would be associated with a subset of the DANNA's inputs and/or outputs, and multiple hexagons could form a tiling of a two-dimensional region having identical or similar DANNAs within each hexagon that connect along the faces (edges) of each hexagon. Any other polygon or set of polygons can be used that can be arranged to create a tiling of a two-dimensional region, with DANNAs similarly associated with each polygon and the DANNAs interconnected across the faces or edges. The same tiling procedure can be utilized with networks defined within and associated with a bounded three-dimensional polyhedron, and multiple polyhedra can be used to tile a region of three-dimensional space. Multiple polyhedral shapes can be used to create the tiling. Other inputs or outputs are explicitly allowed since only a subset of the inputs and/or outputs of each DANNA associated with a polygon or polyhedron need connect to other DANNAs across a face or edge. In this manner, the tiling of DANNAs can be used to implement, for example, a DANNA (consisting of a collection of DANNAs (or NIDA's) associated with the tiled polyhedra or polygons) that exhibits grid cell behaviors, as are observed and may be known in the neuroscience literature that can track external features using signals measuring characteristics of those features. For example, such a DANNA could exhibit grid cell behavior that tracks an object observed using a visual (visible light, infrared, or ultraviolet, but also including radar or sonar systems and laser scanning systems) by firing a geometric pattern of neurons within the DANNA in response to the acquired signal.

There are known methods for stacking integrated circuits to form, for example, stacked DANNA's. In a novel embodiment, we disclose the use of "channels" (etched out) in the surface of the silicon (Si) to form "tunnels" when multiple Si chips are stacked and interconnected (bonding being resolved in various ways known in the art). The tunnels are created to form regions for air or fluid flow for cooling the integrated circuits, the concept being to pressurize one side of the air/fluid and push it through the channels (for example, inert gases such as Ar or He could be used). These tunnels may be etched in a second dimension (e.g., "holes" through the Si wafer created d wing fabrication). Problems with stacking chips are removal of heat and bonding between layers, but these are solved with known bonding methods and the cooling methods as suggested above depending on the integrated circuits to be stacked. While multiple layer devices have been fabricated, thermal management problems can be significant depending on the amount of heat generated and the ability to use cooling fluid (including gas) to alleviate the generated heat, limiting the depth of the "stack". This concept is similar to air conditioning (or water cooling) for stacked Si devices. One can do stacking without the cooling channels/tunnels, up to a point, dependent on the generated heat. Stacking is desirable to shorten signal lines to speed signal transfer and to make a DANNA more compact also saving on power consumption in the DANNA.

The concept of inclusion of sub-networks, either as building blocks of the greater network or as additions to existing networks may be applied to DANNA's. Such sub-networks can be parameterized, and the parameters can be selected or tuned using the methods of evolutionary optimization or other optimization methods such as gradient search and Newton's method. For example, a parameter of a sub-network can be the placement of a designated coordinate, the origin of the sub-network, in the sub-network at a specified location within another network or sub-network. Such a coordinate can be a location in a two-dimensional or three-dimensional region of space or one or more indices into a DANNA, such as a hardware array of neuromorphic elements that may, for example, be implemented using a FPGA. Additional parameters can be selected or tuned to scale the size of the network in one, two, or three dimensions, or the delays in the network, for example by scaling the size of the FIFO queues in synaptic elements of the disclosed neuromorphic array. A clock rate or clock divider, or other parameter may be used to tune a frequency of an oscillator of a CPG, a resonant frequency, or upper and/or lower cut-off frequencies of sub-networks design as filters or detectors (all stored in a useful component library 2040 per FIG. 20). In other words, in addition to adapting parameters of single elements in the network or of the network as a whole, we may also adapt parameters of entire sub-networks within the greater network. Sub-networks of one or more DANNAs can have sub-networks, resulting in sub-sub-networks of a higher-level network. In this manner, a hierarchical description of a network's structure can be maintained. Evolutionary optimization can be performed at any level of this hierarchy and may be performed recursively to obtain one or more networks that achieve a specified objective.

Now element monitoring will be described with reference to an interconnected DANNA having a plurality of interconnections, all of which elements of the array may be monitored.

Element Monitoring

A challenge with implementing a large array of neural network elements in an FPGA is the ability to read the state of each element in the array. Referring now to FIG. 14, the use of a shared bus structure may not be possible in an FPGA given the lack of shared bus drivers for internal logic (open-source or tri-state). As the number of circuit elements of an array such as a DANNA grows, the loading on a shared interface can also become high for optimal operation. An approach defined below provides the ability to read the state of each circuit element (selectively operating as one of a neuron and a synapse) in a dynamic adaptive neural network architecture (DANNA) in real-time while the neural network of neurons and synapses is in operation.

Referring to FIG. 14, there is shown a DANNA of X columns and Y rows having an output register 1405 for selectively receiving outputs from read registers of circuit elements which may be monitored as follows. The following functions are needed to support reading of each circuit element in a DANNA implementation: 1. A global "load read register" command signal 1401 for circuit elements at columns 0-X and rows 0-Y generated by the interface logic to the array; 2. A global "shift read register" command signal 1402 for circuit elements at columns 0-X and rows 0-Y generated by the interface logic to the array; 3. A "fire counter" 1403 in each element of the array, for example, a 16 bit counter, which tracks the number of fire states the element has experienced since the last "load read register" command; 4. A "read register" 1404 in each element of the array which captures the active neuron-charge or synapse-weight value and "fire counter" value for the element upon an active "load read register" command. Note the "read register" 1404 may preferably be a parallel-load register (for example, 16 bits received at Data In) with serial-output/serial-input data-transfer capability shown as Serial In and Serial Out respectively; 5. A connection matrix which connects the serial output of a "read register" of an element in a column of the array to the adjacent element's "read register" serial input (see, for example, Serial Out connection from Element (0, 0) to Serial In of Element (0, 1) or Serial Out connection from Element (X, 0) to Serial In of Element (X, 1); and 6. An "output register" 1405 which sets at the top of the element array and captures the serial-output (Serial Out) of the "read register" 1404, for example, of the element at the row Y end of each chain of elements in a column 0 to X. The "output register" 1405 may provide data for the X columns to an external interface of the DANNA array component.

Each circuit element may capture in its "fire counter" 1403 the number of fire events it has experienced between "load read register" 1401 commands. Upon the array receiving a "load read register" command 1401, each circuit element of the DANNA loads its read register 1404 with the contents of its "fire counter" 1403 and the active charge value (loaded at Data In from Accum Register 1406 if the element is programmed as a neuron, or the active weight value if the circuit element is programmed as a synapse. The circuit element also resets its "fire counter" 1403 after each "load read register" command. The "read register" 1404 is, for example, a parallel-load shift register connected in a serial chain across each column in the array of elements (shown by dashed lines labeled "load"). On each "shift read register" command 1402 the contents of the "read registers" 1404 in the array are shifted one position up the column of "read registers" 1404 with the "read register" 1404 at the top of each column 0 to X shifting its content into the "output register" 1405. Upon each "shift read register" command 1402, the values shifted from the "read register" 1404 into the "output register" 1405 is provided to the external interface of the array as Output (0-X). The width of the "output register" 1405 equals the number of columns X in the array (one bit per column) represented as In0 through InX. The number of "shift read register" commands 1402 required to read the entire array of elements is expressed as follows: (number of "fire counter" bits+number of charge/weight bits) times the number Y of elements per column in the array).

For example: If the fire counter 1403 is 16-bits and the charge/weight values are 8-bits and the array is a 100×100 element configuration (10,000 elements) then the number of "shift read register" commands 1402 required to read the array equals 24-bits/element times 100 or 2400 commands where Y equals 100.

The array state can be read while in full operation. The "load read register" command 1401 can either be triggered by the user interface, control program or by a firing event from the output elements of the array (the elements which are at the edge of the array and drive their fire events external to the array). The "fire counter" 1403 continues to maintain and track the number of fire events in an element even while the array is being read. As above, signal lines and components of FIG. 14 are chosen with names which may be considered arbitrary and the claims should not be considered limiting as to the scope of a given name. For example, a fire counter 1403 performs the function indicated above.

A software program may organize the data read from the array (Output 0-X of Output Register 1405) in a format representative of the structure and state of the DANNA array.

While the examples are illustrations of DANNA implementations having either one or all of the networks connecting elements at a given level, it should be understood that the designer may select which of these connection networks is to be implemented, choosing any subset or none at all. Furthermore, while the level-1 interconnection network, to each element's nearest neighbors, is necessary, all of the other levels are optional and are to be used at the discretion of the designer when implementing engine or process (such as an evolutionary optimization process or device). The utility of the additional levels of interconnection (potentially in a three dimensional space) to enable connectivity above and below the planes of the drawings shown in these figures is to enable signals (events) to be passed between elements that are not nearest neighbors more efficiently, and to overcome blockages of signal pathways due to the configuration of some elements of the DANNA. The multi-level interconnection networks correspond to the concept of "rich club" neurons in biological tissue, where selected neurons can be utilized to transmit signals across long distances relative to the average inter-neuron distance. In a DANNA, these multi-level connection networks enable signals to be transmitted among elements at considerable distance across the array with minimal delays, offering additional flexibility in the design and configuration of the DANNA for a particular application such as in detection, classification, or control. The trade-off for this flexibility is the increased complexity of DANNA elements that incorporate multi-level signaling, where such complexity requires additional resources when implemented using a FPGA or with ASIC technology.

A dynamic and adaptive neural network array (DANNA) may use the NIDA neural network model proposed by Schuman/Birdwell in the related NIDA patent application, filed concurrently herewith, a programmable element design that can be configured to be a neuron or a synapse, and a 2-dimensional array structure and interface to allow neural networks to be created and dynamically modified. Synapse distance and LTP/LTD functions were also implemented. We have demonstrated the functionality, capacity and performance of this DANNA structure on Xilinx Virtex-7 FPGAs and project the maximum performance and capacity expected on Xilinx's largest FPGA. By moving the design to a custom VLSI design in the same CMOS process as the Xilinx FPGAs (28 nm), we can increase capacities by two orders of magnitude (1 million elements) and network clocking rates by at least one order of magnitude (100 MHz). A NIDA/DANNA architecture can interface to the physical world (sensors, actuators, imaging devices, etc.) via ADCs, DACs, multiplexers and demultiplexers, other known interface technologies, or a combination of these technologies on its input and output elements, and the NIDA/DANNA array can be configured to perform selected tasks (detection, classification, pattern recognition, control, and image and video processing such as edge and feature detection, classification, and tracking). A programmable neural network may be constructed using a simple array of elements built, for example, on an FPGA. The described embodiments apply this concept to real world problems such as control, anomaly detection and classification.

Figure 26:
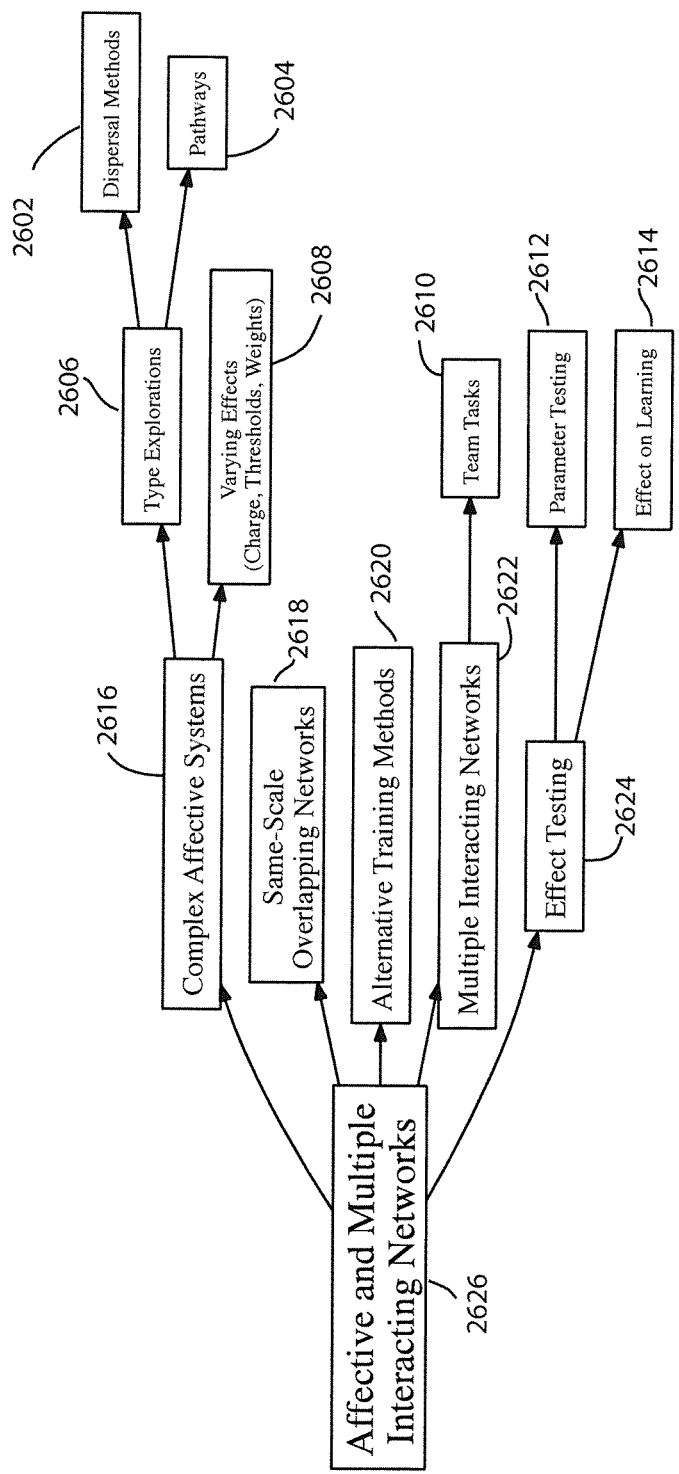
FIG. 26 is an overall diagram showing expansion of affective and multiple interacting networks for combining affective systems, recognizing overlapping networks, utilizing alternative training and learning, multiplying interacting networks and substructures thereof and effect testing.

FIG. 26 shows possible uses and reuses for affective and multiple interacting networks 2626. There are multiple complex affective system types 2616, 2608 that may be constructed, used and reused. Sub-networks in computational networks may implement a "dispersal" mechanism that causes a change in charge or thresholds on nearby neurons or a change in weight values on nearby synapses so that they change instantaneously with the firing of the output neurons within the sub-network 2608. More complicated dispersal 2602 (FIG. 26) may be implemented in which the changes in charge, threshold or weight value are scheduled events in the event simulation and occur at some point in the future after the output neuron has fired (perhaps relative to the distance from the sub-network). Taking a cue from biological systems, this mechanism can also modify localized energy available to neurons, modulating or suppressing the firing rates of neurons in a localized neighborhood of the network. Neural pathways 2604 may affect changes in charge, thresholds, or synapse weights from neurons within affective networks to neurons in computational networks.

An alternative multi-network description may be defined so that multiple network structures that are represented in the same space overlap and interact but are evolved separately. This is similar to the notion of subsystems in the network, but instead of the sub-networks occupying a smaller space than the original network, all of the networks would exist on the same scale 2618 (FIG. 26), but each network would have a different goal which may conflict with the goals of other networks.

There are many multi-objective optimization algorithms that may be used for this task. However, in contrast to these methods, one may simultaneously evolve multiple interacting networks, each of which having its own objective and for which there may be an overall objective of the system of networks. Moreover, one may optimize over the connections between these networks. In many examples in which these would be useful, these networks may not operate in isolation; that is, they may exist as part of a system or team of networks in order to be evaluated. For example, consider an exploration/foraging task in which the agent explores an environment to find food but to also avoid predators. In this example, the agent may be composed of a computational network that receives sensory information and outputs an action for the agent, as well as sub-networks that are trained to be "seeking" and "fear" networks, which encourage exploration for food and avoidance of predators, respectively. A "seeking" sub-network may not be evaluated alone on its task; it may be embedded in an agent to be evaluated. That is, we may not simulate the seeking network and assign it a score; we may see how the seeking network influences the larger network to behave in the environment and assign it a score based on the agent's behavior. Optimization algorithms may be developed that work in this realm of alternative training methods 2620 (FIG. 26).

The inclusion of affective systems with a computational network may naturally be extended to a team of interacting networks or substructures being trained to work together on a task, but in which different team members have different objectives. In this case of developing more complex affective systems 2616, there may not be direct connections (synapses) between sub-networks, but it may be that these substructures can be simulated simultaneously so that they may communicate in some other way. For example, suppose we want to evolve a team of simulated ant-like agents, in which the role of some agents is to explore new environments and find food (type A agents), while the role of other agents (type B) is to discover when a type A agent has found food and to collect food from that food source until it is exhausted. In this situation, it would be possible to evolve type A agents without the type B agents, but it might not be possible to evolve type B agents without existing type A agents because type B agents rely on communications from type A agents. One may simulate how a type A agent will behave when training type B agents, but there is no guarantee that the evolved type A agents will behave in this way. By evolving two sets of agents simultaneously, one can evolve agents that learn to work together. One may also simultaneously evolve a team of agents in which each agent is composed of multiple interacting substructures or networks 2622, where the agents may all have the same (or different) goals (for example, team tasks 2610 for same goals) and where the sub-networks per agent may each have their own goal.

One may also implement the effects (effect testing 2624) of simple affective systems and complex affective systems on the dynamics and behavior of the network and effect on learning 2614. For example, complex affective systems may affect LTP and LTD and one may implement how those parameters interact by parameter testing 2612. More studies on the general properties of these affective systems would be worthwhile, so that we may better understand their utility in the scope of NIDA and DANNA networks and combinations of these and other ANNs.

We include affective networks and substructures of networks because they are an important part of biological neural systems that are, for the most part, not considered in artificial neural network systems. One potential role of affective systems is for modulation of behavior of a network based on sensory information (as also noted by Krichmar in Krichmar (2008)). By evolving affective systems alongside network structures, one allows for a possibly different set of potentially important input information to be processed in an alternate framework (using different objectives) and to affect the behavior of an agent. Again, consider an agent in an environment seeking food and avoiding predators. By including notions of affective systems, a fear sub-network may be trained to modulate behavior only when a predator is near, while a seeking sub-network may be trained to modulate behavior only when the agent is "hungry." These affective controls allow for an on-line mechanism to change behavior based on environmental cues that may not be directly related to the task.

Figure 19:
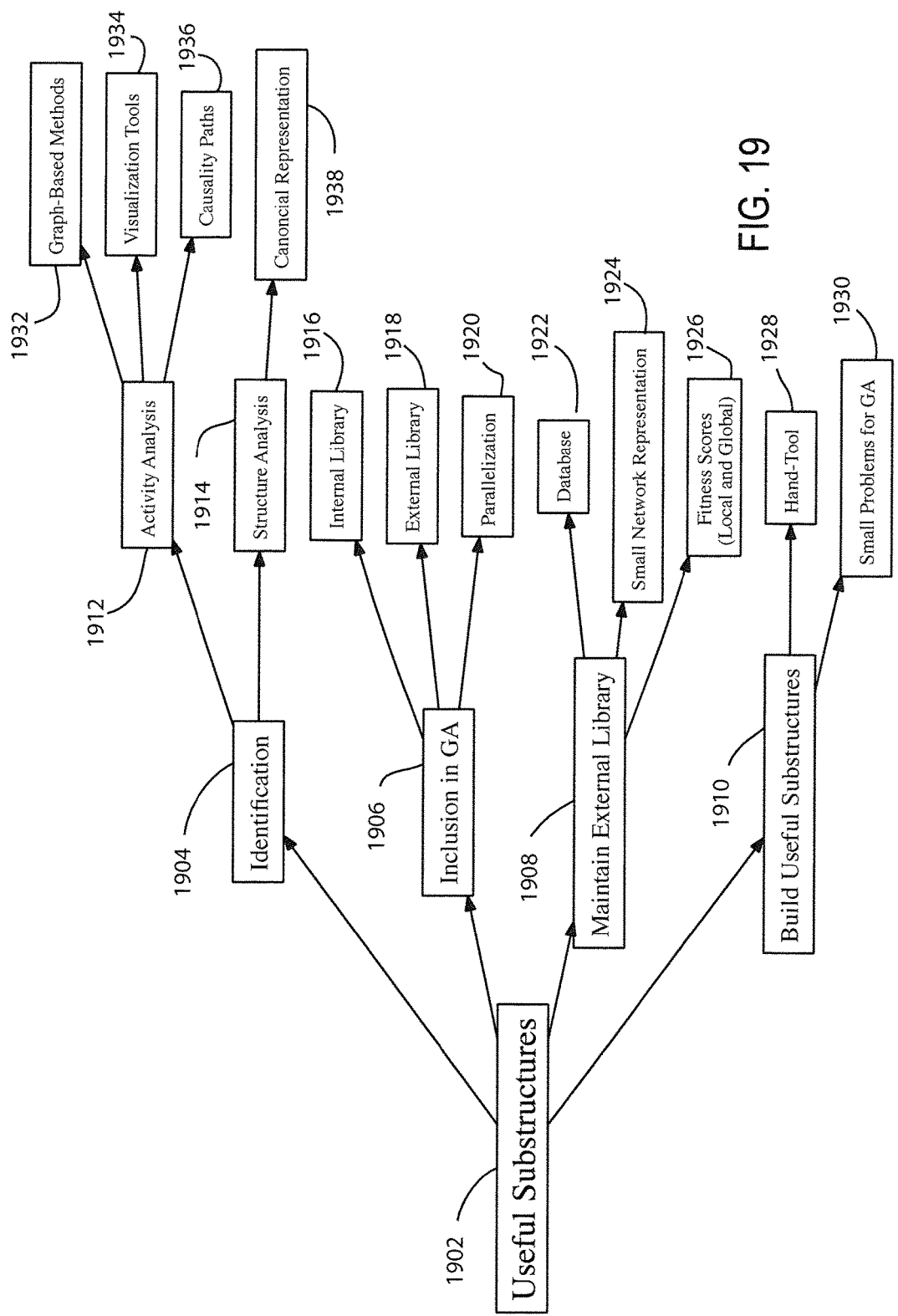
FIG. 19 is an example of expanding useful substructures of developed networks for certain applications and concepts related to useful substructures.

Referring to FIG. 19, there are multiple mechanisms for identifying useful substructures 1902, such as common substructures, activity-based substructures and causality paths 1936. Networks for simpler tasks can be combined and used in a more complicated task (FIG. 23). Finally, activity-based substructures may be extracted from networks during training and incorporated into the networks (FIG. 24). It may be beneficial to extract and include causality-based structures over the course of training as well.

There are potentially many more "useful substructure" types that exist in these networks. For example, graph analysis tools may be used to identify important structures in a network. Also, one may develop a canonical network representation that abstracts out position of nodes in the network while maintaining labels as to which neurons correspond to which input and output information in order to compare structure of the network. For example, referring to FIG. 19, there are shown useful substructures 1902 which may be identified at 4104, their structures may be analyzed at 1914 and canonical representations result at 1938.

One possible way to compare networks is to look at their activity (rather than their structure). See FIG. 19, activity analysis 1912. For example, a similarity metric may be developed in which networks that perform similarly (or produce the same result, if not the same firing patterns) for a set of input values are defined as similar. It may be difficult to compare firing patterns directly between networks because two sets of firing patterns may produce the exact same behavior, depending on delays in the network. Alternatively, one may develop a graph of activity in the network and use that graph to compare activity across networks (see, for example, graph-based methods 1932 of FIG. 19). However, this may have the same pitfall as comparing networks directly, in that graph analysis quickly becomes intractable as many graph analysis techniques are NP-complete or NP-hard problems. One may also examine activity using visualization tools 1934.

Once a set of tools is established to extract sub-networks from network structures, we may maintain an external library 1908 of useful substructures. Currently, a library is maintained over the course of a single learning instance, thus it is "internal" to a particular task and particular learning instance. It may also be useful to maintain a library external to a task and an instance. For example, under useful sub-structures 1902 in FIG. 19, maintaining an external library 1908 may lead to a database 1922, small network representation 1924 and local or global fitness scores 1926. That is, the external library may include substructures from not only many instances of a single task (e.g. many different pole balancing networks) but many tasks as well (e.g. subnetworks from anomaly detection and handwritten digit recognition). Substructures in the brain are often useful for more than one task. Our substructures may also be useful for more than one task; thus, we may maintain useful substructures to be included over the course of an evolutionary optimization 1906.

Such an external library may be maintained within a database system 1922, in which information about the structure of that sub-network may be stored. We may also track further information about each structure in the network, such as an overall score for how that network performs within various tasks or specific scores for each task (for example, a specific score for how helpful that sub-network was for the task solved by the network from which it was extracted). These local or global fitness scores 1926 may be used to decide which substructures should be selected for inclusion during learning for another task.

Structures may be analyzed over the course of learning in a separate thread or process from the optimization algorithm. For example, we may want to analyze activity of the best network in the population. It would be useful to develop a parallel version of the optimization algorithm that performs this analysis separately from the optimization, so that the optimization is not slowed (see parallelization 1920 under inclusion in G(enetic) A(lgorithm) 1906 in FIG. 19). Using this method, more complex analyses can be performed and utilized to improve the training or learning rates, without incurring as much of a penalty in training time.

A structure may be built using evolutionary optimization 1930 or hand-tooled 1928 to solve a small problem and one may repeat that structure to tackle a larger problem (FIG. 23). It may also be useful to design an existing structure for one problem and tweak that structure or weights in that structure for a similar, though slightly different problem. For example, one task might be recognizing piano notes. The structure to recognize one note (e.g. F) may be very similar to the structure required to recognize another note (e.g. F#), but the distances or delays may need to be scaled. This general idea has wider applications as well, such as frequency recognition, edge detection, and character recognition.

Development of a library of components may be explored of components analogous to components needed in signal processing, communication systems or controls (see internal library 1916 or external library 1918 of FIG. 19). Examples include libraries of oscillators, band pass and band stop filters, feedback regulators, and pattern generators (FIG. 20). Such a library 2040 may be utilized to select possibly useful sub-networks as discussed above using evolutionary optimization (EO). One could use the library to handcraft solutions to particular applications. See building useful substructures 1910 in FIG. 19.

Classification of Images

Figure 15B:
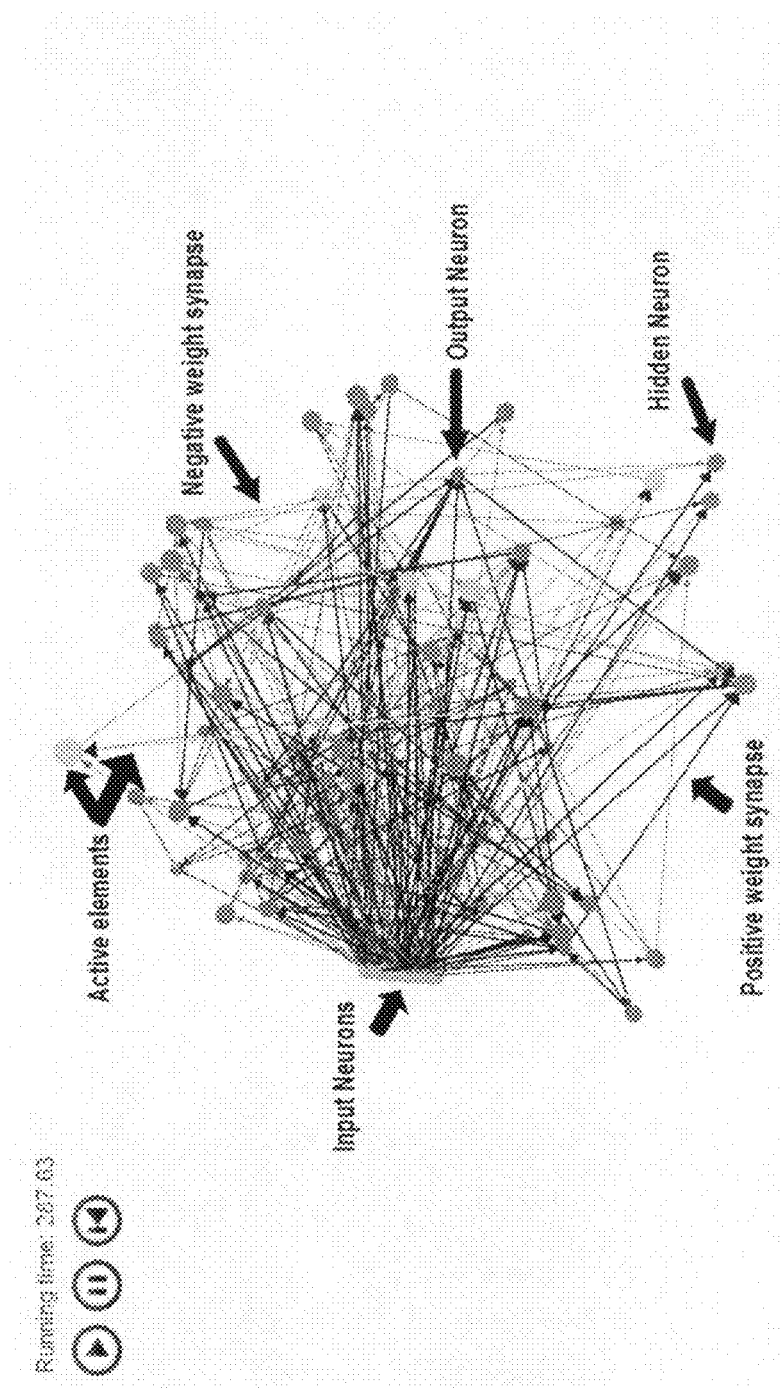
FIG. 15B shows a visualization of a typical artificial neural network having input neurons, output neurons, hidden neurons and positive and negative weighted synapses, this network being trained to recognize the hand-written digit 7 at time unit 287.
Figure 16:
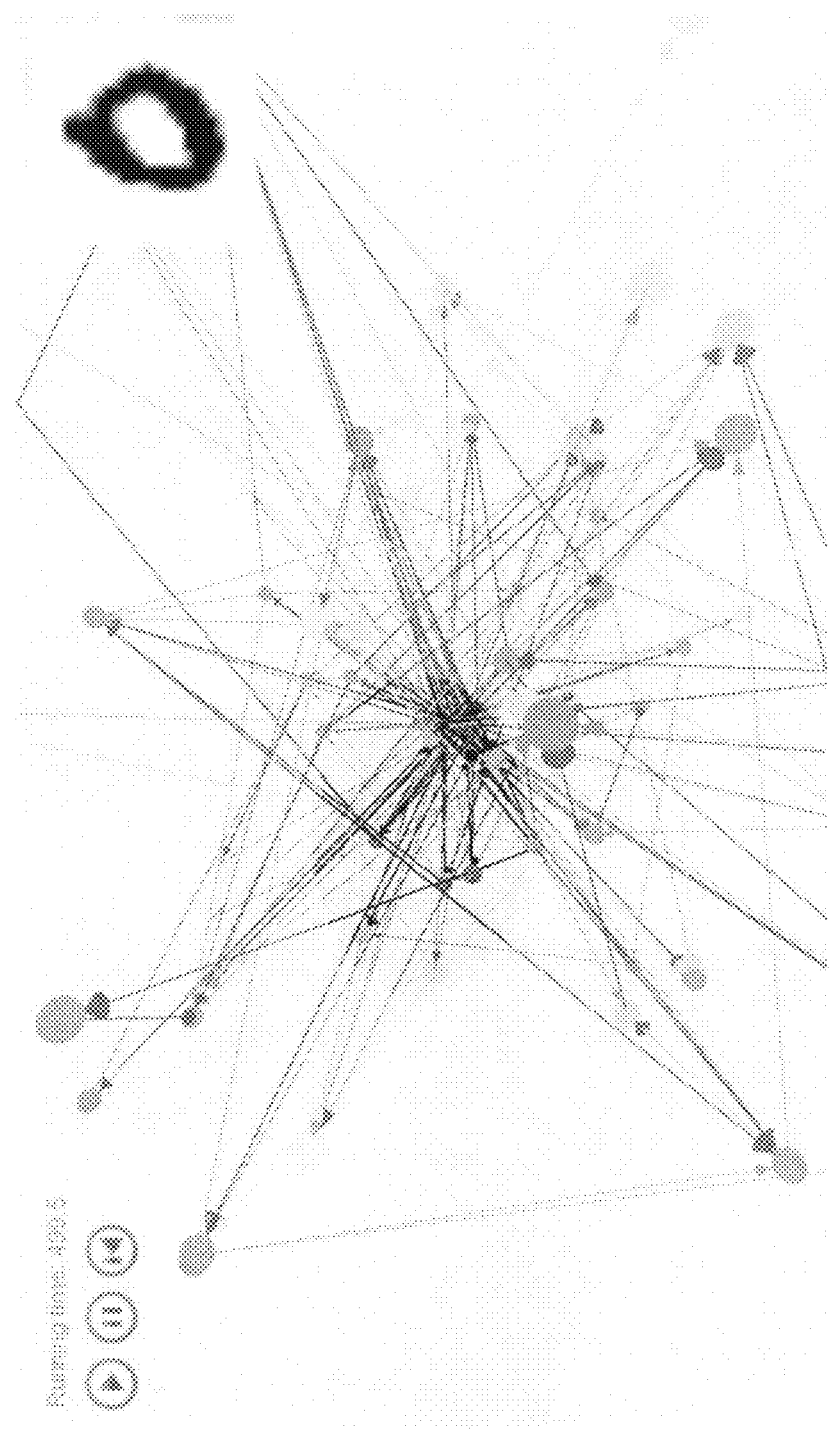
FIG. 16 shows a three-neuron substructure highlighted within a network shown in gray scale trained to recognize the digit 0, FIG. 16 being adapted from a color copy found as FIG. 5 in Drouhard, Margaret, Catherine D. Schuman, J. Douglas Birdwell, and Mark E. Dean, "Visual Analytics for Neuroscience-Inspired Dynamic Architectures," *IEEE Symposium Series on Computational Intelligence*, 2014, (hereinafter, IEEE 2014).
Figure 17:
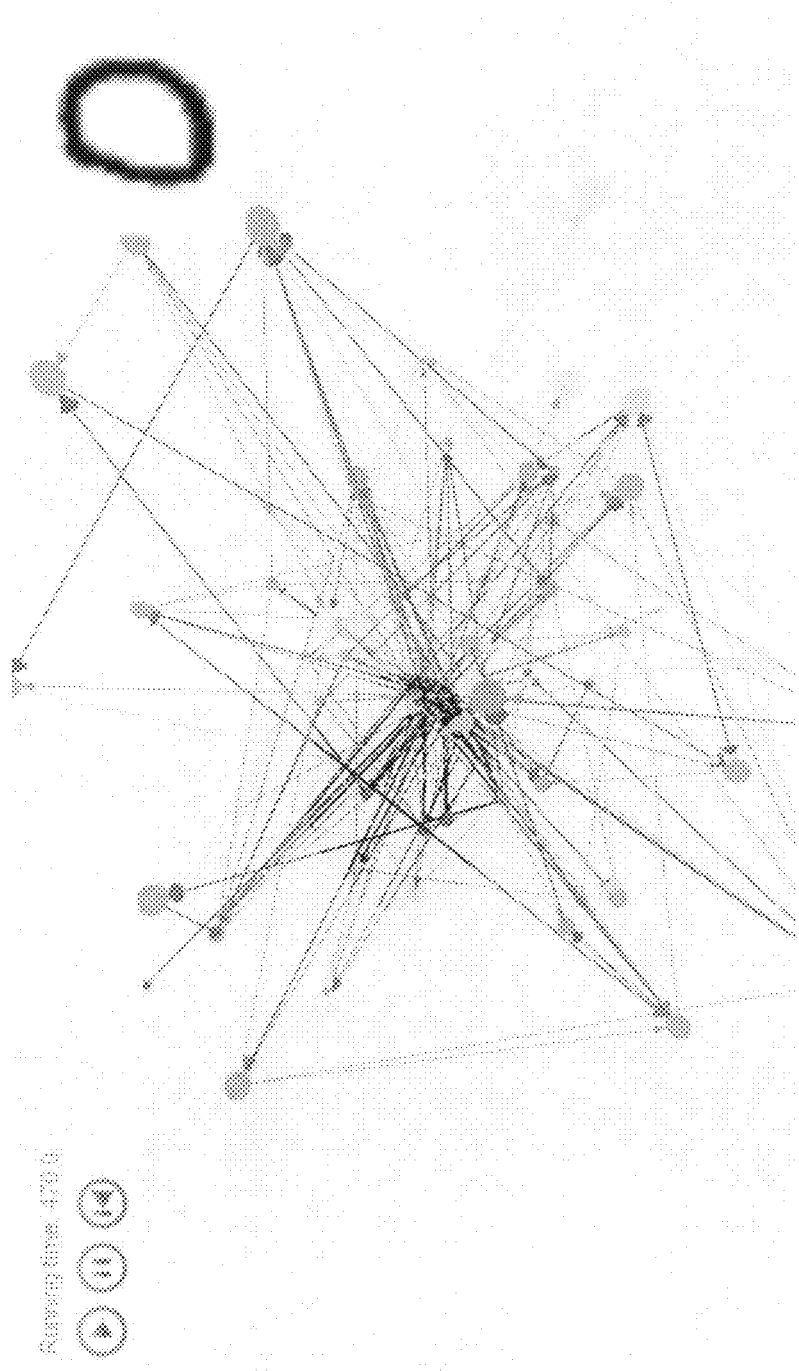
FIG. 17 shows a network in a gray scale including a similar three-neuron substructure within the same network shown in FIG. 17 processing a different hand-written numeral 0 image but showing the similarities in substructures for recognizing the digit 0, FIG. 17 being adapted from a color copy found as FIG. 6 in IEEE 2014.
Figure 18:
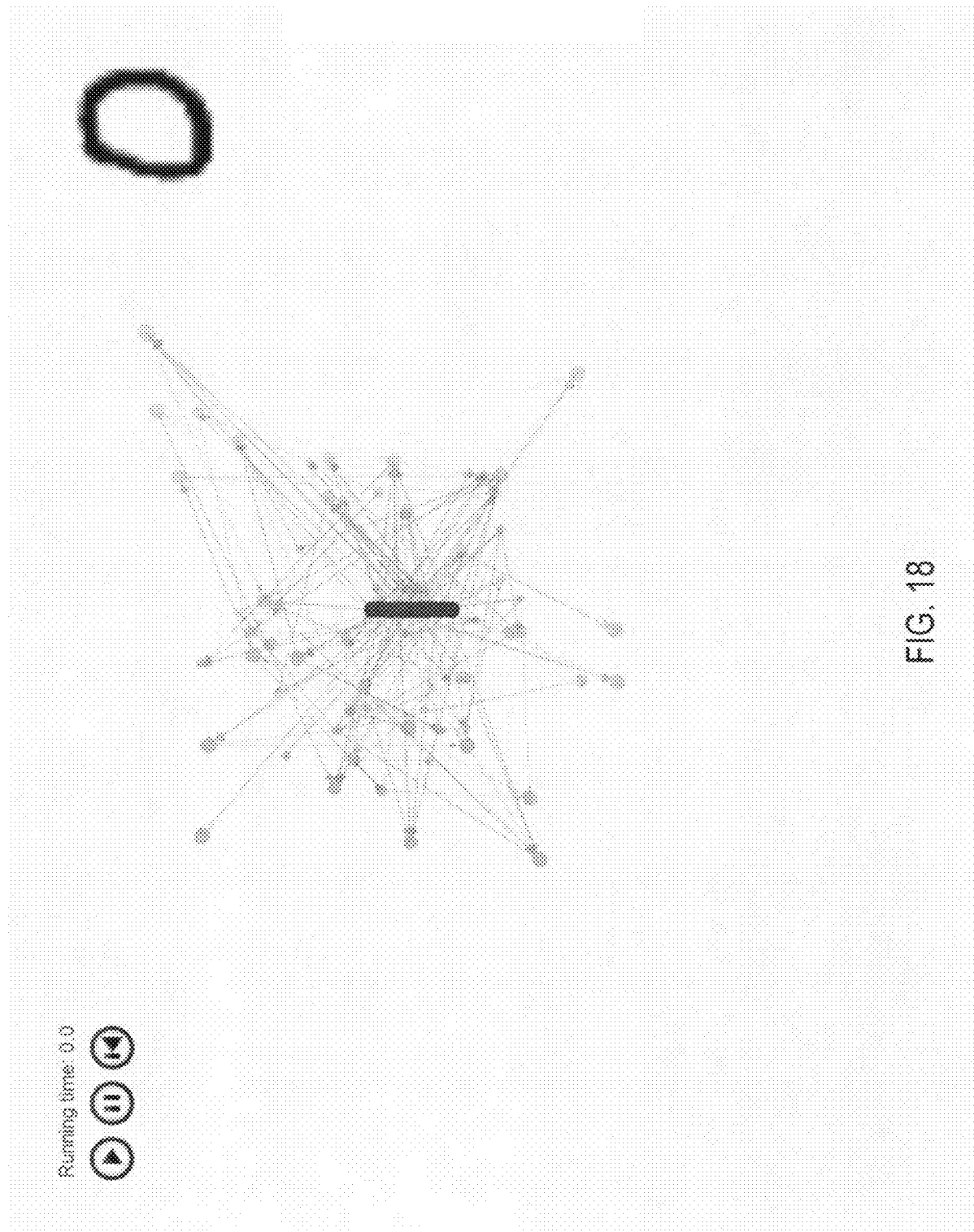
FIG. 18 shows one of a sequence of gray scale images showing a progression in time from initial stimulus of an artificial network for recognizing a hand-written digit 0 adapted from a color copy found as FIG. 6 in IEEE 2014.

To take advantage of the information content that can be stored in a network via synaptic delays and neuronal charges, we chose to add a time component to the task of classification of images. In particular and referring to FIG. 15A, rather than feeding the entire image into the network at once, the network "scans" the image in one of three ways: (1) a row at a time, (2) a column at a time, or (3) both a row and a column at a time (or by entropy as will be discussed further herein). This allows the task to take advantage of the inherent dynamical properties of NIDA networks. This approach also significantly reduces the size of the network (by reducing the number of input neurons in this example from 784 to 28 or 56). Other image sizes, or signal types, including one-dimensional or multi-dimensional signals, may be used. There are several ways one might use substructures or networks to solve this task. A single network could be trained that takes the image as input (in the scanning way as described above) and has 10 output neurons (one corresponding to each digit). Then, based on the activity of the network a guessed digit or digits can be produced, for example, by choosing the digit that corresponds to the output neuron that fires the most during simulation. This is the most straightforward approach; however, because the network is required to recognize each digit type, the resulting networks may be very complex. We instead use many small networks that contribute to the final solution results of these networks can then be combined via a winner-take-all (WTA) scheme to produce the guessed digit for any given test case. There are multiple fitness or scoring functions that can be defined for this task. As an example of visualization, reference is made to FIG. 15B. Some of the features available in visualization are depicted in FIG. 15B. The runtime (in simulation time units) and buttons for interactivity are at the top left-hand corner of the image in this view, and the view of the artificial neural network at a given point in time absorbs the center of the screen. Other locations for user controls may be utilized. The distinctions between different types of synapses and neurons are more readily apparent in color but are shown in gray scale. The elements have been labeled for ease of identification. A column of, for example, green spheres at the left side of the network (shown in gray scale) are the input neurons, and the single orange sphere at the far right of the network (shown in gray scale) is the output neuron. The hidden neurons may be teal-colored spheres between the input and output neurons (shown in gray scale). Positive weighted synapses are lines that may be colored blue, while negative weighted synapses may be in red-orange. The colors chosen are optional but, preferably, no two colors are used for the same feature. The active elements (a neuron and a synapse indicated) may be labeled or other known means may be used to differentiate elements such as dotted lines, dashed lines of varying size, dash/dotted lines and the like.

Figure 22A:
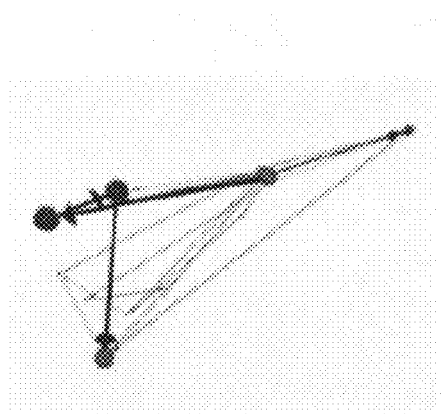
FIG. 22A through FIG. 22J show utilization of the visualization tool to isolate specific substructures or sub-networks of networks utilized in the recognition of each of the hand-written digits 0 through 9.

An insight gained from the visualization tool is an understanding of which substructures (if any) within a particular network are critical to that network's performance. The identification of such substructures, particularly when similar substructures are observed in different networks, can be used to facilitate the efficient evolution of high-performing networks comprising a plurality of special purpose substructures. Visual simulations on a handwritten digit network trained to recognize the digit 0 yielded the discovery of one such interesting substructure. The three-neuron substructure s shown as the three active (yellow) neurons in the highlighted region in FIGS. 16 and 17 was observed to be highly active throughout the processing of multiple input images of the digit 0. To better understand the activity of s in relation to other neurons within the network, an analysis of the activity of all neurons in the network over all input images of the digit 0 was performed and the results are shown in FIG. 22A. The three neurons contained in s were more active than all other neurons in the network by a wide margin. Substructures such as this one can be identified easily by determining the most active neurons in the network. By automatically identifying the key neurons in the best performing networks and replicating those neurons and some associated structure in other networks, we expect to be able to improve the performance of the evolutionary optimization method for designing networks.

By applying a feature of the visualization tool described herein as finding a "causality path," a substructure for recognizing the digit 0 may be differentiated from a substructure for recognizing the digit 1. Referring to FIG. 22A through FIG. 22J, there are shown sub-networks of networks trained to recognize various digits 0-9 in hand-written digital images. In these sub-networks, the neurons and synapses may be sized based on the number of times they appear in a causality path for a firing event, for example, in the last 50 (range of 25 to 100's) of time steps of a simulation which signifies a detection of a particular image. In practicality, neural pathways that are not utilized at all will not appear and those that are used the most appear. Taking this process to its conclusion, a large network comprising a plurality of such sub-networks may be used to recognize the range of digits 0-9. Similarly, the same process has been used to hand-tool a network to recognize a vertical line and that sub-network repeated many times to recognize vertical lines in any location in a large grid containing vertical lines. This process is shown in the visualization produced as FIG. 24A and FIG. 24B.

Figure 24A:
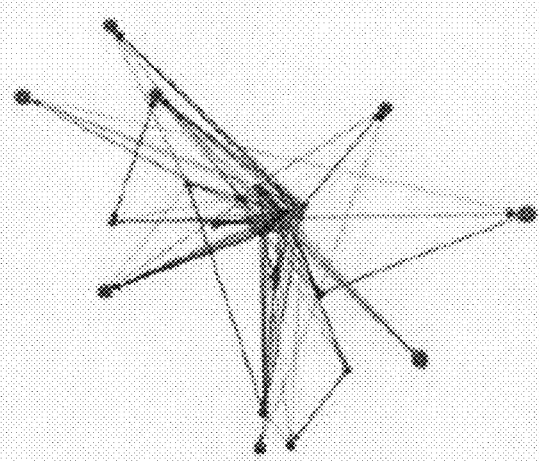
FIG. 24A provides an example full network while FIG. 24B provides a visualization of the useful substructure extracted from the network based, for example, on activity for that substructure in the network.
Figure 24B:
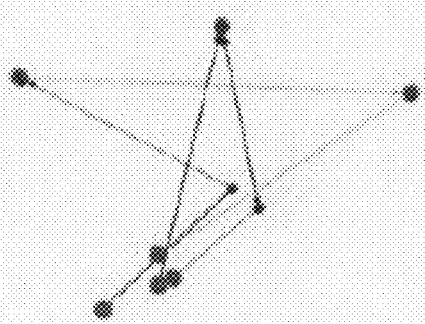

Referring to FIGS. 24A and 24B, an example substructure, hand-designed to recognize a vertical line is given in FIG. 24A. In FIG. 24B is shown a network built from a plurality of these substructures to detect a vertical line in any location in a large grid or image comprising one or more vertical lines within the large grid or image. This process may be extended to recognizing horizontal lines and then to recognizing horizontal lines in a grid image containing same. These networks for vertical lines and horizontal lines, in turn, may be combined to recognize horizontal and vertical lines in grid images. Right angles, squares and rectangles, by way of example, may each be another project or special purpose network comprising substructures for recognizing components (horizontal or vertical lines) of images.

In exploring useful substructures, the visualization tool thus may trace important events in the network back to the initiating events on input neurons. We refer to these paths as "causality paths." The activity along the path can be animated in the same way as standard network activity in order to trace the precipitating actions from input neuron pulse to the occurrence of the event itself. One experiment with these paths explores the differences in the network activity between input images of the digit d that a network has been trained to recognize and input images of digits other than d. Of particular interest are images of non-d digits that share certain characteristics with d.

Figure 22B:
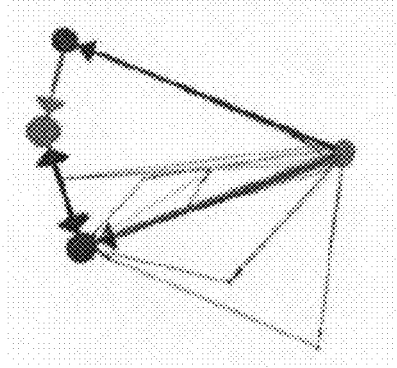
Figure 22C:
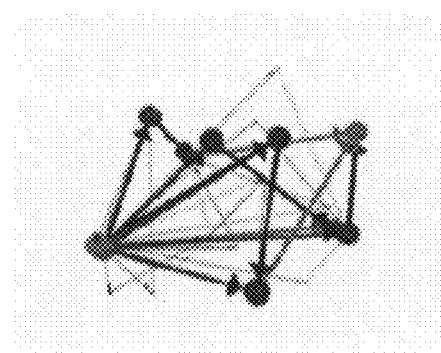
Figure 22D:
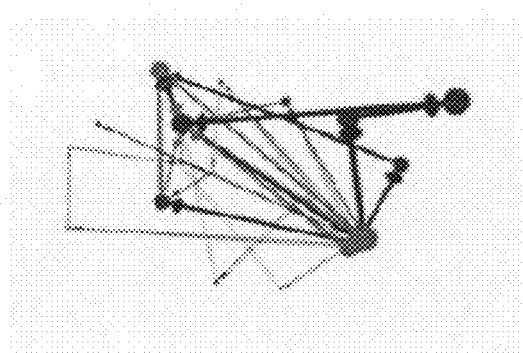
Figure 22E:
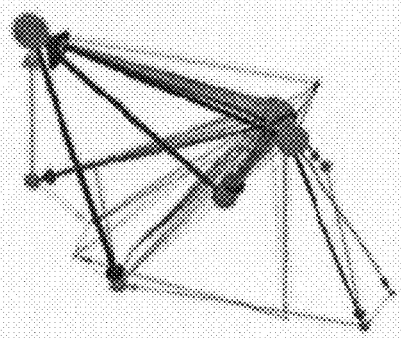
Figure 22F:
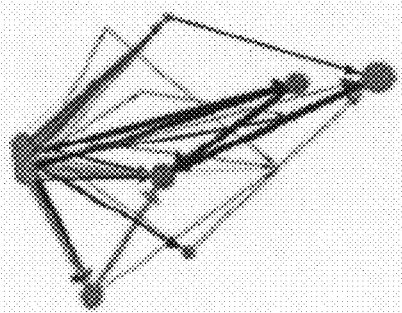
Figure 22G:
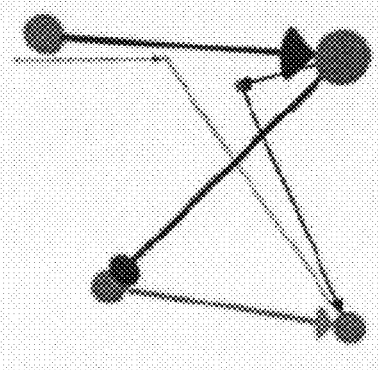
Figure 22H:
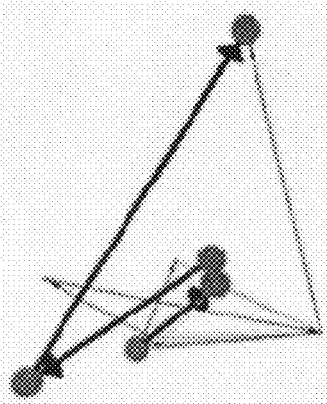
Figure 22I:
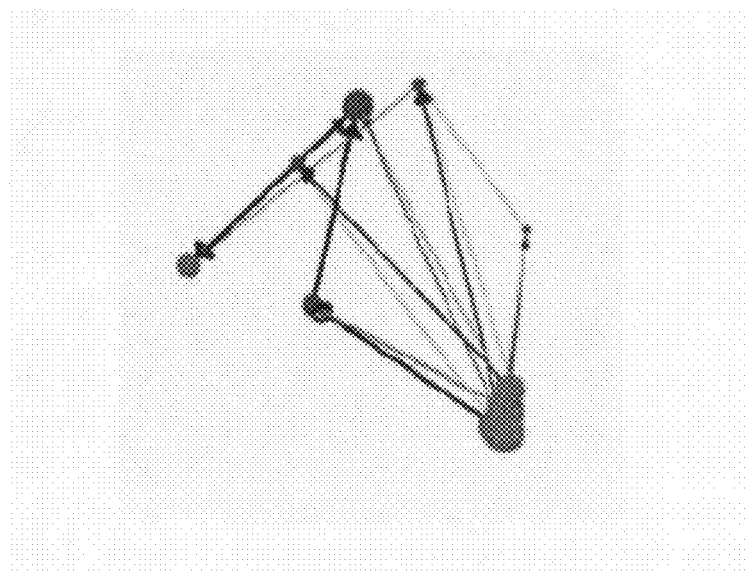
Figure 22J:
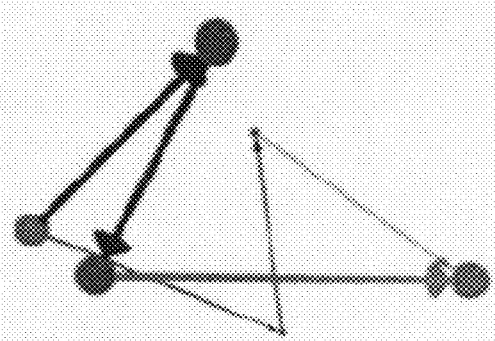

FIG. 22H is a path extracted from the activity of a task network, a handwritten digit recognizer trained to recognize the digit 7 during the processing of an input image of a 7. The figure shows the first firing of the output neuron during the final time window, signaling recognition of the digit 7. In contrast, FIG. 22B shows a path drawn from the same network during the processing of an input image of the digit 2, which has similar features to images of sevens. The network behavior for the digit 7 was similar for multiple input images of the digit 2. The final firing of the output neuron could be traced back to the input pulse along the same relatively short two-segment path. The final firing propagated charge along inhibitory synapses. Other input images, such as those of the digit 1, triggered different activity, but the paths to the final firing tended to be short and to trigger more inhibitory behavior. The paths for correct recognition of the digit 7 tended to vary more, but were longer overall, as could be expected since the fire to indicate recognition of d, as discussed above, may be programmed to occur within the final 50 time units. Some of these paths were cyclical, unlike the paths observed for non-d digits. The variation in paths for images of 7 may be attributable to the variations in ways 7's can be written.

The causality paths provide further intuition about how networks of this type operate. Based on these results, we can speculate that shorter paths to the final firing of the output neuron result from the relative ease of identifying an image as a non-d digit as compared to the paths that result when identifying an image as a d digit. That is, it is easier (and requires less complicated structure) for the network to determine that an image is not of a d than it is for the network to definitively say that the image is of a d. Table 8 below gives the classification results of one of these networks in isolation (a network trained to recognize handwritten images of 7's). In particular, this Table 8 shows that for non-7 images of digits other than 9's, the network achieves higher than 90 percent accuracy (that is, the network does not fire in the last time window for these images), whereas it only achieves around 80 percent accuracy for images of sevens. The low accuracy rate for 9's may be attributed to the similarities in the ways 7's and 9's are written.

TABLE 8

Accuracy Breakdown for a Network Trained to Recognize Images of the Digit 7

| Digit | Accuracy |
| --- | --- |
| 0 | 99.4898 |
| 1 | 99.9119 |
| 2 | 97.6744 |
| 3 | 90.8911 |
| 4 | 97.4542 |
| 5 | 92.9372 |
| 6 | 99.791 |
| 7 | 79.3574 |
| 8 | 94.5585 |
| 9 | 77.106 |

Causality paths are helpful in understanding what structure in the network is important in producing the functionality of the network. They are another automated way to track useful substructures that may be exploited during the evolutionary optimization method.

It is important to note that much of the network's behavior is governed by inhibition of activity (that is, keeping neurons from firing rather than causing neurons to fire). This is true in many different task types, but it is especially true in this task example, in which the network must not fire in approximately 90 percent of the input cases (because the network is only recognizing one digit type of 10 possible digit types). This type of activity is much harder to track using conventional analysis methods, but it is clearly vital to understanding how each network operates. A major advantage of our existing visualization tool is that it allows us to observe the propagation of charge along the synapses, which are clearly either excitatory or inhibitory, and to see precisely how different input events affect the behavior of the rest of the network.

NIDA networks may solve tasks in a variety of domains, including control, anomaly detection, and classification. However, in the development of a new architecture and associated design method, it can be difficult to identify what characteristics of the architecture and the method are important, as well as how to improve the overall performance of the architecture and design method. With this in mind, visual analytics tools have been developed to facilitate the understanding of both the structure of the NIDA networks produced for different tasks and the behavior of these networks on different tasks and for different input types.

The visual analytics tool presented herein motivates analysis that can occur in real-time during the training process of the networks. For example, a substructure in one of the networks produced during training seems to be more active than other neurons in that network and that this substructure is active for several different input images (of numerals). This structure may be active in general, and motivated the statistical analysis that confirmed that hypothesis. Without the visualization tool, there would be no hypothesis and such a substructure not be found. Moreover, the idea of extracting a substructure based on highest activity may be included as part of evolutionary optimization.

Another feature of the visual analytics tool of an embodiment of the present invention (see the related visualization patent application of the same inventors and Margaret Drouhard filed concurrently herewith) is that it allows us to view causality paths to trace through the events that led to a particular fire or change in charge event. This is a more complex computational operation, so it may not be a real-time tool we can use to extract substructures for re-use during evolution. However, these causality paths provide a greater understanding to the user of the behavior of the network. As noted in the results section, in most cases, inhibition of firing in the network is essential to the operation of the network, but it can be difficult to see the full effect of inhibition on the network's behavior without the aid of a visualization tool. The ability to see the network's full structure gives the user an intuitive feel for not only how many inhibitory synapses there are in the network, but also how active these synapses are (through highlighting of the synapse) and how many events are propagating along them (through charge points along the synapse).

This scenario can be modeled as an observation of a discrete event process that can be characterized by its arrival times $\{t_k | t_0 = 0, t_{k+1} > t_k, k \in I^+\}$. This process can be represented as a discrete time real-valued random process $\{x_k = t_k - t_{k-1} | k \in I^+ - \{0\}\}$, where the $x_k$ are in $R^+$ and $x_k \neq 0$. The $x_k$ are the time intervals between event arrivals and, with the additional knowledge of the time of the first event, $t_0$, fully characterize the discrete event process. Discrete events in the present invention (for example, of process control, anomaly detection or biological classification applications) may propagate together through a synapse. A well-known statistical detection problem assumes that $x_k$ is a random process sampled from one of two known distributions, characterized by probability spaces $(\Omega_i, \Lambda_i, P_i)$, for i=0,1. Optimal detectors are known that minimize a linear combination of (i) the probability of detection $p_0$, (ii) the false alarm probability $p_1$, and (iii) the expected time of detection (decision) $E\{T\}$. The optimal algorithm processes received events sequentially, and after each receipt decides (i) not to make a decision until additional information is received, or (ii) that the inputs correspond to process 0 or 1. In the second case, the algorithm outputs the determined process type and stops. A slightly more challenging problem assumes that $x_k$, is a random process whose statistics can change from sample time to sample time between the two probability spaces. In both cases, the problem is well-defined in the field and has an optimal solution when the parameters of both distributions are completely specified (Poor and Hadjiliadis (2009);

see pp. 102-129). There are also algorithms for this problem when the second distribution has some unknown parameters (Li et al., 2009).

In our setup, the NIDA network to be designed may have one input node and one output node. The network receives a pulse each time a packet arrives. Firing of the output node corresponds to a change in behavior. We may allow for a window of 100 time steps after the change in behavior. We may also define a threshold value, $\tau$, that determines how many output firings constitute a detection. If the mean arrival rate changes at time t, then $\tau$ firings of the output neuron at any point between t and t+100 is considered a true positive. If the output node fires $\tau$ times in a 100 time step window at any other time than 100 time steps following a change in mean arrival rate, it is categorized as a false alarm. For training, $\tau=1$ is used, and the fitness of the network is a function of the number of correct detections and false alarms.

The training algorithm was run, by way of example, for 10,000 epochs. The results shown below were produced by two networks, $N_+$ (65 neurons and 187 synapses) and $N_-$ (47 neurons and 148 synapses), that were able to detect, respectively, increases (+) and a decreases (−) in the mean arrival rate. We ran three types of tests: tests with large changes in the mean arrival rate (changes of at least 0.38), medium changes in the mean arrival rate (changes of at least 0.2) and small changes in the mean arrival rate (changes of at least 0.1). We estimated the probability of detection ($P_d$) of increases (decreases), the probability of false alarms ($P_{fa}$) for increases (decreases), and the probability of missed detection ($P_m$) of increases (decreases) by the frequency of detection and missed detection events over 100 test runs for both $N_+$ and $N_-$. All runs (training and evaluation) utilized independently generated random input event sequences.

The results are shown in Table 9. A Table 9 of estimated probability detection ($P_d$), probability of false alarm ($P_{fa}$), and probability of missed detection ($P_m$) of increases and decreases for $N_+$ and $N_-$, respectively, for three different test types (large, medium, and small changes in mean arrival rate) is provided below:

TABLE 9

| | Large | | | Medium | | | Small | | |
|---|---|---|---|---|---|---|---|---|---|
| Network | $P_d$ | $P_{fa}$ | $P_m$ | $P_d$ | $P_{fa}$ | $P_m$ | $P_d$ | $P_{fa}$ | $P_m$ |
| $N_+$ | 0.90 | 0.05 | 0.02 | 0.82 | 0.18 | 0.08 | 0.78 | 0.22 | 0.35 |
| $N_-$ | 0.87 | 0.13 | 0.01 | 0.87 | 0.13 | 0.14 | 0.78 | 0.22 | 0.45 |

FIG. 34 of U.S. Ser. No. 14/513,280 filed Oct. 14, 2014 and incorporated by reference in its entirety shows the changes in mean arrival rate of one example test run (solid curve), as well as when $N_+$ 3430 and $N_-$ 3420 fired in that test run. Region 3450 is shown in greater detail as zoomed-in region 3460 and shown in larger detail in FIG. 35. An increase in arrival rate such as at 3410 leads to events detecting rate increase. Detection of another rate increase is shown as events 3430. Events detecting a decrease in arrival rate are shown at 3420. False alarms 3440 are possible.

Referring to FIG. 35 of the '280 application, vertical line 3510 indicates an increase in average event arrival rate. 3520 represents the subsequent detection events (+). The arriving events are shown at 3530, 3520 is a vertical line indicating a decrease in average arrival rate while 3550 are the subsequent detection events (−).

NIDA networks performed well when detecting large changes in the mean arrival rate, but the performance decreased as the size of the change in the arrival rate decreased. This is expected and consistent with the behavior of optimal detectors for problems where they are known. Performance tends to decrease as the region of overlap increases between the probability functions of the event observables conditioned upon the hypotheses.

A simple fitness function was used: the difference between the numbers of correct detections and false alarms. The fitness function favored networks that could detect any change in mean activity rate, but all of our training examples produced networks that detected either positive or negative changes, but not both. Other fitness functions or more extensive training may produce similar or improved results. The NIDA networks that were produced had many recurrent connections, as would be expected for this type of problem.

The performance characteristics of the ANN can be compared against the performance of an optimal detector for a simplified problem where the solution is known. We consider a classic example where the input event process has a constant mean arrival rate $\lambda$ that is one of two values $\{\lambda_0, \lambda_1\}$ and is observed over a time interval $\Delta T$. We assume $\lambda_1 > \lambda_0$. The optimal probabilities of detection and error, suitably defined, can be computed without regard to the observed sequence of events in this case.

The number of received events n is a Poisson random variable with distribution $$p(n) = \frac{(\lambda \Delta T)^n}{n!} e^{-\lambda \Delta T}$$

where $\lambda \Delta T$ is the mean number of observed events in the time interval. The problem is to decide which of two hypotheses is correct: $\{H_0: \lambda = \lambda_0\}$ or $\{H_1: \lambda = \lambda_1\}$.

Assuming the a priori probability of hypothesis $H_0$ is 0.5 and the costs assigned to correct (detection) and incorrect (false alarm or failure to detect) identification of the true hypothesis are equal, the optimal decision rule is (H. L. Van Trees (1968); see pp. 23-46), given an observed number of events fl in the time interval, and defining the function $$f(\lambda_0, \lambda_1) = \frac{(\lambda_1 - \lambda_0)\Delta T}{\ln \lambda_1 - \ln \lambda_0},$$

$$h = \begin{cases} H_1 & \text{if } n > f(\lambda_0, \lambda_1) \\ H_0 & \text{if } n < f(\lambda_0, \lambda_1) \end{cases}$$

with no (or random) choice in the case of equality. The probability of detection (correct classification) is the sum of the probabilities that $H_0$ is true and the number of observed events is less than $f(\lambda_0, \lambda_1)$, and that $H_1$ is true and the number of observed events in greater than $f(\lambda_0, \lambda_1)$ (assuming the function's value is not an integer):

$$p_d = \sum_{\substack{k \geq 0 \\ k < f(\lambda_0, \lambda_1)}} \frac{(\lambda_0 \Delta T)^n}{n!} e^{-\lambda_0 \Delta T} + \sum_{k > f(\lambda_0, \lambda_1)} \frac{(\lambda_1 \Delta T)^n}{n!} e^{-\lambda_1 \Delta T}.$$

The probability of error is expressed similarly:

$$p_e = \sum_{\substack{k \geq 0 \\ k < f(\lambda_0, \lambda_1)}} \frac{(\lambda_1 \Delta T)^n}{n!} e^{-\lambda_1 \Delta T} + \sum_{k > f(\lambda_0, \lambda_1)} \frac{(\lambda_0 \Delta T)^n}{n!} e^{-\lambda_0 \Delta T}.$$

This classic detector is predicated upon the assumptions that either hypothesis $H_0$ or $H_1$ is valid for the duration of the time interval, that a priori statistics are known, and that costs can be assigned. When one of the hypotheses is not valid for the entire interval, as is the case for the application of interest, the mathematics become more challenging. One approach is the assumption of a Markov process that generates the arrival statistic as a function of time, and the methods of quickest detection, discussed previously, can be applied in some cases.

An alternative approach using Neyman-Pearson detectors (Vantrees 1968; see pp. 23-46), which compare a computed likelihood ratio against a threshold, is used here to explore how the probability of detection changes with a constraint on the maximum allowed probability of error, expressed graphically as receiver operating characteristic (ROC) curves (see FIGS. 28A, 28B, 29A and 29B for exemplary curves. If the probabilities of observation of a signal S given hypotheses $H_0$ and $H_1$, $p(S|H_0)$ and $p(S|H_1)$, are known, the likelihood ratio (LR)

$$\Lambda(S) = \frac{p(S|H_1)}{p(S|H_0)}$$

can be compared against a threshold $\eta$ determined by the solution of a constrained optimization problem, yielding a decision that $H_1$ is true if the LR $\Lambda(S) > \eta$ and that $H_0$ is true if it is less. FIGS. 28A and 28B show representative ROC curves for Neyman-Pearson detectors and FIGS. 29A and 29B show representative ROC curves for an ANN detector for different values of $\lambda_0$ and $\lambda_1$. The Neyman-Pearson optimal detector, which is a function of the maximum allowed probability of error, is used to generate the curves of FIGS. 28A and 28B for each pair of mean arrival rates. In contrast, the same ANN detector structure is used for all pairs of FIGS. 29A and 29B. In order to evaluate the ANN detector in a like manner, the detector's output events within intervals $[t-\Delta t, t]$ are counted and compared against a threshold. A detection at time t corresponds to the count exceeding the threshold at that time, and frequencies of detection and error are computed for a range of thresholds and graphs.

The salient point here is the ANN detector is providing a (probably suboptimal) solution to a much more challenging detection problem than can be solved mathematically, where the statistics of the underlying processes are not known and must be learned (along with the solution) by observing the input event sequence. The learning problem is supervised, as an oracle is assumed that allows evaluation of the fitness function during training, but this is not sufficient to drive an optimal detector. It is sufficient at this point to recognize that the ANN detector's performance has similar behavior to an (over-simplified) optimal detector, exhibiting increasing detection probability with increasing allowable probability of error, and increasing probability of detection with an increasing difference in mean arrival rate of the events. The two types of detectors are qualitatively, but not quantitatively, comparable.

With very little human interaction, outside of specifying one input node and one output node, the algorithm produced networks that can detect changes in the statistics of the arrival rate of packets in a network security system. Dynamic components are absolutely necessary for these problems. A NIDA ANN can evolve to include the structural elements and dynamic elements that each separate problem requires, rather than rely on hand-tuning of the structure or dynamic components, as is often required for other types of neural networks. We have also found that our network structure can be trained to perform well on the exclusive-or problem and the cart and pole (inverted pendulum) problem.

The visibility settings and color encodings may be expanded to give a more accurate representation of the network's current state. Specifically, in addition to the option to make network elements become visible (visibility upon activity), the tool may include a setting to reduce the visibility of elements to ghost or invisibility after a period of inactivity ("fade after inactivity"). The combination of visibility upon activity and fade after inactivity will allow users to comprehend more efficiently the propagation of activity through the network and will highlight the most active elements and substructures. Color encodings may also be expanded to provide users with an up-to-date view of neuron charge level. Neuron hues may be used to differentiate between input, hidden, and output neurons, while saturation levels may be used to encode charge. Neuron charge level falls within the range −1.0 to 1.0, but individual neurons may have varying thresholds. The visualization tool may normalize the charge level of a given neuron n with respect to the threshold of n and discretize it within a set number of bins. When a neuron receives charge (positive or negative) from a connected synapse, its saturation can be adjusted to the discrete level that best indicates its current proximity to the firing threshold.

Interactivity and flexibility are the highest priorities for the visualization tool. The visualization tool can allow the user to modify all of the currently adjustable features from within the graphical user interface at any point during a simulation. Adjustable features include visibility settings as described in previous sections, color scheme, mode of interaction (interactive vs. image rendering for video), and event selection for causality path trace. Additional interactivity features can allow users to explore the networks more freely. In addition to allowing visibility settings to be modified by rule (visibility upon activity, fade after inactivity, etc.), users can toggle the visibility of a selected neuron n or synapse s, along with the visibility of any other elements directly connected to n or s. Users can also have interaction controls to define thresholds to suppress or highlight particular events. For example, the user can visualize only neurons that fire more than N times over a specified time interval, or that have fired within the last K time units. These features allow users to eliminate visual clutter and examine critical substructures of the network in-depth. The interactivity of causality path tracing may accommodate reverse animation, facilitating the exploration of causality in both directions source to destination and destination to source neuron. As an enhancement to other interactive features, interactive scaling may be implemented within the network so that the relationships in more compact networks and substructures can be examined. The exploration of dense networks requires scaling in addition to zooming because some networks allow for neurons to overlap within a single unit of space. In order to view relationships between neurons so closely situated, the space that each neuron occupies can be reduced in proportion to the space of the network overall. In other words, synapses may be represented at a greater scale than neurons, but in proportion to their true length in order to view connections between closely packed neurons.

An extension to the evolutionary optimization (EO) software accommodates the ability to reuse structures based on activity. Each time a new best network is found for a given task, the simulations required for the task are completed and firing statistics for each neuron in that network are recorded in memory (not all of these records need be maintained during normal simulations). Based on these results, the most active hidden neurons in the network are recorded; (the input and output neurons need not be included because they exist in every network in the population). A user-specified percentage (an exemplary default value is 5 percent) of these neurons can be extracted from the network to be included in the useful substructure.

Causality paths have been discussed above. For a given artificial neural network with specified input and output connections, three different types of similarity may be defined: 1) Input/output similarity: Given similar input event sequences, the two networks produce similar output event sequences. Such input/output similarity is not a measure of graph structure similarities or parameter values of the two compared networks; 2) Structural similarity: Here, the two compared networks have similar graph structures. Optionally, similarities in parameter values may be considered as well. Structural similarity may not be a measure of input/output behavior similarity; and 3) Information flow similarity: Here, there is substantial structural similarity and, moreover, there is substantial information flow similarity, for example, a function of the time sequences of events occurring on synapses and neurons of identified neural pathways. The degree of information flow similarity may be defined by the number of levels of behavioral similarity that exist between compared networks.

Let us denote the set of active neurons in a network as N. Any synapses that connect neurons in N are also included in the useful substructure. A minimum-hop path from each neuron in N from an input neuron in the network is also included (where a path includes both neurons and synapses along that path, but we do not include the input neuron). These paths go from the input neuron to a neuron in N. Similarly, a minimum-hop path from each neuron in N to an output neuron in the network is also included in the substructure. FIG. 24A and FIG. 24B provide examples of a network and respectively of the associated useful substructure that is extracted from the network of FIG. 24A using this method. FIG. 24A provides an example network while FIG. 24B provides a visualization of the useful substructure extracted from the network based on activity N (set of neurons) for that network.

Figure 25:
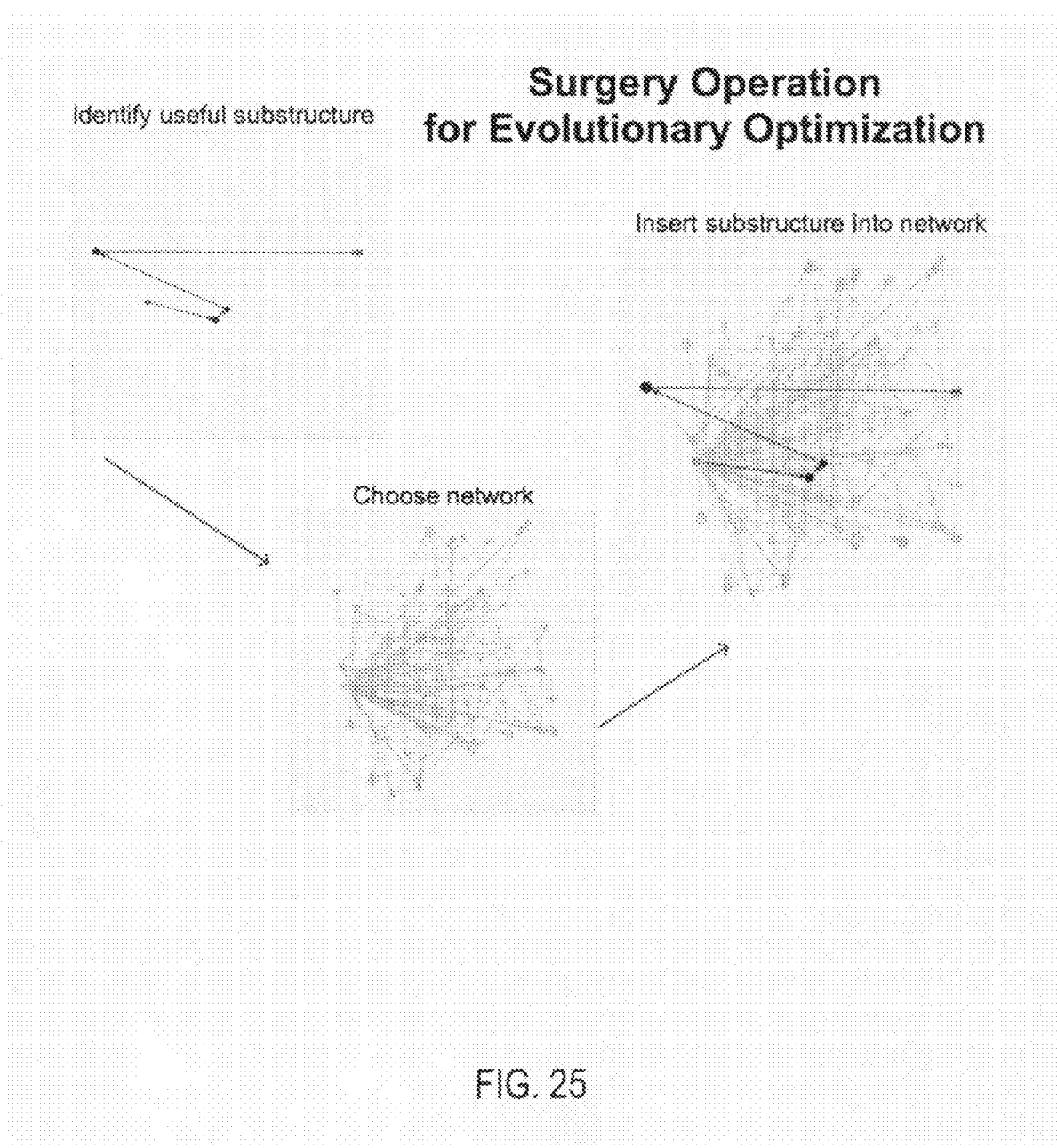
FIG. 25 provides a visualization example of a process whereby a useful substructure of an artificial neural network is identified for performing a particular sub-task, for example, by measuring the activity level of use of certain neural pathways being above a predetermined level of activity, then, an artificial neural network is selected (chosen) for performing a task of which the sub-task and its identified neural pathway may comprise a useful substructure and, lastly, the identified useful substructure is inserted (implanted) into the artificial neural network (if not already a substructure thereof).

FIG. 25 provides a visualization example of a process whereby a useful substructure of an artificial neural network is identified for performing a particular sub-task, for example, by measuring the activity level of use of certain neural pathways being above a predetermined level of activity, an artificial neural network is selected for performing a task of which the sub-task and its identified neural pathway may comprise a useful substructure and the identified useful substructure is inserted into the artificial neural network (if not already a substructure thereof). For example, FIG. 24A and FIG. 24B show a full network and a sub-network or substructure extracted based on an activity level while FIG. 25 shows its "surgical" insertion into an artificial neural network where the substructure may be presently missing. "Surgery" may be defined as either removal of substructures or implants of substructures from parent networks in a future generation of child networks of EO where the substructures are "useful" because they exhibit at least behavioral similarity over multiple inputs from the same class in at least one network. It may be desirable to extract or surgically remove unsuccessful network substructures or identify a useful substructure and surgically implant that substructure in a network in order to improve the network's performance.

A user-specified number of useful substructures may be maintained in memory such as a database as part of the evolutionary optimization, along with the fitness value of the network from which each substructure was obtained. Conversely, unsuccessful substructures that are unsuccessful at certain tasks may be preserved in a library for surgical removal from a network. The mutation operation may be expanded so that one possible mutation is the inclusion of one of these successful/unsuccessful substructures from the database in the network. This mutation includes either the sub-network from the most successful network thus far or randomly selects one of the other useful substructures maintained in memory. It randomly selects between the two, but weights the selection based on user-defined parameters. For example, the user could specify that the sub-network from the most successful network should be included in 90 percent of the instances in which this mutation occurs and another sub-network from a list maintained in memory should be included in 10 percent of the instances. Another possible mutation is the deletion of one of these substructures as an unsuccessful substructure for a given sub-task. If the deleted substructure is not in a database of useful substructures, it may be added for possible future use as a useful, unsuccessful substructure.

All United States and foreign patents and articles whose citations are provided above and below in the Bibliography should be deemed to be incorporated by reference as to their entire contents for the purposes of understanding the underlying technology behind an embodiment of a method and apparatus for constructing an artificial neural network in hardware or software according to the various embodiments of the several related patent applications. The embodiments of a method and apparatus for constructing a neuroscience-inspired artificial neural network architecture in the form of a DANNA array or a NIDA described above should only be deemed to be limited by the scope of the claims which follow.

BIBLIOGRAPHY

1) Xin Yao, "Evolving artificial neural networks," *Proceedings of the IEEE*, 87(9):1423-1447, September 1999.
2) David J. Montana and Lawrence Davis, "Training feedforward neural networks using genetic algorithms," *Proceedings of the 11th international joint conference on Artificial intelligence—Volume* 1, pps. 762-767, San Francisco, Calif., USA, 1989, Morgan Kaufmann Publishers Inc.
3) D. Fogel, L. Fogel, and V. Porto, "Evolving neural networks," *Biological Cybernetics,* 63(6): 487-493, 1990.
4) Randall D. Beer and John C. Gallagher. Evolving dynamical neural networks for adaptive behavior," *Adapt. Behav.,* 1(1):91-122, June 1992.
5) A. P. Wieland, "Evolving neural network controllers for unstable systems," *Neural Networks,* 1991, *IJCNN-91-Seattle International Joint Conference on,* volume ii, pages 667-673, July 1991.
6) S. Dominic, R. Das, D. Whitley, and C. Anderson, "Genetic reinforcement learning for neural networks, *Neural Networks,* 1991, *IJCNN-91-Seattle International Joint Conference on,* volume ii, pages 71-76 vol. 2, July 1991.
7) Faustino Gomez, Jiirgen Schmidhuber, and Risto Miikkulainen, "Efficient non-linear control through neuroevolution," Johannes Fiirnkranz, Tobias Scheffer, and Myra Spiliopoulou, editors, *Machine Learning: ECML* 2006, volume 4212 of *Lecture Notes in Computer Science*, pages 654-662, Springer Berlin/Heidelberg, 2006.
8) Faustino Gomez, Jurgen Schmidhuber, and Risto Miikkulainen, "Accelerated neural evolution through cooperatively coevolved synapses," *J. Mach. Learn. Res.,* 9:937-965, June 2008.
9) Dario Floreano, Peter Dürr, and Claudio Mattiussi, "Neuroevolution: from architectures to learning," *Evolutionary Intelligence,* 1(1):47-62, 2008.
10) Jürgen Branke, "Evolutionary algorithms in neural network design and training—A review," Jarmo T. Alander, editor, *Proc. of the First Nordic Workshop on Genetic Algorithms and their Applications* (INWGA), volume 95-1, pages 145-163, Vaasa, Finland, 1995.
11) D. Whitley, T. Starkweather, and C. Bogart, "Genetic algorithms and neural networks: optimizing connections and connectivity," *Parallel Computing,* 14(3):347-361, 1990.
12) J. R. Koza and J. P. Rice, "Genetic generation of both the weights and architecture for a neural network. In *Neural Networks,* 1991., *IJCNN-91-Seattle Inter-national Joint Conference on,* volume ii, pages 397-404 vol. 2, July 1991.
13) D. Dasgupta and D. R. McGregor, "Designing application-specific neural networks using the structured genetic algorithm," *Combinations of Genetic Algorithms and Neural Networks,* 1992, COGANN-92. *International Workshop on,* pages 87-96, June 1992.
14) David White and Panos Ligomenides, "Gannet: A genetic algorithm for optimizing topology and weights in neural network design," José Mira, Joan Cabestany, and Alberto Prieto, editors, *New Trends in Neural Computation, volume* 686 of *Lecture Notes in Computer Science,* pages 322-327, Springer Berlin/Heidelberg, 1993.
15) V. Maniezzo. Genetic evolution of the topology and weight distribution of neural networks. *Neural Networks, IEEE Transactions on,* 5(1):39-53, January 1994.
16) P. J. Angeline, G. M. Saunders, and J. B. Pollack, "An evolutionary algorithm that constructs recurrent neural networks," Neural Networks, IEEE Transactions on, 5(1): 54-65, January 1994.
17) K. S. Tang, C. Y. Chan, K. F. Man, and S. Kwong. "Genetic structure for nn topology and weights optimization," *Genetic Algorithms in Engineering Systems: Innovations and Applications,* 1995. *GALESIA. First International Conference on (Conf. Publ. No. 414),* pages 250-255, September 1995.
18) Yong Liu and Xin Yao, "A population-based learning algorithm which learns both architectures and weights of neural networks," *Chinese Journal of Advanced Software Research (Allerton),* 10011:54-65, 1996.
19) David E. Moriarty and Risto Mikkulainen, "Efficient reinforcement learning through symbiotic evolution," *Machine Learning,* 22(1):11-32, 1996.
20) David E. Moriarty and Risto Miikkulainen, "Forming neural networks through efficient and adaptive coevolution," *Evol. Comput.,* 5(4):373-399, December 1997.
21) Faustino Gomez and Risto Miikkulainen, "2-d pole balancing with recurrent evolutionary networks," *Proceeding of the International Conference on Artificial Neural Networks (ICANN),* pages 425-430, 1998.
22) X. Yao and Y. Liu, "A new evolutionary system for evolving artificial neural networks," *Neural Networks, IEEE Transactions on,* 8(3):694-713, May 1997.
23) Joo Carlos Figueira Pujol and Riccardo Poli, "Evolving the topology and the weights of neural networks using a dual representation," *Applied Intelligence,* 8:73-84, 1998.

24) Hussein A. Abbass, "An evolutionary artificial neural networks approach for breast cancer diagnosis," *Artificial Intelligence in Medicine,* 25(3):265-281, 2002.
25) Kenneth O. Stanley and Risto Miikkulainen, "Evolving neural networks through augmenting topologies," *Evolutionary Computation,* 10(2):99-127, 2002.
26) K. O. Stanley, B. D. Bryant, and R. Miikkulainen, "Evolving adaptive neural networks with and without adaptive synapses," *Evolutionary Computation,* 2003. *CEC '03, The* 2003 *Congress on,* volume 4, pages 2557-2564, December 2003.
27) Enrique Alba and J. Chicano, "Training neural networks with ga hybrid algorithms," Kalyanmoy Deb, editor, *Genetic and Evolutionary Computation, GECCO* 2004, volume 3102 of *Lecture Notes in Computer Science,* pages 852-863. Springer Berlin/Heidelberg, 2004.
28) J. E. Fieldsend and S. Singh, "Pareto evolutionary neural networks," *Neural Networks, IEEE Transactions on,* 16(2):338-354, March 2005.
29) P. P. Palmes, T. Hayasaka, and S. Usui, "Mutation-based genetic neural network," *Neural Networks, IEEE Transactions on,* 16(3):587-600, May 2005.
30) Y. Kassahun. *Towards a Unified Approach to Learning and Adaptation,"* PhD thesis, Christian-Albrechts-University, Kiel, Germany, February 2006.
31) Nils T. Siebel and Gerald Sommer, "Evolutionary reinforcement learning of artificial neural networks," *Int. J. Hybrid Intell. Syst.,* 4(3):171-183, August 2007.
32) N. T. Siebel, J. Botel, and G. Sommer, "Efficient neural network pruning during neuroevolution, *"Neural Networks,* 2009. *IJCNN* 2009. *International Joint Conference on,* pages 2920-2927, June 2009.
33) Kenneth O. Stanley, David B. D'Ambrosio, and Jason Gauci, "A hypercube-based encoding for evolving large-scale neural networks," *Artificial Life,* 15(2):185-212, 2009.
34) Jason Gauci and Kenneth O. Stanley, "Autonomous evolution of topographic regularities in artificial neural networks," *Neural Computation,* 22(7):1860-1898, 2010.
35) Henry Markram, Wulfram Gerstner, and Per Jesper Sjöström, "A history of spike-timing-dependent plasticity," *Frontiers in Synaptic Neuroscience,* 3:4, 2011.
36) Randall D. Beer, "On the dynamics of small continuous-time recurrent neural networks," *Adaptive Behavior,* 3(4): 469-509, 1995.
37) Randall D. Beer, "The dynamics of adaptive behavior: A research program," *Robotics and Autonomous Systems,* 20(2-4):257-289, 1997, ce:title; Practice and Future of Autonomous Agents.
38) John C. Gallagher and Saranyan Vigraham, "A modified compact genetic algorithm for the intrinsic evolution of continuous time recurrent neural networks," *Proceedings of the Genetic and Evolutionary Computation Conference,* GECCO '02, pages 163-170, San Francisco, Calif., USA, 2002, Morgan Kaufmann Publishers Inc.
39) P. Merolla, J. Arthur, F. Akopyan, N. Imam, R. Manohar, and D. S. Modha, "A digital neurosynaptic core using embedded crossbar memory with 45pj per spike in 45 nm," *Custom Integrated Circuits Conference (CICC),* 2011 *IEEE,* pages 1-4, September 2011.
40) Robert Preissl, Theodore M. Wong, Pallab Datta, Myron Flickner, Raghavendra Singh, Steven K. Esser, William P. Risk, Horst D. Simon, and Dhaimendra S. Modha. "Compass: a scalable simulator for an architecture for cognitive computing," *Proceedings of the International Conference on High Performance Computing, Networking, Storage and Analysis,* SC '12, pages 54:1-54:11, Los Alamitos, Calif., USA, 2012, IEEE Computer Society Press.
41) Nadav Kashtan, Uri Alon, and Jr. Callan, Curtis G., "Spontaneous evolution of modularity and network motifs," *Proceedings of the National Academy of Sciences of the United States of America,* 102(39): pp. 13773-13778, 2005.
42) T. Caelli, Ling Guan, and W. Wen, "Modularity in neural computing," Proceedings of the IEEE, 87(9): 1497-1518, September 1999.
43) Sung-Bae Cho and K. Shimohara, "Modular neural networks evolved by genetic programming," *Evolutionary Computation,* 1996, *Proceedings of IEEE International Conference on,* pages 681-684, May 1996.
44) N. Garcia-Pedrajas, C. Hervas-Martinez, and J. Munoz-Perez, "Covnet: a cooperative coevolutionary model for evolving artificial neural networks," *Neural Networks, IEEE Transactions on,* 14(3): 575-596, May 2003.
45) N. Garcia-Pedrajas, C. Hervas-Martinez, and D. Ortiz-Boyer. Cooperative coevolution of artificial neural network ensembles for pattern classification," *Evolutionary Computation, IEEE Transactions on,* 9(3):271-302, June 2005.
46) Joseph Reisinger, Kenneth O. Stanley, and Risto Miikkulainen, "Evolving reusable neural modules. In *Proceedings of the Genetic and Evolutionary Computation Conference,* 2004,
47) Gregory S. Hornby, "Measuring, enabling and comparing modularity, regularity and hierarchy in evolutionary design," *Proceedings of the* 2005 *conference on Genetic and evolutionary computation,* GECCO '05, pages 1729-1736, New York, N.Y., USA, 2005, ACM.
48) Takumi Kamioka, Eiji Uchibe, and Kenji Doya, "Neuroevolution based on reusable and hierarchical modular representation," *Proc.* 15*th Int. Conf. Advances in Neuro-Information Processing, Part I (ICONIP '08),* pages 22-31. Berlin, Heidelberg: Springer-Verlage, 2009.
49) Xin Yao and M. M. Islam, "Evolving artificial neural network ensembles," *Computational Intelligence Magazine, IEEE,* 3(1): 31-42, February 2008.
50) S. Singh, A. Barto, and N. Chentanez, "Intrinsically motivated reinforcement learning," 18*th Annual Conference on Neural Information Processing Systems (NIPS),* 2004.
51) Jeff Hawkins et al., "Sequence memory for prediction, inference and behavior," *Phil. Trans. Royal Soc. B,* pp. 1203-1209, 2009
52) Glackin et al., "A Novel Approach for the Implementation of Large Scale Spiking Neural Networks on FPGA Hardware," *IWANN* 2005, LNCS 3512, pp. 552-563, 2005.
53) Cassidy et al., "FPGA Based Silicon Spiking Neural Array," *Biomedical Circuits and Systems Conference* (BIOCAS 2007), pp. 75-78, IEEE, 2007.
54) Cassidy et al., "Cognitive Computing Building Block: A Versatile and Efficient Digital Neuron Model for Neurosynaptic Cores," *IBM Research,* 2013.
55) Sharp et al., "Power-efficient simulation of detailed cortical microcircuits on SpiNNaker," *Journal of Neuroscience Methods,* 201, pp. 110-118, 2012.
56) M. Anthony Lewis et al., "Control of a robot leg with an adaptive a(nalog)VLSI CPG chip," *Neurocomputing,* 38-40, 2001, pp. 1409-1421.
57) M. Anthony Lewis et al., "CPG Design Using Inhibitory Networks," *Proc. of the* 2005 *IEEE International Conference on Robotics and Automation,* (ICRA 2005), pp. 3682-3687, 2005.

58) Simon Friedmann et al., "Reward-based learning under hardware constraints—using a RISC processor embedded in a neuromorphic substrate," *Frontiers in Neuroscience*, 7, p. 160, 2013.
59) B. V. Benjamin et al., "Neurogrid: A mixed-analog-digital multichip system for large-scale neural simulations." *Proceedings of the IEEE*, 102, pp. 699-716, 2014.
60) Giacomo Indiveri et al., "Neuromorphic silicon neuron circuits." *Frontiers in Neuroscience*, 5, 2011.
61) Preiss et al., "Compass: A scalable simulator for an architecture for cognitive computing," *Proceedings of the International Conference on High Performance Computing, Networking, Storage and Analysis*, p. 54. IEEE Computer Society Press, 2012.
62) U.S. Pat. No. 7,533,071, entitled "Neural Modeling and Brain-based Devices Using Special Purpose Processor" and issued to Snook on May 12, 2009.
63) U.S. Pat. No. 8,311,965 entitled "Area Efficient Neuromorphic Circuits Using Field Effect Transistors and Variable Resistance Material" issued to Breitwisch et al., Nov. 13, 2012.
64) U.S. Pat. No. 8,433,665 entitled "Methods and Systems for Three-Memristor Synapse with STDP and Dopamine Signaling" issued to Tang et al., Apr. 30, 2013.
65) U.S. Pat. No. 8,510,239 entitled "Compact Cognitive Synaptic Computing Circuits with Crossbar Arrays Spatially in a Staggered Pattern" issued to Dharmendra S. Modha, Aug. 13, 2013.
66) U.S. Pat. No. 8,515,885 entitled "Neuromorphic and Synaptronic Spiking Neural Network with Synaptic Weights Learned Using Simulation" issued to Modha, Aug. 20, 2013.
67) U.S. Pat. No. 8,600,919 entitled "Circuits and Methods Representative of Spike Timing Dependent Plasticity of Neurons," to Poon et al., Dec. 3, 2012.
68) U. S. Published Patent App. 2009/0292661 entitled "Compact Circuits and Adaptation Techniques for Implementing Adaptive Neurons and Synapses with Spike Timing Dependent Plasticity (STDP)" on Nov. 26, 2009, to Hass.
69) U. S. Published Patent Application No. 2012/0036099 entitled "Methods and Systems for Reward-Modulated Spike-Timing-Dependent Plasticity" on Feb. 9, 2012, to Venkatraman et al.
70) U. S. Published Patent App. No. 2012/0109863 entitled "Canonical Spiking Neuron Network for Spatiotemporal Associative Memory," on May 3, 2012, to Esser et al.
71) U. S. Published Patent App. No. 2013/0073497 entitled "Neuromorphic Event-Driven Neural Computer Architecture in a Scalable Neural Network" on Mar. 21, 2013, to Filipp Akopyan et al.
72) WO Patent App. 2004/027704 published Apr. 1, 2004, entitled "Spiking Neural Network Device," by Dario.
73) Abbass, Hussein A., Michael Towsey, and G. Finn. "C-Net: A method for generating non-deterministic and dynamic multivariate decision trees." *Knowledge and Information Systems* 3.2 (2001): 184-197.
(74) Belatreche, Ammar, Liam P. Maguire, and Martin McGinnity. "Advances in design and application of spiking neural networks." *Soft Computing* 11.3 (2007): 239-248.
(75) Bohte, Sander M., Joost N. Kok, and Han La Poutre. "Error-backpropagation in temporally encoded networks of spiking neurons." *Neurocomputing* 48.1 (2002): 17-37.
(76) García-Pedrajas, Nicolás, Domingo Ortiz-Boyer, and César Hervás-Martínez. "An alternative approach for neural network evolution with a genetic algorithm: Crossover by combinatorial optimization." *Neural Networks* 19.4 (2006): 514-528.
(77) Jin, Yaochu, Ruojing Wen, and Bernhard Sendhoff. "Evolutionary multi-objective optimization of spiking neural networks." *Artificial Neural Networks—ICANN 2007*. Springer Berlin Heidelberg, 2007. 370-379.
(78) Mangasarian, Olvi L., R. Setiono, and W. H. Wolberg. "Pattern recognition via linear programming: Theory and application to medical diagnosis." *Large-scale numerical optimization* (1990): 22-31.
(79) Michie, Donald, David J. Spiegelhalter, and Charles C. Taylor. "Machine learning, neural and statistical classification." (1994).
(80) Parekh, Rajesh, Jihoon Yang, and Vasant Honavar. "Constructive neural-network learning algorithms for pattern classification." *Neural Networks, IEEE Transactions on* 11.2 (2000): 436-451.
(81) Pavlidis, N. G., et al. "Spiking neural network training using evolutionary algorithms." *Neural Networks, 2005. IJCNN '05. Proceedings. 2005 IEEE International Joint Conference on*. Vol. 4. IEEE, 2005.
(82) Setiono, Rudy, and Lucas Chi Kwong Hui. "Use of a quasi-Newton method in a feedforward neural network construction algorithm." *Neural Networks, IEEE Transactions on* 6.1 (1995): 273-277.
(83) Moore, Kendra E., and Jack C. Chiang. "ALPHA/Sim: ALPHA/Sim simulation software tutorial," *Proceedings of the 32nd conference on Winter simulation*, pp. 259-267. Society for Computer Simulation International, 2000.
(84) Poor, H. Vincent, and Olympia Hadjiliadis. *Quickest detection*, Vol. 40, Cambridge: Cambridge University Press, 2009.
(85) Trees, Van, and L. Harry. *Detection, Estimation, and Modulation Theory-Part l-Detection, Estimation, and Linear Modulation Theory*, John Wiley & Sons, 2001.
(86) F. Rosenblatt, "The perceptron: A probabilistic model for information storage and organization in the brain." *Psychological Review*, 65(6): 386-408, 1958.
(87) Fogel, David B., Eugene C. Wasson III, and Edward M. Boughton. "Evolving neural networks for detecting breast cancer." *Cancer letters*, 96.1, pp. 49-53 (1995).
(88) Boyd, Stephen P., Venkataramanan Balakrishnan, Craig H. Barratt, Nasser M. Khraishi, Xiaoming Li, David G. Meyer, and Stephen A. Norman. "A new CAD method and associated architectures for linear controllers." *IEEE Transactions on Automatic Control*, 33, no. 3, pp. 268-283, 1988.
(89) Garcia, Carlos E., and A. M. Morshedi. "Quadratic programming solution of dynamic matrix control (QDMC)." *Chemical Engineering Communications* 46, no. 1-3, pp. 73-87, 1986.
(90) Athans, Michael, David Castanon, K-P. Dunn, C. Greene, Wing Lee, N. Sandell Jr, and Alan S. Willsky. "The stochastic control of the F-8C aircraft using a multiple model adaptive control (MMAC) method—Part I: Equilibrium flight." *IEEE Transactions on Automatic Control*, 22, no. 5, pp. 768-780, 1977.
(92) Narendra, Kumpati S., and Jeyendran Balakrishnan. "Adaptive control using multiple models." *IEEE Transactions on Automatic Control*, 42, no. 2, pp. 171-187, 1997.
(93) Anderson, Brian, Thomas Brinsmead, Daniel Liberzon, and A. Stephen Morse. "Multiple model adaptive control with safe switching." *International journal of adaptive control and signal processing* 15, no. 5, pp. 445-470, 2001.

(94) Morshedi, A. M., C. R. Cutler, and T. A. Skrovanek. "Optimal Solution of Dynamic Matrix Control with Linear Programming Techniques (LDMC)." *Proc. American Control Conference*, pp. 199-208, 1985.

(95) Gattu, Gangadhar, and Evanghelos Zafiriou. "Nonlinear quadratic dynamic matrix control with state estimation." *Industrial & engineering chemistry research* 31, no. 4, pp. 1096-1104, 1992.

(96) Moran, Manfred, and Jay H Lee. "Model predictive control: past, present and future." *Computers & Chemical Engineering* 23, no. 4, pp. 667-682, 1999.

REFERENCES AUTHORED BY INVENTORS

1) C. D. Schuman and J. D. Birdwell, "Dynamic Artificial Neural Networks with Affective Systems," *PLOS ONE*, vol. 8, is. 11, pp. 1-16, 2013.
2) C. D. Schuman, J. D. Birdwell and M. E. Dean, "Spatiotemporal Classification Using Neuroscience-Inspired Dynamic Architectures," *Biologically Inspired Cognitive Architectures*, pp. 1-9, 2014.
3) Schuman, Catherine D., and J. Douglas Birdwell. "Variable structure dynamic artificial neural networks." *Biologically Inspired Cognitive Architectures* 6 (2013): 126-130.
4) Dean, Mark E., Catherine D. Schuman, and J. Douglas Birdwell. "Dynamic Adaptive Neural Network Array." *Unconventional Computation and Natural Computation*. Springer International Publishing, 2014. 129-141.
5) Schuman, Catherine D., J. Douglas Birdwell, and Mark Dean. "Neuroscience-inspired dynamic architectures." *Biomedical Science and Engineering Center Conference (BSEC)*, 2014 Annual Oak Ridge National Laboratory. IEEE, 2014.
6) Drouhard, Margaret, Catherine D. Schuman, J. Douglas Birdwell, and Mark E. Dean. "Visual Analytics for Neuroscience-Inspired Dynamic Architectures," *IEEE Symposium Series on Computational Intelligence*, 2014.

What we claim is:

1. A method of constructing a neuromorphic network for use in a process control application for an external automated process or external device upon prediction of a component failure by a signal processor, the neuromorphic network comprising a reconfigurable structure of components, the structure of components comprising a connection of at least two different components comprising an addressably reconfigurable two-dimensional array of neuron and synapse circuit elements forming the neuromorphic network, the structure of components comprising at least one addressably configured input neuron circuit element, an addressably configured output neuron circuit element, the addressably configured input and output neuron circuit elements located at an edge of the two-dimensional addressably reconfigurable array of circuit elements and the addressably configured synapse circuit element adapted to connect one addressably configured neuron circuit element to another addressably configured neuron circuit element to form an initial addressably configured array of an initial neuromorphic network, the addressably configured synapse circuit element having a programmable delay or distance determined by a stored selected value of a delay/distance parameter, a signal processor for processing input signals comprising one of a signal generated or sampled in the external automated process or external device and an error signal indicating a deviation of an external automated process signal from an expected value predicted by a model;

the structure of components and the value of the delay/distance parameter determined by an evolutionary optimization process, the structure of components configured in response to the external automated process or external device requiring control, the input neuron and output neuron circuit elements providing inputs or outputs to components external to the array comprising one of a display, a camera, a radio and a scanner of the external automated process or external device;

the addressably configured neuron circuit element generating at least two discrete events, the addressably configured synapse circuit element, responsive to the addressably configured input neuron generating the at least two discrete events, permitting the at least two generated discrete events to propagate together through the addressably configured synapse circuit element, the neuromorphic network performing the process control application for the external automated process or external device requiring control receiving a first output signal representing a measured output of the external automated process or external device and a second output signal predicted by a model of a desired behavior of the external automated process or external device, said neuromorphic network generating a process control signal via an interface and control structure connected to the input and output neuron circuit elements and a configuration control and optimizing device in response to said received first and second output signals, the process control signal being applied to the external automated process or external device to control the external automated process or external device upon the prediction of a component failure; and the process control signal to further optimize a reconfiguration of the addressably configurable circuit elements of the initial neuromorphic network responsive to data received from the external automated process or external device via an input neuron circuit element.

2. The method of constructing a neuromorphic network of claim 1, each of a plurality of connected addressably configurable neurons and synapses forming a two-dimensional dynamic addressably configurable array of circuit neuron and synapse circuit elements, the addressably configurable synapse further having a programmable weight or strength parameter determining a value of charge arriving at a destination neuron circuit element that is addressably configurable.

3. The method of constructing a neuromorphic network of claim 1, each of a plurality of connected addressably configurable neurons and synapses forming a three-dimensional array of circuit elements, the addressably configurable synapse circuit element further having a programmable weight or strength parameter determining a value of charge arriving at a destination neuron that is an addressably configurable circuit element.

4. The method of constructing the neuromorphic network of claim 2 wherein each addressably configurable neuron circuit element comprises a programmable threshold of firing and a programmable refractory period, the addressably configurable neuron circuit element firing if it is not in its refractory period, the firing of a neuron that is an addressably configurable circuit element generating one discrete event.

5. The method of constructing a neuromorphic network of claim 1 wherein the neuromorphic network comprises at least one substructure of addressably configurable neuron and synapse circuit elements for performing a computational sub-task of the process control application for the automated process, and
at least one substructure being an affective system of addressably configurable neuron and synapse circuit elements for performing an affective sub-task of the process control application for the automated process.

6. The method of constructing a neuromorphic network of claim 5 further comprising:
controlling the neuromorphic network construction using a programmed computer processor of the configuration control and optimizing device and an associated database of useful substructures of addressably configurable neuron and synapse circuit elements,
the useful substructures comprising at least one neuron and at least one synapse circuit element,
the useful substructures being measured by controlling the external automated process and addressably reconfiguring the neuromorphic network using the configuration control and optimizing device.

7. The method of constructing a neuromorphic network of claim 6 wherein said computer processor is adapted to extract a useful substructure for a computational sub-task of the process control application for the external automated process from the neuromorphic network and store the useful substructure for the computational sub-task in the associated database.

8. The method of constructing the neuromorphic network of claim 6 wherein said computer processor is adapted to implant a useful substructure of addressably reconfigurable neuron and synapse circuit elements for a computational sub-task of the process control application in the neuromorphic network,
the useful substructure retrieved from a plurality of useful substructures stored in the associated database.

9. The method of constructing the neuromorphic network of claim 6,
the programmed computer processor adapted to identify a useful substructure of addressably configurable neuron and synapse circuit elements based on decreasing error value of the computational sub-task of the useful substructure,
the programmed computer processor for measuring error of performing a task of the process control application of the external automated process and extract the substructure from the neuromorphic network as a useful substructure for storage in the associated database responsive to the decreasing error value.

10. A method of constructing a central pattern generator of a neuromorphic network for use in a process control application of an external automated process, the external automated system comprising one of an external automated system or an external device, the method comprising:
controlling the external automated system or external device upon prediction of a component failure,
the neuromorphic network comprising an addressably configurable circuit element for providing inputs or outputs to components of the external automated system or external device comprising one of a display, a camera, a radio and a scanner device external to the neuromorphic network, the neuromorphic network receiving input data from and transmitting output data to the external automated system or external device,
addressably configuring at least one addressably configurable input neuron circuit element and at least one addressably configurable output neuron circuit, the addressably configurable input and output circuit elements located at an edge of the two-dimensional addressably configured array of neuron and synapse circuit elements;
addressably configuring one synapse circuit element to connect one addressably configured neuron circuit element to another addressably configured neuron circuit element to form an initial addressably configured array comprising an initial two-dimensional neuromorphic network,
addressably reconfiguring the neuromorphic network comprising a different two-dimensional array of neuron and synapse circuit elements;
the central pattern generator comprising at least a neuron and synapse pair of addressably configurable circuit elements producing cyclic or regenerative behavior, and
the addressably configurable neuron generating a sequence of discrete events,
an application of the constructed central pattern generator comprising the process control application and outputting a process control signal to the external automated system or external device,
a structure of components of the constructed central pattern generator comprising:
a neuron of the neuron and synapse pair of addressably configurable circuit elements having a programmable threshold and a programmable refractory period, and
a synapse of the neuron and synapse pair of addressably configurable circuit elements having a programmable delay or distance parameter value; and
responsive to a neuron that is addressably configurable generating a sequence of discrete events, the addressably configurable synapse permitting at least two discrete events to propagate together through the synapse; and
the central pattern generator applying at least one process control signal to at least one actuator for controlling the external automated system or external device in response to the prediction of the component failure and a reconfiguration and optimization of the neuromorphic network.

11. The method of constructing a central pattern generator of claim 10,
the neuron and synapse pair of addressably configurable circuit elements further having a programmable weight of a synaptic connection to the addressably configurable neuron,
the weight comprising a programmable value of charge arriving at a destination neuron that is addressably reconfigurable connected to the addressably configurable synapse of the neuron and synapse pair.

12. The method of constructing a central pattern generator of claim 10 further comprising a loop,
the loop comprising a first addressably configurable neuron, a first addressably configurable synapse, a second addressably configurable neuron and a second addressably configurable synapse forming the loop, the loop performing one of cyclic and regenerative behavior.

13. The method of constructing a central pattern generator of claim 10, the constructed central pattern generator for storage in an associated database of the neuromorphic network, the database including the constructed central pattern generator.

14. The method of constructing a central pattern generator of claim 10,
the central pattern generator being coupled to a computer processor of a configuration control and optimizing device connected to the neuromorphic network and an associated database of the computer processor,
the associated database for storing different useful substructures comprising at least the neuron and synapse pair,
useful substructures being measured by receiving a first output signal representing a measured output of the external automated system and a second output signal predicted by a model of a desired behavior of the external automated system and the central pattern generator using said first and second output signals to determine at least one external automated process or external device control signal.

15. The method of constructing a central pattern generator of claim 14 wherein said computer processor extracts a useful substructure of addressably configurable circuit elements for performing a sub-task from the neuromorphic network and stores the useful substructure in the associated database.

16. The method of constructing a central pattern generator of claim 14 wherein said computer processor implants a useful substructure of addressably configurable circuit elements for a sub-task in the neuromorphic network retrieved from a plurality of different useful substructures stored in the associated database.

17. The method of constructing a central pattern generator of claim 14,
the central pattern generator being stored in a library of the associated database, retrieved by the computer processor and inserted as a useful substructure of addressably configurable circuit elements in a second neuromorphic network coupled to the computer processor.

18. The method of constructing a central pattern generator of claim 17, the second neuromorphic network being designed by the computer processor using evolutionary optimization.

19. The method of constructing a central pattern generator of claim 10, the sequence of discrete events being generated responsive to a sequence of input events to the neuromorphic network received from an external automated process or external device via a demodulator for input to the neuromorphic network via an interface and control structure or to reconfigure the neuromorphic network via a configuration control and optimizing device comprising a computer processor.

20. The method of constructing a central pattern generator of claim 10, the sequence of discrete events having both a spatial and a temporal pattern.

21. The method of constructing a central pattern generator of claim 10, the sequence of discrete events being an output of the neuromorphic network received via an interface and control structure for output to an external process or to a configuration control and optimizing device for the neuromorphic network.

* * * * *